United States Patent
Petropoulakis et al.

(10) Patent No.: US 8,392,553 B2
(45) Date of Patent: Mar. 5, 2013

(54) REMOTE MONITORING BY TRACKING, STORING, AND ANALYZING USER INTERACTIONS WITH AN OPERATING SYSTEM OF A DATA PROCESSING DEVICE

(75) Inventors: Lykourgos Petropoulakis, Penicuik (GB); Bruce Stephen, Glasgow (GB)

(73) Assignee: University of Strathclyde, Glasgow (GB)

( * ) Notice: Subject to any disclaimer, the term of this patent is extended or adjusted under 35 U.S.C. 154(b) by 331 days.

(21) Appl. No.: 10/554,670

(22) PCT Filed: Apr. 29, 2004

(86) PCT No.: PCT/GB2004/001854
§ 371 (c)(1),
(2), (4) Date: Nov. 6, 2006

(87) PCT Pub. No.: WO2004/097643
PCT Pub. Date: Nov. 11, 2004

(65) Prior Publication Data
US 2007/0055766 A1    Mar. 8, 2007

(30) Foreign Application Priority Data
Apr. 29, 2003 (GB) .................................. 0309681.5

(51) Int. Cl.
*G06F 15/173* (2006.01)
*G06F 12/14* (2006.01)
*G06F 12/16* (2006.01)

(52) U.S. Cl. ........................... 709/224; 726/23; 709/225
(58) Field of Classification Search .................. 709/224; 706/50, 61; 726/23
See application file for complete search history.

(56) References Cited

U.S. PATENT DOCUMENTS

| | | | | |
|---|---|---|---|---|
| 5,252,951 A | * | 10/1993 | Tannenbaum et al. | 345/156 |
| 5,675,510 A | * | 10/1997 | Coffey et al. | 709/224 |
| 5,754,939 A | * | 5/1998 | Herz et al. | 455/3.04 |

(Continued)

FOREIGN PATENT DOCUMENTS

| | | |
|---|---|---|
| DE | 100 39 335 A1 | 2/2002 |
| EP | 0 953 920 A2 | 11/1999 |

(Continued)

OTHER PUBLICATIONS

Oxford English Dictionary; definition for "occasion, v."; 2010; pp. 1-3.*

(Continued)

*Primary Examiner* — Jeffrey Nickerson
(74) *Attorney, Agent, or Firm* — Alston & Bird LLP

(57) ABSTRACT

A system for monitoring actions performed on a data processing device by one or more users. The system comprises a plurality of user data processing devices including a mechanism for interacting with a user and a system monitor that can communicate with each user device and a database. In an exemplary embodiment, the monitor includes a plurality of software agents for carrying out specific functionality. These agents may be distributed over one or many different machines. Each user device includes at least one sensor for detecting events occasioned by interaction of a user with the data processing device. These sensors are operable to create a data structure representing a detected event, and communicate that data structure to the monitor. Once these structures are received, the monitor records them in the database. By analyzing the event data for specific users, user profiles can be created, which can be used to authenticate users.

26 Claims, 60 Drawing Sheets

U.S. PATENT DOCUMENTS

| | | | |
|---|---|---|---|
| 5,781,703 A * | 7/1998 | Desai et al. | 706/50 |
| 5,796,633 A * | 8/1998 | Burgess et al. | 702/187 |
| 5,835,722 A | 11/1998 | Bradshaw et al. | |
| 6,018,619 A * | 1/2000 | Allard et al. | 709/224 |
| 7,058,893 B2 * | 6/2006 | Abbott et al. | 715/744 |
| 7,167,915 B2 * | 1/2007 | Bendich et al. | 709/224 |
| 7,523,191 B1 * | 4/2009 | Thomas et al. | 709/224 |
| 2002/0099812 A1 * | 7/2002 | Davis et al. | 709/224 |
| 2003/0023620 A1 * | 1/2003 | Trotta | 707/203 |
| 2003/0065770 A1 | 4/2003 | Davis et al. | |
| 2003/0217144 A1 * | 11/2003 | Fu et al. | 709/224 |
| 2009/0271514 A1 * | 10/2009 | Thomas et al. | 709/224 |

FOREIGN PATENT DOCUMENTS

| | | |
|---|---|---|
| EP | 1 083 486 A1 | 3/2001 |
| GB | 2 350 211 A | 11/2000 |
| WO | WO 00/08570 | 2/2000 |
| WO | WO 01/26291 A2 | 4/2001 |
| WO | WO 03/007151 A2 | 1/2003 |

OTHER PUBLICATIONS

Kamba et al., "*Anatagonomy: a personalized newspaper on the World Wide Web*", International Journal of Human-Computer Studies, Academic Press, New York, NY, US, vol. 46, 1997, pp. 789-803, XP002086827 ISSN: 1071-5819.

International Business Machines Corporation, "*Web Display Profiling*", Research Disclosure, Kenneth Mason Publications, Westbourne, GB, vol. 427, No. 100, Nov. 1999, XP007125073, ISSN: 0374-4353.

Finin et al., *KQML as an Agent Communication Language*, Proceedings of the 3$^{rd}$ International Conference on Information and Knowledge Management, 1994, pp. 456-463.

Aho et al., *Efficient String Matching: An Aid to Bibliographic Search*, The Aho-Corasick algorithm, Comm. ACM 18:6 1975, pp. 333-340.

International Search Report, EPO, PCT/GB2004/001854, dated Sep. 21, 2005.

\* cited by examiner

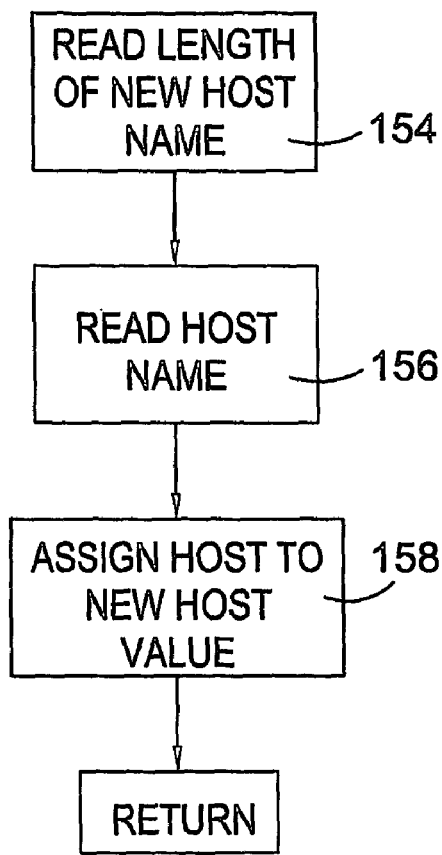

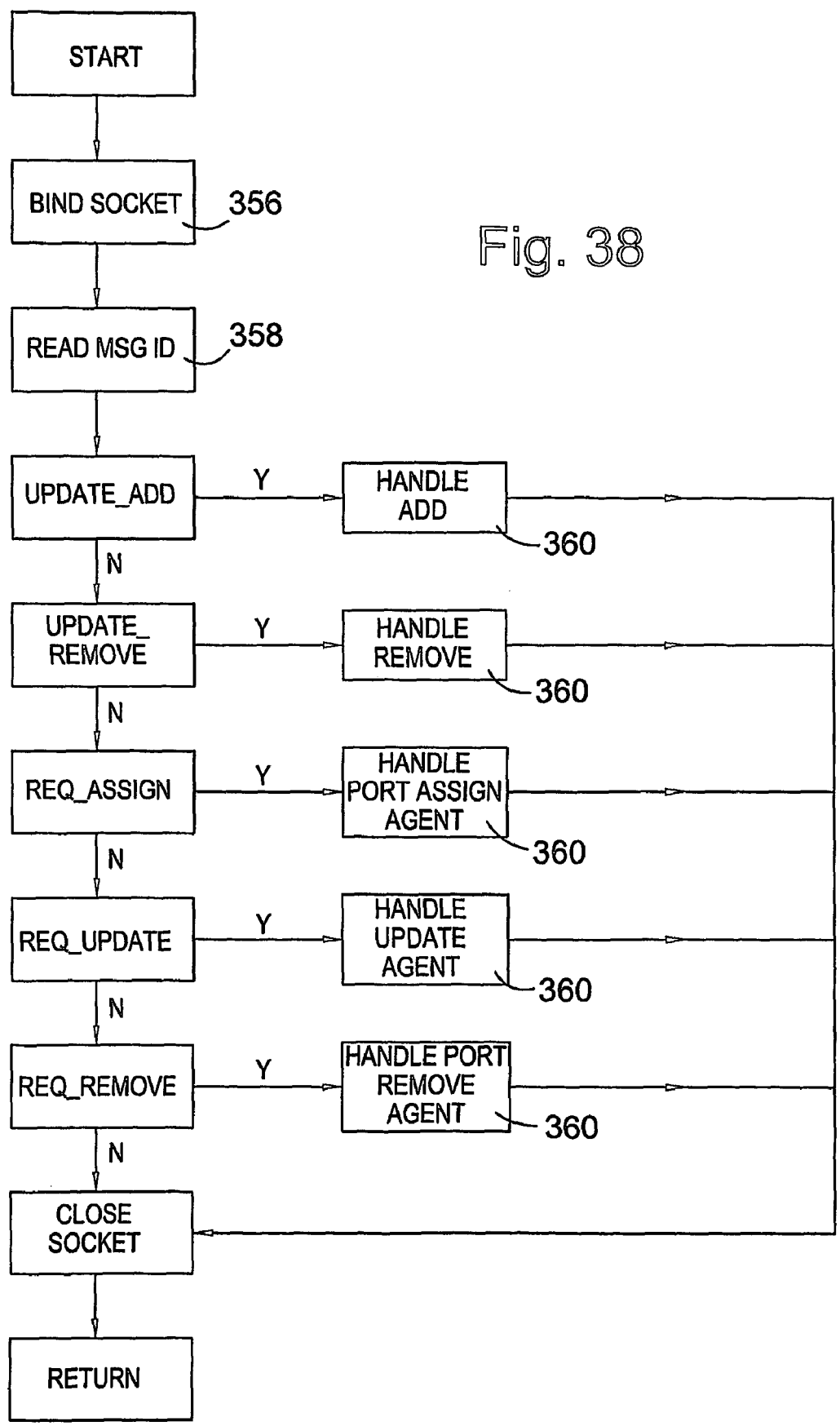

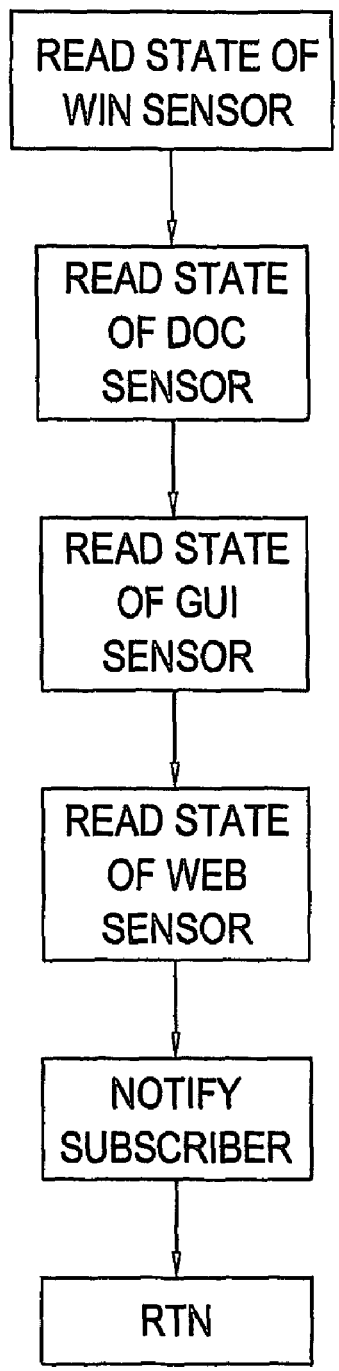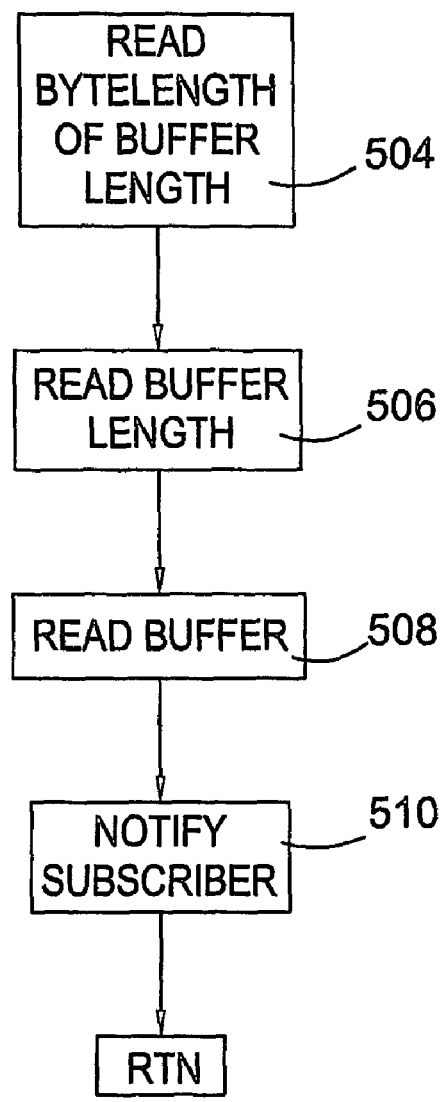
Fig. 59
Fig. 60

Fig.71

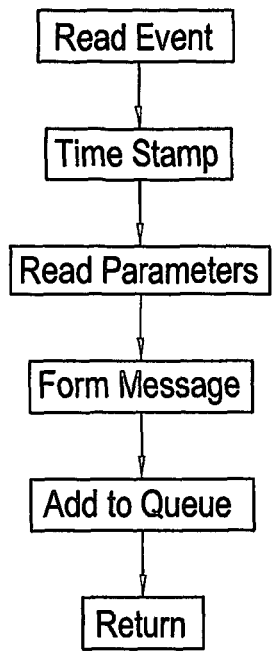
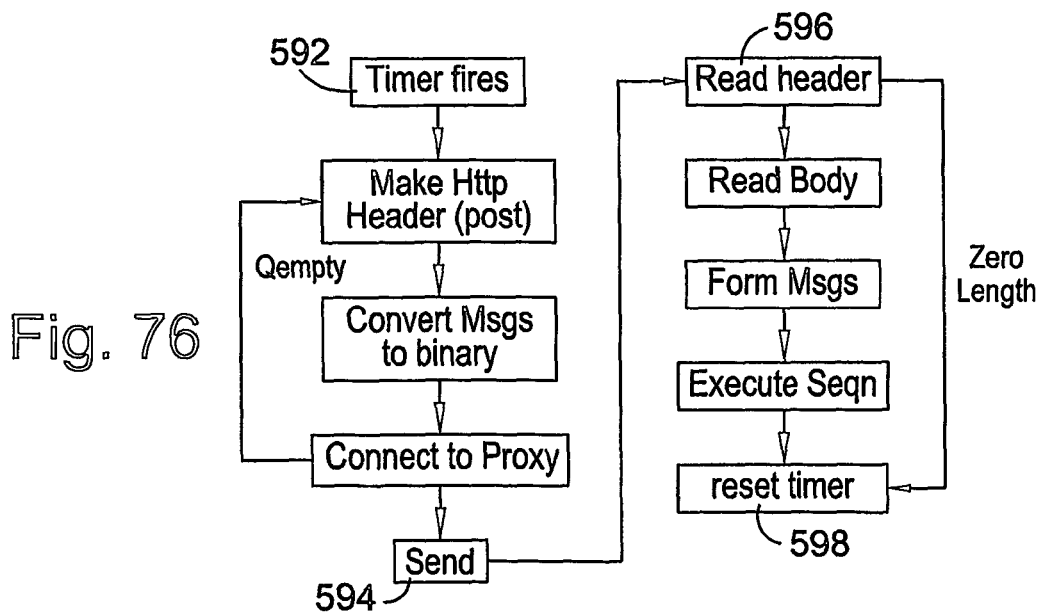
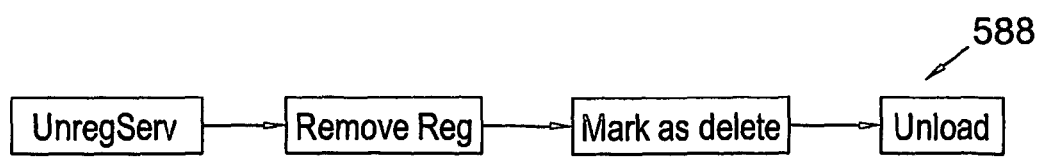

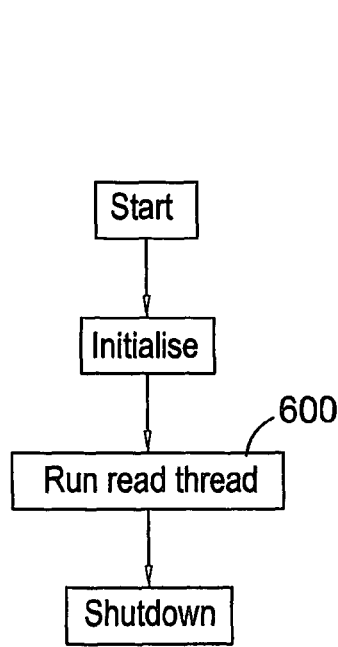
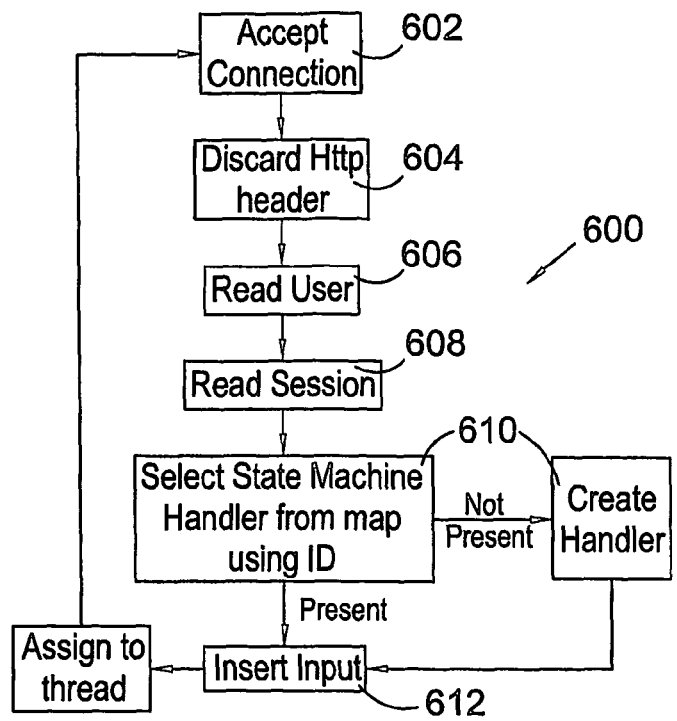
Fig. 78
Fig. 79
Fig. 80
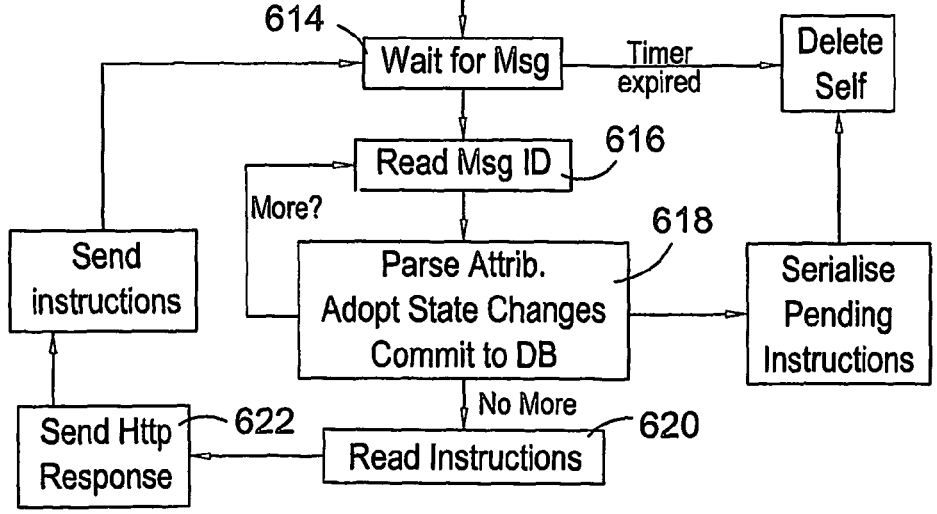

REMOTE MONITORING BY TRACKING, STORING, AND ANALYZING USER INTERACTIONS WITH AN OPERATING SYSTEM OF A DATA PROCESSING DEVICE

BACKGROUND OF THE INVENTION

1. Field of the Invention

The present invention relates to a system and method for monitoring a user's actions on a computing device. In particular, but not exclusively, the invention relates to a system and method for remotely monitoring a user's actions performed on a web browser program.

2. Description of Related Art

In many instances it is desirable to be able to monitor actions of a user on a computer device or computer network. This is particularly the case where the internet is being accessed, because in such circumstances there is a possibility that the computer network is being used to access inappropriate websites or material. A number of monitoring systems are known which allow restriction of internet access. The simplest form of system relies on a predetermined list of keywords or forbidden websites. If a user attempts to access any site on the list, they are forbidden from doing so, and the attempt may be logged. However, this suffers from limitations arising from the use of a predetermined list of sites, in that such sites may change their URL frequently. Further, it may still be possible for a user to access inappropriate sites that do not use the restricted keywords.

Alternative systems may make use of 'cookies' stored on a user's computer. Cookies are short character strings encoding certain information regarding the user's browsing habits, sites visited, and so on. The difficulties with cookies are that they rely on the user allowing them to be stored on their computer. Also, their information storage capacity is relatively low, typically being restricted to user identifiers and time of last site visit. Hence, in practice, it is difficult to use cookies to monitor a user's website access other than on a broad level such as time of visits to particular sites.

More sophisticated systems may rely on intercepting actual data flows to and from the user's computer. However, a typical such system executes as a separate program from the web browser, which makes it possible for the user to relatively easily detect the execution of the program and identify that they are being monitored. Further, typical systems monitor either activity on the user (client) device or on the server device. However, in practice, it may be beneficial to be able to monitor activity on both devices if desired. Conventional systems are also relatively large program files, which may lead to an appreciable drop in performance of the user's computer, as well as making the files more visible to a user. A further disadvantage of conventional systems is that they are unable to identify the user who is being monitored. Although sophisticated systems may identify the network username or the computer terminal identity, and so make some association between users and access to inappropriate websites, they rely on users adopting rigorous security procedures and not allowing others to use their username and password, logging off terminals when leaving them unattended, and so on. Further, such systems are not proof against malicious user impersonation. It would be beneficial to be able to confirm the identity of a monitored user.

As well as the conventional systems described above, various other monitoring systems have been proposed. For example, GB 2350211 describes a system that monitors users at the Operating System level. However, it is designed to operate only on a client computer, and does not allow remote monitoring or logging of activity. WO 01/26291 A2 is concerned with the remote "health" evaluation, maintenance and support of systems in general (be they computers or other devices). It is not intended to monitor user activity via a web browser or on other systems. Furthermore, the technology appears to be applicable to only one site. WO 00/08570 describes a system, which is hardwired to a given site (it appears to act on a site which operates as a proxy server, else it accesses documents local to one site only). This system also accesses the http stream (the normal communication between a browser and a web site) in order to obtain the information for monitoring purposes.

EP 0 953 920 A2 describes yet another system, which includes a tailor-made client. An agent, which appears to be a proxy server, is integrated into a viewer provided by the vendor. The overall process indicates that the technology accesses the http stream in order to acquire the information needed for monitoring. The system interacts with the user and the agent questions the user to extract information. As a still further example, U.S. Pat. No. 5,835,722A describes an application specific to blocking access to Internet sites, documents, emails etc. based on dynamic libraries/dictionaries. It has no means of extracting user information from browser activities nor does it possess an inference mechanism of particular sophistication. Further, in collecting information over Internet connections, this system interferes with the http connection. This approach can lead to several undesirable effects such as corruption of the data stream or performance bottlenecks.

BRIEF SUMMARY OF INVENTION

It is an object of embodiments of the present invention to overcome one or more of these or other disadvantages of conventional monitoring systems.

Various aspects of the invention are defined in the accompanying independent claims. Some preferred features are defined in the dependent claims.

In certain embodiments of the invention 'sensor modules' are used, i.e. individual computer programs, which execute on the user's computing device. The modules may in certain embodiments be integrated into a web browser program. The modules detect 'events' and pass details of the detected events to modules executed on a monitoring device. The relatively small size of the sensor modules, and their integration into a web browser, allows embodiments of the present invention to operate with a lower likelihood of being detected by a user. Further, a method of using detected events to create a profile for identifying a user is described.

According to a first aspect of the present invention, there is provided a system for monitoring actions performed on a data processing device by a user, the system comprising: a user data processing device including means for interacting with a user; a monitoring data processing device in data communication with the user device; and data storage means in data communication with the monitoring device; wherein the user device includes at least one sensor software module, the module comprising computer code for detecting events occasioned by interaction of a user with the data processing device; computer code for creating a data structure representing a detected event; and computer code for communicating created data structures to the monitoring device; and wherein the monitoring device includes a monitoring software module, the module comprising computer code for receiving data structures communicated by the sensor module; and computer code for recording communicated data structures in the data storage device.

The monitoring and user devices may be components of the same data processing device, although preferably the monitoring device is distinct from the user device. There may be a plurality of user devices in data communication with the monitoring device.

Preferably the sensor module is integrated with additional software for execution on the user device. By 'integrated', it is meant that the sensor module is arranged such that it executes concurrently with the additional software. The manner in which this is achieved will of course vary depending on the platform on which the software is executed, although a preferred embodiment includes computer code to make the additional software dependent on the sensor module for execution; that is, the additional software must call the sensor module for execution before the additional software may be executed. The nature of the additional software will be dependent on the use to which the present invention is to be put. In preferred embodiments, the additional software may comprise an internet browser to allow monitoring of internet usage. Alternatively, the additional software may be an operating system user interface or the like to allow monitoring of all user events via that interface.

The user device preferably includes a plurality of sensor modules. Each module may include code for detecting distinct types of event; for example, a first module may include code for detecting mouse input, while a second module may include code for detecting keyboard input. Particularly preferred modules may be used to detect the following types of event, although this list is not exclusive and is not intended to be limiting: internet browser navigation operations (such as changing pages or websites); mouse and keyboard operations; keystroke data such as passwords and the like; window scrolling operations; window resizing operations; and menu and toolbar operations. Further modules may be used to detect the following information: internet browser navigation history; internet browser bookmarks or favourites. Certain modules may also include code for pushing data to the user device, such as forcing a program or data file to open or close, or to force a change of website for an internet browser.

The sensor module may further comprise code representing an identification code for that module. This is preferably a unique identifier for that module, and is intended to allow different sensor modules to be distinguished from one another. The module identification code may also include code identifying the user device on which the module resides. This may be a particular code for the device itself, or may be a code for the user currently using the device; a combination of the two may also be used. This allows identical modules being executed on different user devices to be given a unique identifier. The code for creating data structures preferably includes code for incorporating the identification code in any data structures created by that sensor module.

The data structures preferably comprise a plurality of substructures. The substructures may each comprise a data string representing an item of information relating to the detected event. For example, substructures may include a module identifier; a device identifier; a timestamp representing the time at which the event was detected; identification of the detected event; additional information regarding the detected event (for example, if the event is a scrolling movement by the user, then additional information may be included to identify the direction and distance of scroll); identification of any programs being executed on the device; identification of any website URL or data file which is open when the event occurs; and the like.

The data structures may be text strings. The text strings may be formed in a type of mark up language. Particularly preferred embodiments of the invention make use of a modified form of KQML (knowledge query manipulation language), although of course any convenient data structure format may be used.

The code for communicating data structures to the monitoring device may comprise code for communicating said structures directly to the monitoring device, or may comprise code for communicating said structures to an intermediary software module. For example, an intermediary software module may be disposed between the monitoring device and each of a plurality of user devices, and may include code for handling and transferring data communications. This arrangement allows the sensor and monitoring modules to be of reduced data size than otherwise, since detailed data communications protocols need not be implemented. Further, such an arrangement allows for a degree of platform-independence, since the intermediary module may be used across different platforms, with only the sensor modules needing to be adapted to a new platform.

The monitoring module preferably comprises computer code for analysing communicated data structures. Where the structures comprise a plurality of substructures, this may comprise code for deconstructing the structures into their component substructures. The analysis code may further comprise code for storing communicated data structures in a database provided in the data storage device. The monitoring device may still further comprise computer code for acting in response to particular data structures. This allows appropriate action to be taken in response to predetermined events. For example, where the data structure represents a user attempting to access a 'forbidden' URL, the monitoring device may alert a human operator or may terminate that user's network access or the like. In certain embodiments of the invention, as described below, the action to be taken may comprise transferring additional data structures representing instructions to the sensor.

The monitoring device may further comprise computer code for creating a user profile from communicated data structures. This preferably comprises code for collating all events detected from a particular user. The monitoring device preferably further comprises computer code for comparing the user profile with subsequently detected events to determine whether the subsequent events conform with the user profile. Any suitable comparison means may be used, for example, artificial intelligence systems, neural networks, statistical methods, and the like. This feature may be of particular benefit where monitoring takes place across a network having multiple users. In such networks, the possibility of a user making use of an unauthorised user identity is present, as is the possibility of a user neglecting to log out of the network such that third parties may inadvertently adopt their user identity. Such a method may help to distinguish these events from legitimate events. The user profile may be periodically updated with subsequently detected data structures, once these have been determined as legitimate. In this way, a dynamic profile may be assembled for each of many users.

In certain embodiments of the invention, the user profile may represent a limited subset of detected events. In particular, the user profile may comprise a 'gesture recognition' system; that is, the profile comprises events denoting user mouse movements, scrolling movements, keyboard presses, and the like. It is believed that such events represent a 'fingerprint' of a particular user, because a particular gesture sequence may be characteristic of that user. This allows users to be identified even when they have not logged on to a system, or when they have logged on using a different username from usual. Such a gesture recognition system also has applications for biometrics identification systems, security profiling, and the like.

The monitoring device preferably further comprises computer code for communicating data to the sensor. The sensor preferably comprises computer code for receiving said data. The sensor preferably yet further comprises computer code for interpreting received data. This allows the monitoring device to transfer instructions or information to the sensor. For example, the monitoring device may communicate instructions to begin or end monitoring by the sensor. These instructions may be transferred in response to data received from the sensor. For example, if the sensor detects a user logging out from the user device, a suitable data structure will be sent to the monitoring device. This in turn will cause the monitoring device to send a signal to the sensor to cease monitoring. Alternatively, the monitoring device may communicate data representing a 'ping' command or similar to the sensors, to identify and locate all active sensors. The sensors will then respond by communicating their identity to the monitoring device.

According to a second aspect of the present invention, there is provided a method of monitoring actions performed on a data processing device by a user, the method comprising the steps: providing a user data processing device including means for interacting with a user; a monitoring data processing device in data communication with the user device; and data storage means in data communication with the monitoring device; detecting by means of a sensor software module events occasioned by interaction of a user with the user data processing device; creating a data structure representing a detected event; communicating created data structures to the monitoring device; receiving on the monitoring device data structures communicated by the sensor module; and recording communicated data structures in the data storage device.

According to a further aspect of the present invention, there is provided a method of providing details of actions performed on a data processing device by a user to a monitoring data processing device, the method comprising the steps: detecting by means of a sensor software module events occasioned by interaction of a user with a user data processing device; creating a data structure representing a detected event; and communicating created data structures to a monitoring data processing device.

According to a yet further aspect of the present invention, there is provided a method of monitoring on a monitoring data processing device details of actions performed by a user on a user data processing device, the method comprising the steps: receiving on a monitoring data processing device data structures representing events resulting from actions of a user on a user device and detected by the user device, said data structures being communicated by a sensor module executing on the user device; and recording communicated data structures in a data storage device.

According to a further aspect of the present invention, there is provided a computer program for monitoring actions performed on a data processing device by a user, the program comprising: at least one sensor software module for execution on a user device, the module comprising computer code for detecting events occasioned by interaction of a user with the data processing device; computer code for creating a data structure representing a detected event; and computer code for communicating created data structures to the monitoring device; and a monitoring software module for execution on a monitoring data processing device, the module comprising computer code for receiving data structures communicated by the sensor module; and computer code for recording communicated data structures in a data storage device.

According to a still further aspect of the present invention, there is provided a system for identification of a user based on gestures performed on a data processing device by the user, the system comprising: a user data processing device including means for interacting with a user; a monitoring data processing device in data communication with the user device; and data storage means in data communication with the monitoring device; wherein the data storage means comprises stored data representing one or more user profiles, each user profile including a user identity and data structures representing gestures known to be performed by a user associated with that user identity; wherein the user device includes at least one sensor software module, the module comprising computer code for detecting gestures resulting from interaction of a user with the data processing device; computer code for creating a data structure representing a detected gesture; and computer code for communicating created data structures to the monitoring device; and wherein the monitoring device includes a monitoring software module, the module comprising computer code for receiving data structures communicated by the sensor module; computer code for comparing communicated data structures with data included in the user profiles; and wherein the monitoring device further comprises computer code for determining on the basis of said comparison whether the communicated data structures are consistent with data included in the user profiles, and for associating a communicated data structure with a particular user profile. Thus, the present invention allows gestures to be remotely monitored and compared with a user profile to determine whether the monitored gestures are compatible with that user profile. This allows a user to be identified from their gestures. 'Gestures' may include any action performed by the user for interaction with the user device, for example, mouse movements, window scrolling, keyboard actions, and the like.

According to a still further aspect of the present invention, there is provided a method for identification of a user based on gestures performed on a data processing device by the user, the method comprising the steps of: providing a user data processing device including means for interacting with a user; a monitoring data processing device in data communication with the user device; providing data representing one or more user profiles, each user profile including a user identity and data structures representing gestures known to be performed by a user associated with that user identity; detecting on the user device gestures resulting from interaction of a user with the data processing device; creating a data structure representing a detected gesture; communicating created data structures to the monitoring device; receiving on the monitoring device data structures communicated by the sensor module; comparing communicated data structures with data included in the user profiles; and determining on the basis of said comparison whether the communicated data structures are consistent with data included in the user profiles, and associating a communicated data structure with a particular user profile.

According to a yet further aspect of the present invention, there is provided a computer program for identification of a user based on gestures performed on a data processing device by the user, the program comprising: at least one sensor software module for execution on a user data processing device, the module comprising computer code for detecting gestures resulting from interaction of a user with the data processing device; computer code for creating a data structure representing a detected gesture; and computer code for communicating created data structures to a monitoring data processing device; a monitoring software module for execution on a monitoring data processing device, the module comprising computer code for receiving data structures communicated by the sensor module; computer code for comparing communicated data structures with stored data representing one or more user profiles, each user profile including a user identity and data structures representing gestures known to be performed by a user associated with that user identity; and computer code for determining on the basis of said comparison whether the communicated data structures are consistent with data included in the user profiles, and for associating a communicated data structure with a particular user profile.

According to a yet further aspect of the present invention, there is provided a user interface for allowing a user to interact with a server data processing device for monitoring third party actions performed on a client data processing device, the user interface comprising: icons representing sensor software modules for execution on the client data processing device; and icons representing monitoring software modules for execution on the server data processing device; wherein selection of an icon provides the user with data indicating the activity of a software module represented by the selected icon. Preferably the user interface further comprises icons representing monitored client data processing devices, wherein selection of such an icon provides the user with access to the icons representing sensor software modules for execution on the selected client data processing device. Preferably the user interface further comprises icons representing monitored third parties, wherein selection of such an icon provides the user with data representing monitored actions of the third party.

BRIEF DESCRIPTION OF THE SEVERAL VIEWS OF THE DRAWING(S)

Various aspects of the present invention will now be described by way of example only, with reference to the accompanying drawings, in which:

FIG. 3 shows the primary execution thread of a generic sensor;

FIG. 4 shows the read thread of a generic sensor;

FIG. 5 shows the termination thread of a generic sensor;

FIG. 6 shows a generic sensor event interceptor thread;

FIG. 7 shows a window scroll event handler; and

FIG. 8 shows a window resize event handler.

FIGS. 9 to 19 illustrate aspects of request handling by sensors:

FIG. 9 shows the sensor read thread of FIG. 4 in more detail;

FIG. 10 shows a thread for handling page requests;

FIG. 11 shows a thread for handling keystroke capture requests;

FIG. 12 shows a thread for handling sensor enumeration requests;

FIG. 13 shows a thread for handling navigation requests;

FIG. 14 shows a thread for handling favourite or bookmark requests;

FIG. 15 shows a thread for handling a history request;

FIG. 16 shows a thread for handling a change of server host request;

FIG. 17 shows a thread for handling a stand down or terminate request;

FIG. 18 shows a thread for handling a sensor update; and

FIG. 19 shows a thread for handling a destroy request.

FIG. 23 shows the procedure for forming an agent identifier;

FIG. 24 shows the primary execution thread for an agent;

FIG. 25 shows the incoming message handling thread;

FIG. 26 shows the message handling thread;

FIG. 27 shows a generic agent structure;

FIG. 28 shows a read socket structure;

FIG. 29 shows the structure of messages sent by an agent;

FIG. 30 shows the agent termination thread;

FIG. 31 shows the initialisation process for agent communications;

FIG. 32 shows the procedure for reading agent messages;

FIG. 33 shows the procedure for writing agent messages;

FIG. 34 shows the procedure for updating details of available agents; and

FIG. 35 shows the procedure for broadcasting agent messages.

FIGS. 36 to 45 illustrate the operation of an agent communications broker, or agent controller:

FIG. 36 shows the initialisation of the agent communications broker;

FIG. 37 shows the port and directory assignment threads;

FIG. 38 shows the thread handler;

FIG. 39 shows the remote host contact thread;

FIG. 40 shows the assignment of a transport address to a new agent;

FIG. 41 shows the updating of individual agents;

FIG. 42 shows the removal of agents;

FIG. 43 shows the addition of a peer agent communications broker;

FIG. 44 shows the removal of a peer agent communications broker; and

FIG. 45 shows the update of a peer agent communications broker.

FIGS. 49 to 62 show the operation of a sensor server agent:

FIG. 49 shows the overall architecture of the sensor server agent;

FIG. 50 shows the sensor server agent startup;

FIG. 51 shows the thread for dealing with agent messages;

FIG. 52 shows the agent main thread;

FIG. 53 shows the storage format for sensor messages;

FIG. 54 shows the thread for each sensor handler;

FIG. 55 shows the response to requests for favourites or bookmarks;

FIG. 56 shows the response to requests for history;

FIG. 57 shows the response to requests for keystrokes;

FIG. 58 shows the basic event handler thread;

FIG. 59 shows the response to sensor enumeration requests;

FIG. 60 shows the response to content requests;

FIG. 61 shows the response to a sensor quit message; and

FIG. 62 shows the response to unknown requests.

FIG. 64 shows the training of a gesture recognition module;

FIG. 65 shows the recognition of gesture patterns; and

FIG. 66 shows the processing of recognised gestures.

FIGS. 67 to 73 illustrate various aspects of a user interface (UI) that may be used with the present invention:

FIG. 67 shows an overview of the UI;

FIG. 68 shows the user behaviour browser;

FIG. 69 shows the sensor install UI;

FIG. 70 shows the agent communications UI;

FIG. 71 shows the document citation data;

FIG. 72 shows the database compactor UI;

FIG. 73 shows a cold start user profile approximator UI;

FIG. 75 shows a user interface thread for use in the client thread of FIG. 74;

FIG. 76 shows a queue empty thread for use in the main client thread of FIG. 74;

FIG. 77 shows a self-destruct thread for use in the main client thread of FIG. 74;

FIG. 78 shows a server main thread for processing a message from the main client thread of FIG. 74;

FIG. 79 shows a server read thread for use in the main thread of FIG. 78, and

FIG. 80 shows a handler thread for the read thread of FIG. 79.

DETAILED DESCRIPTION OF THE INVENTION

1. System Overview

The present invention provides means whereby data arising from normal computer use may be collected, stored, processed and correlated. This technology allows document content analysis and in conjunction with other user specific activities can lead to identification and general profiling of individual computer users. The complete system comprises a number of generic software agents, which may take several different forms, a communications broker or agent controller, a set-up auditing tool, and an information acquisition structure made up of data collection utilities (referred to as 'sensors'). The overall architecture of the system consists of a client and server arrangement with the server attached to a single database. A series of handlers exist (or are dynamically created) to communicate with the information acquisition structure mentioned above. Communications are effected over standard network, internet or intranet connections. Server and client coexistence in a single computer arrangement is also possible.

Figure 1:
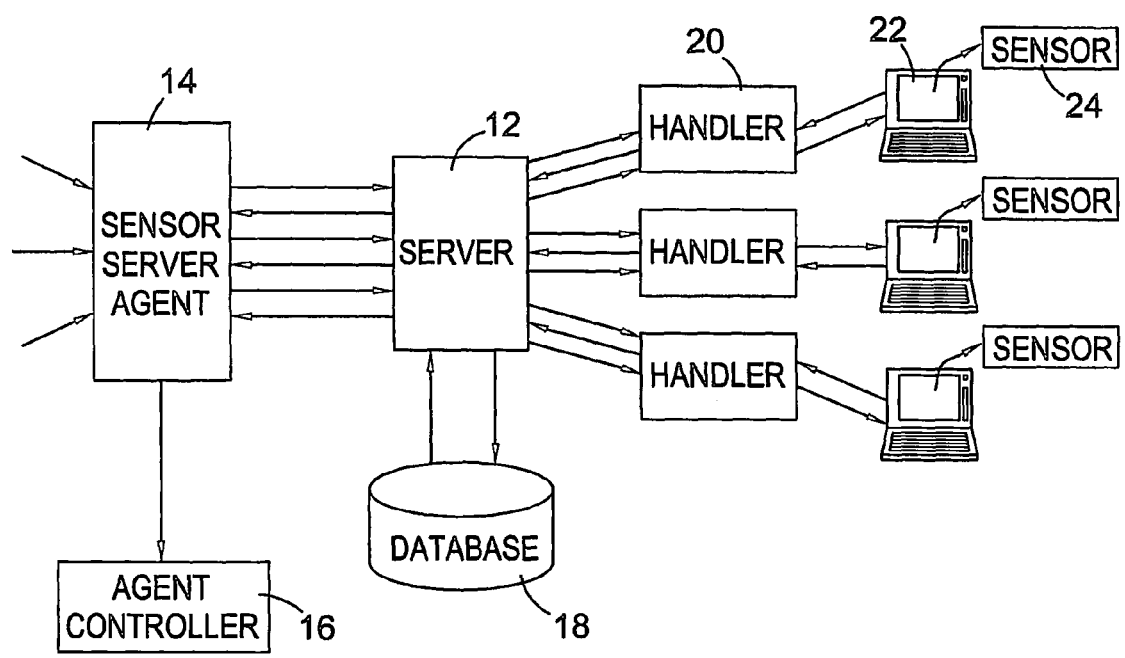
FIG. 1 shows a generic overview of the server-client arrangement of an embodiment of the present invention.
Figure 2:
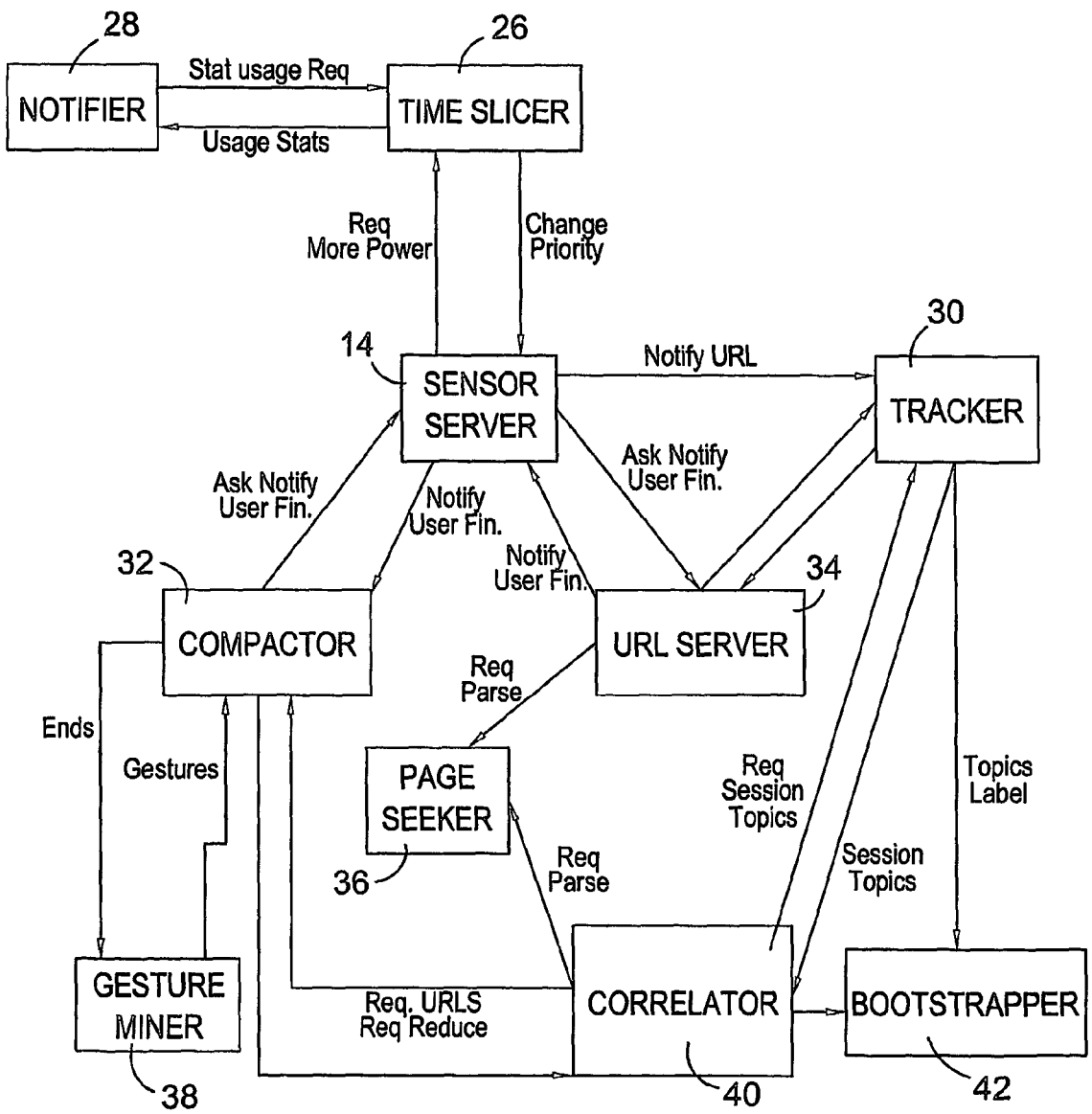
FIG. 2 shows an example of agent configuration on the server side of the present invention.

The generic client-server arrangement is shown in FIG. 1. This includes a server 12 including a sensor server agent 14, which itself is controlled by an agent controller 16 (or agent communications broker); a database 18 accessed by the server, the database including monitored activities of users; a number of handlers 20 which interface between the server 12 and monitored clients 22; and one or more sensors 24 executing on the clients 22. The server structure 12 is modular and fully distributed, i.e. the server may consist of one or more processing systems or computers, all operating synergistically. This allows the system easy expandability and permits simultaneous processing of large amounts of multivariable events and a multitude of information collection points. The server structure consists of one or more software agents (depending on the implementation), each agent capable of communicating with one another and each agent capable of querying and writing to the database. FIG. 2 shows one possible combination of agent arrangement at the server side. In this example, the agents include a sensor server 14, and a time slicer 26, a notifier 28, a tracker 30, a compactor 32, a URL server 34, a page seeker 36, a gesture miner 38, a correlator 40, and a bootstrapper 42. Each of these will be described in more detail later.

All agents have a common basic generic design, as outlined in section 4 below, although each agent has its own individual functionality within the server structure. Particular characteristics of certain agents are described in section 4 below. Agent communication is effected through an extended version of KQML (knowledge query manipulation language), which incorporates XML (extensible mark up language) structures, and thus allows complex data to be embedded in agent messages. The purpose of the agents in the server structure is to perform a number of functions which a) support, guide, and supervise the information acquisition process; and b) perform a number of additional tasks in connection with the processing of the acquired information. These tasks include, but are not limited to: (1) correlating information held in the database; (2) performing document and site content analysis; (3) inferring high level symbols from raw data events; (4) providing means of unsupervised learning of user behaviour patterns; and (5) providing means of recognising behaviour patterns in discrete multivariate system level event streams. Details of these and other agent specific functions are given in sections 4 and 6 below.

The sensors 24 of FIG. 1 are programming entities for gathering information. These may take several different forms, which are generally client-based but are supported by the server-based processing and guiding structure. Their common characteristics are: (i) they contain an asynchronous mechanism designed to intercept system events and relay them to a server for further processing (active component); (ii) they possess a passive component which enables real-time reception of instructions from the server; (iii) they can assume unobtrusive behaviour; (iv) they do not affect normal client-computer operation; (v) their information capture mechanism can be customised to suit particular implementations of operating system and/or computer application; (vi) each sensor is uniquely identifiable by its designated server; and (vii) sensors can be activated or deactivated according to specific instructions received from the server, and their information acquisition behaviours may alter accordingly. The specific mechanisms of sensor working, installation and information collection are outlined in section 2 below.

2. Information Gathering Mechanism

Figure 3:
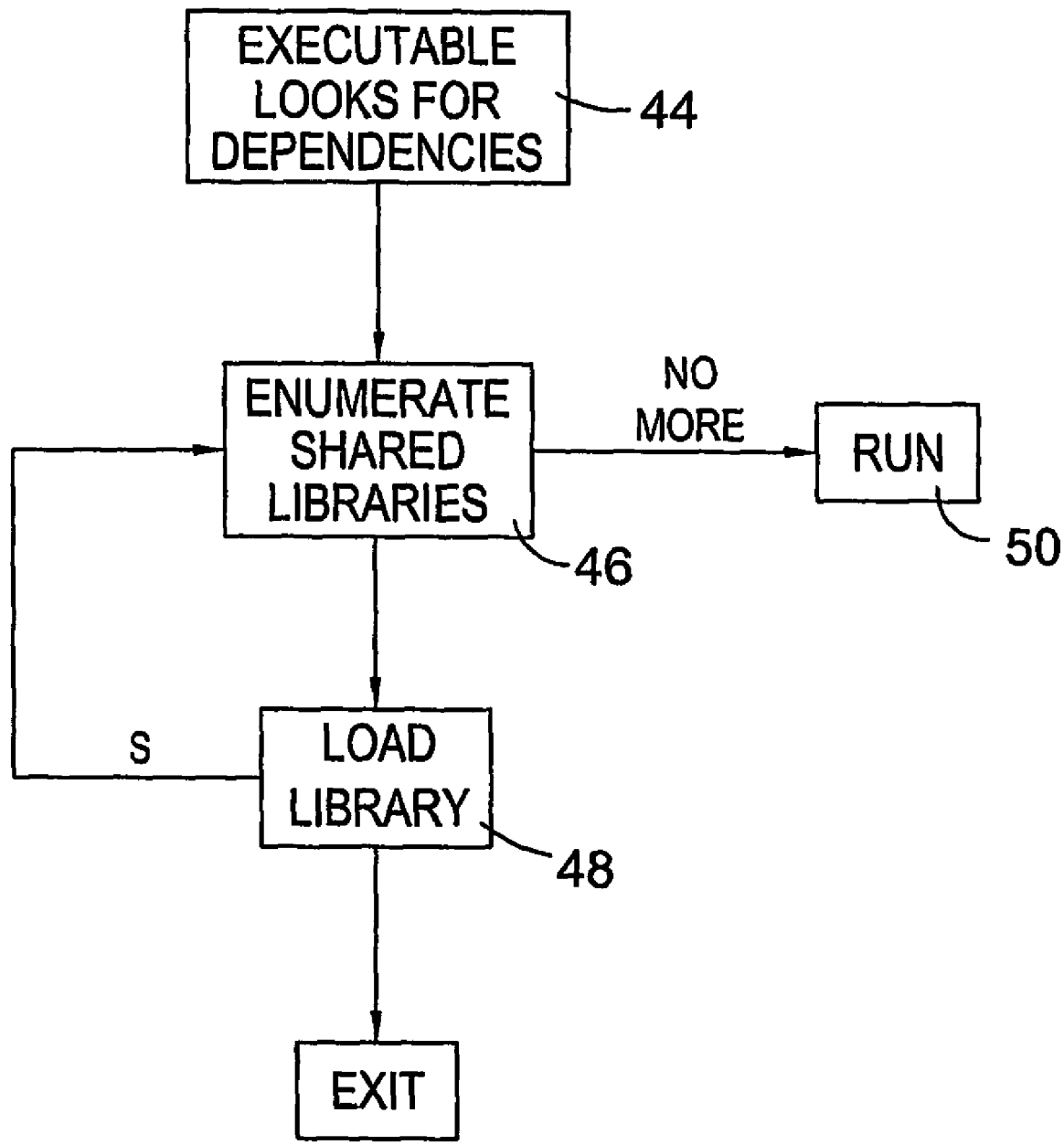
FIGS. 3 to 8 illustrate various aspects of sensor architecture.

The sensors of FIG. 1 are, in one implementation, instructed to gather information regarding menu usage, computer window placement and sizing, and web browser events. The sensors may be capable of any the following: extracting navigation events from the browser; extracting low level (mouse and keyboard) events from the browser; transforming keystroke data into meaningful text; capturing window scrolling operations; transforming scrolling operations into meaningful data; capturing window resizing operations; transforming window resizes into meaningful data; capturing browser movements; capturing and relaying browser content; capturing menu operations; capturing URL history of user; capturing Favourites Bookmarks) of user; remote redirection (on command) of the browser; providing a unique identifier for the particular instance of the browser; capturing computer-time events, and retrieving information from client persistent data 2.1 Main Procedure To allow the sensor to enter the client executable environment, typically a conventional web browser, the loading routine of the browser is configured so that it cannot be fully executed until the sensor is loaded. As shown in FIG. 3, when the client executable (typically a conventional web browser)

identifies dependencies 44, shared libraries (typically DLLs) are enumerated 46 and loaded 48 until all such DLLs have been loaded, and the executable then runs 50.

2.1.1 Start-up

Figure 4:
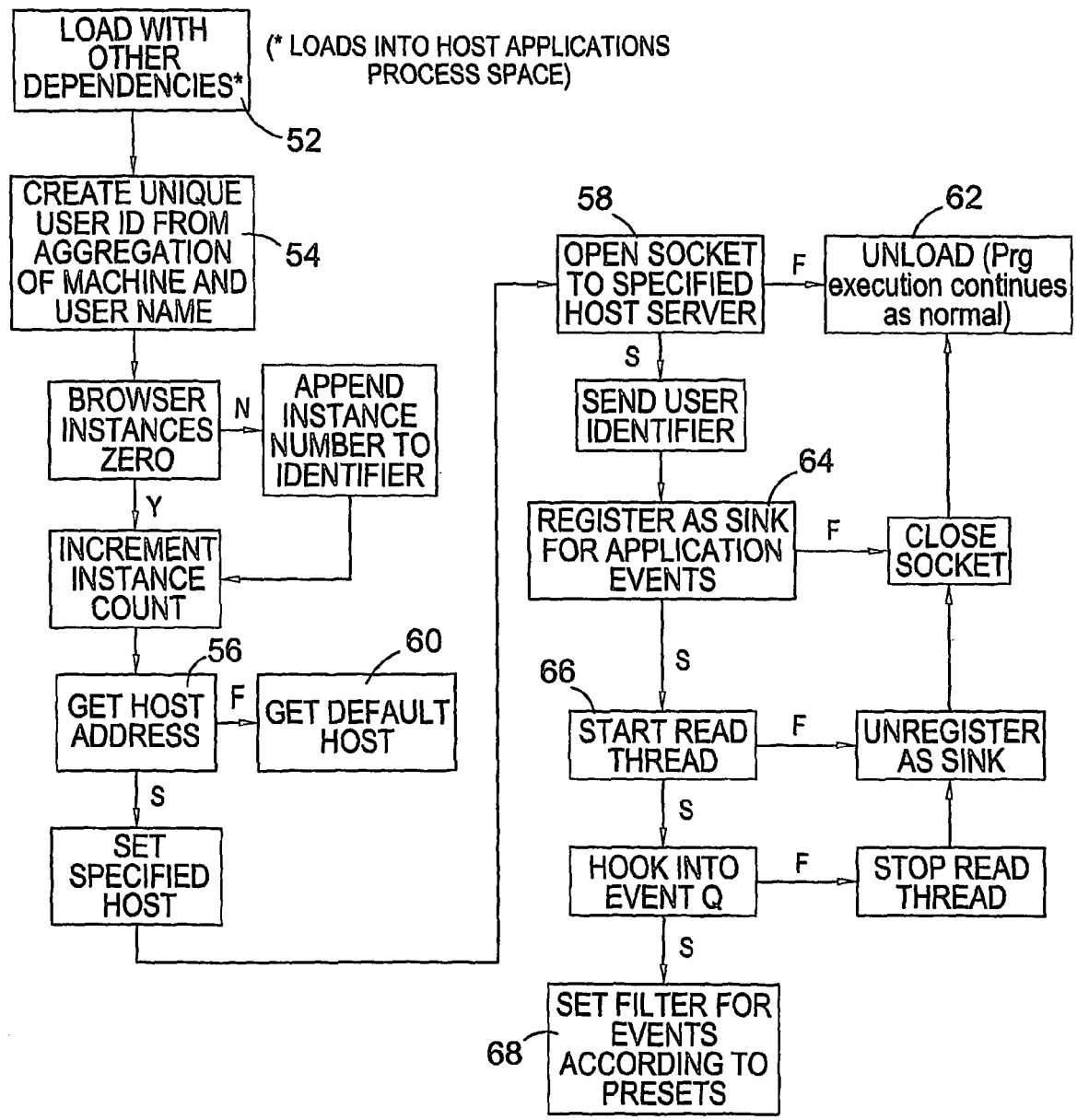

Assuming the procedure in section 2.1 completes successfully, the start up routine depicted in FIG. 4 is followed. The sensor is loaded 52 with all the other binary, dependencies of the host application, which allows them to share memory. Once successfully loaded, the sensor attempts to identify itself uniquely 54 using a combination of the client computer name, the user name and the number of instances of the sensor currently executing. The network address of the host the sensor is to contact is retrieved from persistent storage 56 and a connection is made to it 58. Failing this, the system wide default server host is retrieved 60 and used instead. Failure to connect to the remote host causes the sensor to unload 62 and the client host application to continue regardless.

After this, the means of interception is initialised 64 by the sensor. It should be noted that the invention is independent of the means of capture. This can be tailored to suit the implementation. A thread reading from the network connection 66 concurrently receives, and acts on, any requests from the remote server host. The read thread procedure is documented in section 2.2. Finally, the states (On or Off) of the event filters are retrieved from persistent storage 68. These determine which events should be reported back to the remote host as they are intercepted.

2.1.2 Shutdown

Figure 5:
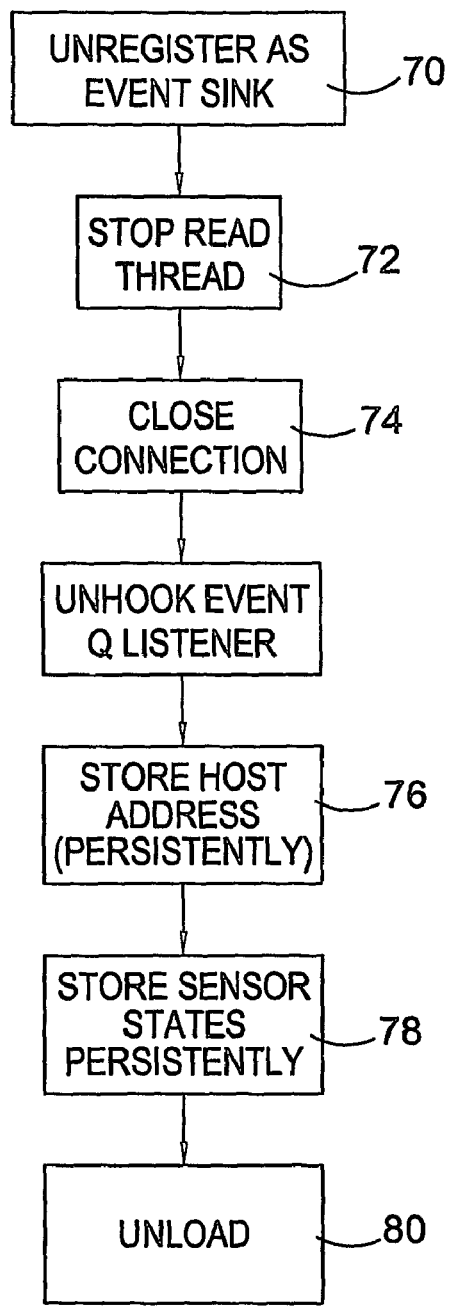

In FIG. 5 the shutdown and cleanup procedure is shown. This is called when either the client application the sensor is attached to is manually closed by the user or if the sensor is signalled to stand down by the remote host (see FIG. 17). Shutting down is essentially the starting up procedure in reverse—first the means of intercepting events is removed 70, then the read thread is signalled to stop 72, the connection to the remote host is closed 74, the name of the remote host and the sensor states stored persistently 76, 78 and finally the executable the sensor exists as, in whatever form, unloads from memory 80.

2.1.3 Asynchronous Event Handling

Figure 6:
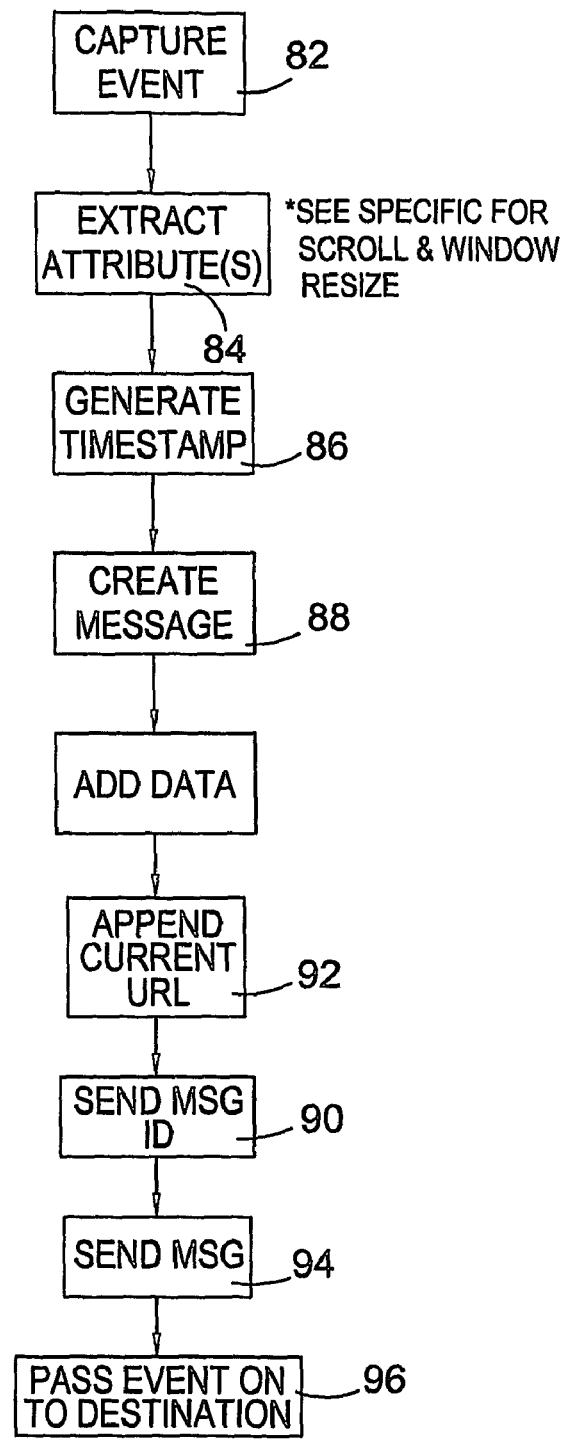

FIG. 6 shows the general approach to handling a captured event. There are numerous means of intercepting event messages. The choice of which to use is made purely on the basis of what is most convenient for the implementation. The event is captured 82, and the relevant attributes extracted 84 and a timestamp generated 86. The message is then created 88, with the message structure itself consisting of a message type identifier 90 (denoting content or origin), an event identifier, the URL of the document 92 and a timestamp. The message attributes may denote some additional information about an event such as window scrolling or resize (see FIGS. 7 and 8). The timestamp contains year, month, day, hour, minute, second and millisecond information, and is used to preserve sequence and provide further temporal information such as event rates. When the message has been formed it is sent to the remote server host 94 and the event is passed on to its intended destination 96.

Figure 7:
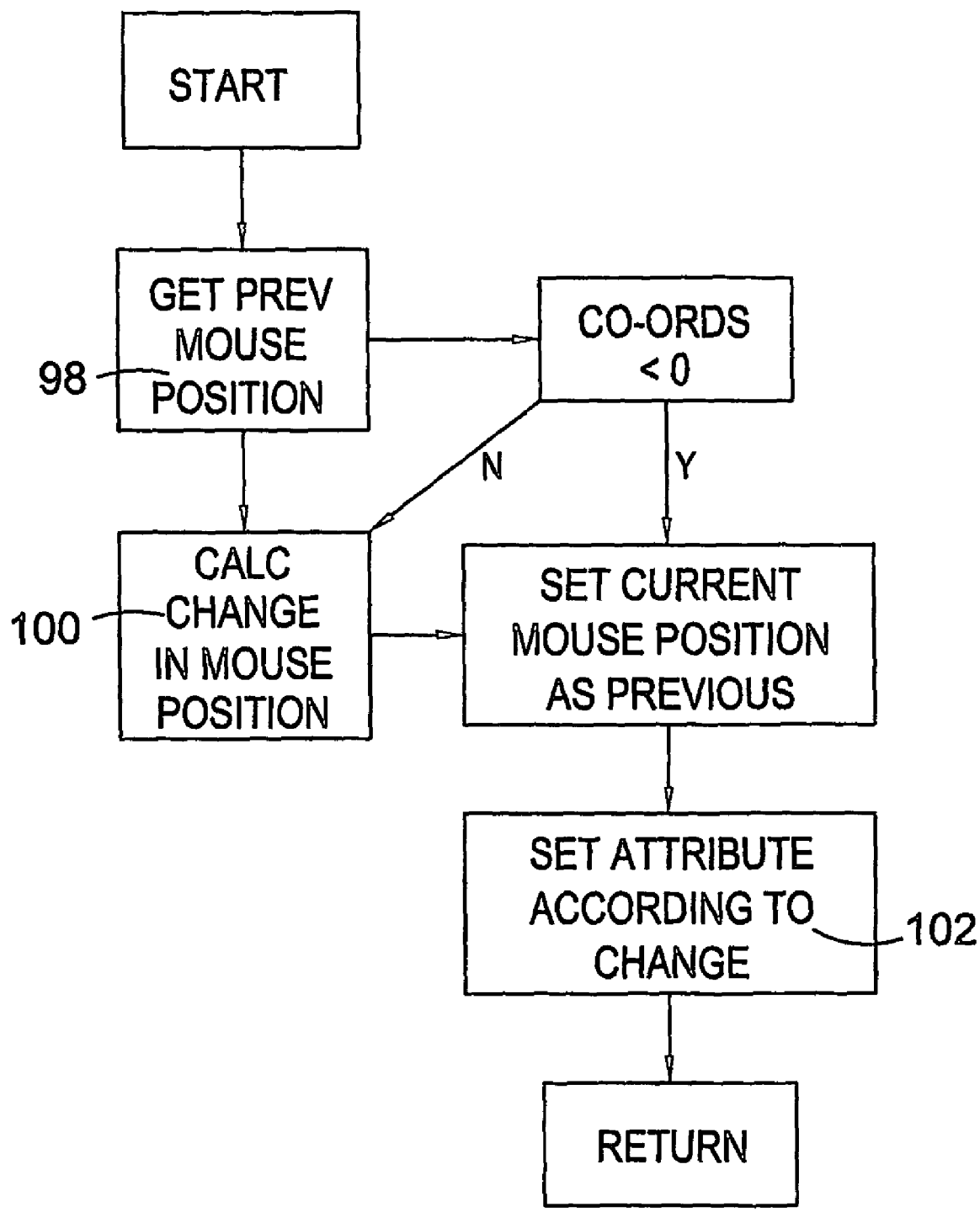
Figure 8:
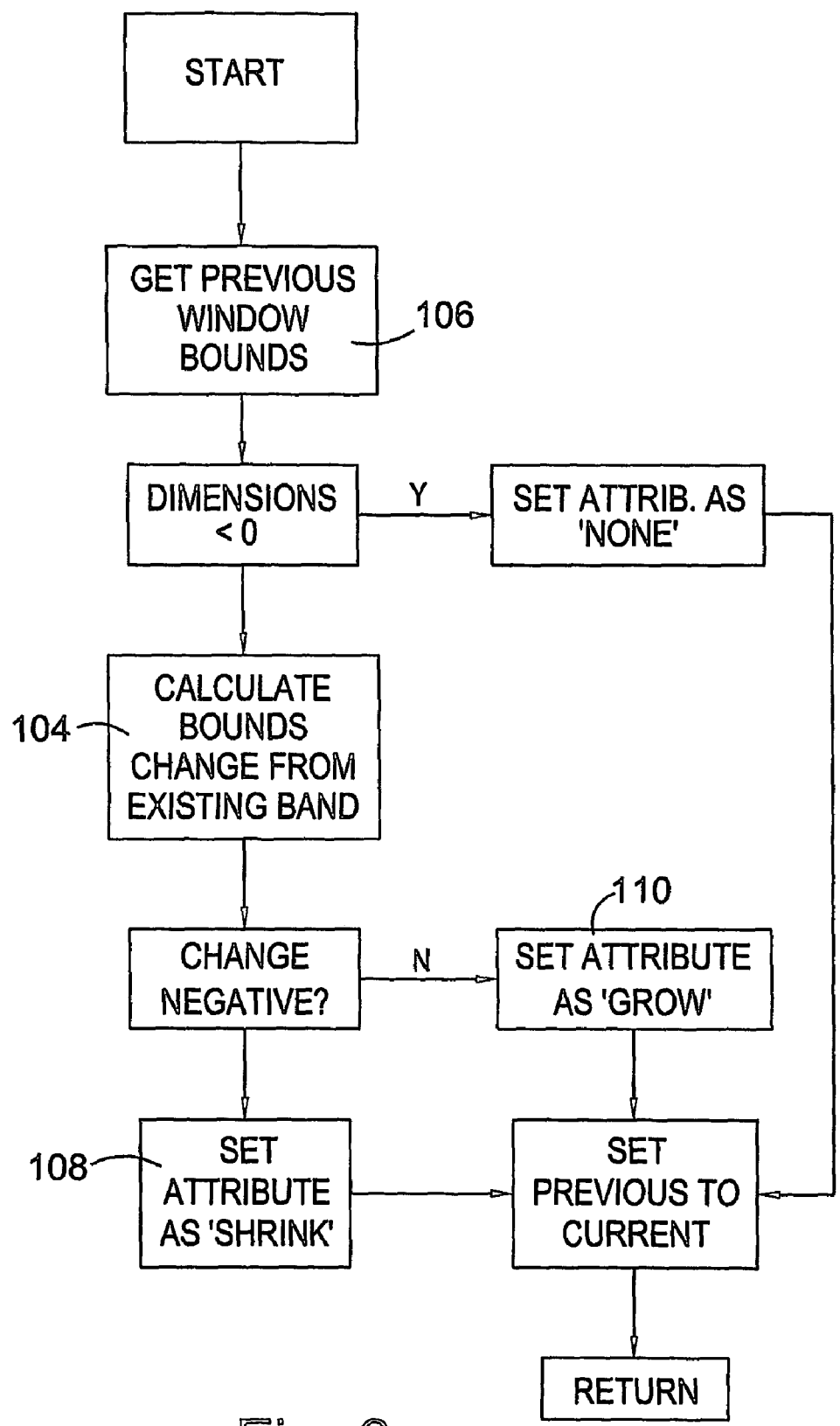

In FIGS. 7 and 8 specific handlers for document scrolling and window resizing, respectively, are shown. To convert a document scrolling action into a more meaningful predicate, the direction of scrolling (up or down) is retained and reset with the changing of documents. The change in mouse position (cursor or wheel) is used 98, 100 to determine the direction of scrolling and the event attribute set accordingly 102. In a similar way, changes in window size are monitored. When a resize event takes place the change in window width and height is calculated 104 from the original dimensions of the window 106. Again the event attribute is set accordingly 108, 110.

2.2. Read Thread

Figure 9:
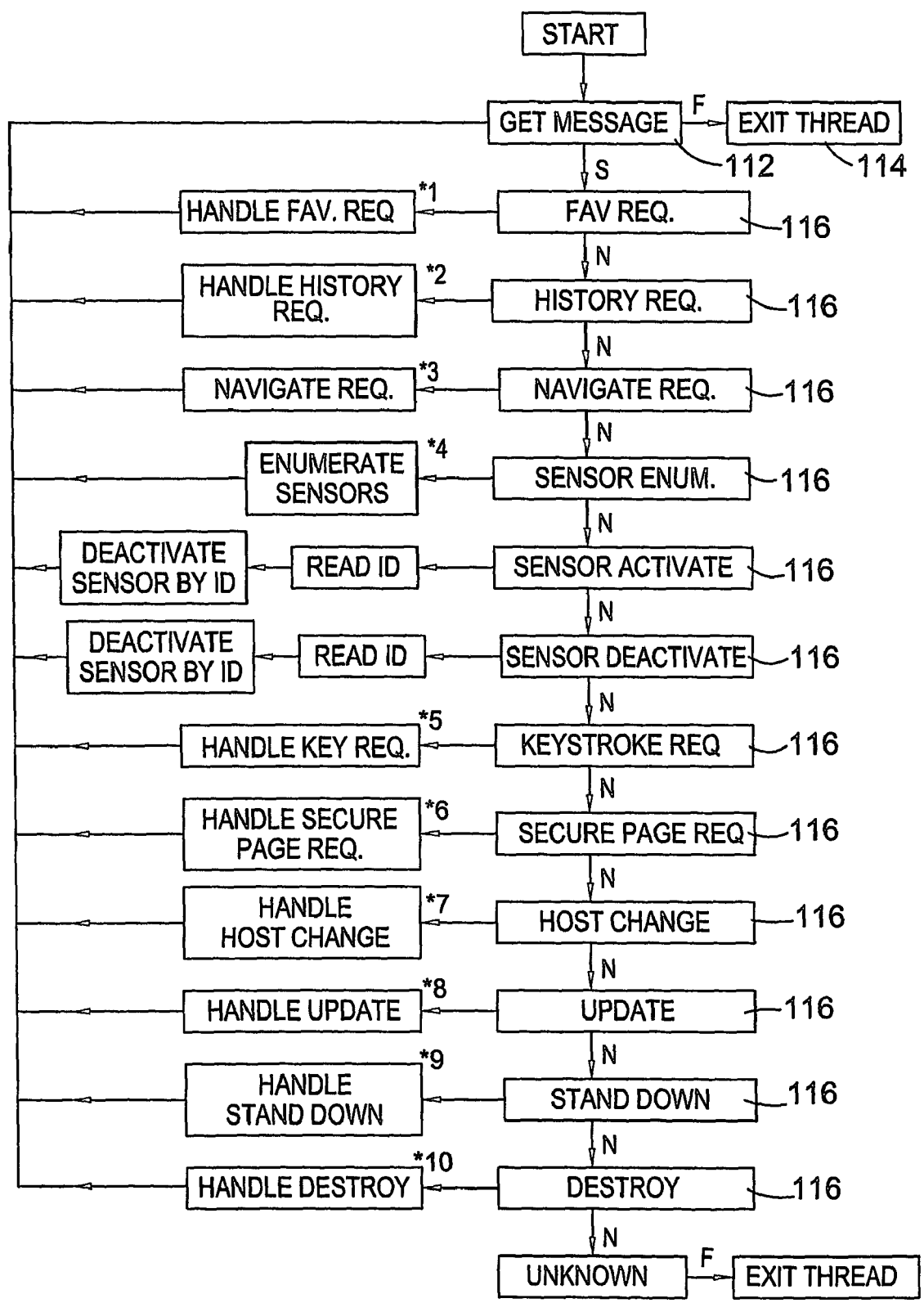

FIG. 9 shows the concurrent procedure for reading any instructions or requests received at a sensor from the remote server host. As an example, the host may send a message to the sensor to de-activate it. As part of the procedure, a single byte is read 112 from the connection representing a request identifier, the procedure waits until one is available to be read. Failure to read the identifier causes the thread procedure to exit 114. Otherwise, one of the specific handlers 116 depicted in FIGS. 10 to 19 is used according to the identifier read. The following details these handler procedures. It should be noted that any text or other data sent in response to a request may be sent as plain text, or may be encrypted to avoid monitoring, or compressed to reduce bandwidth, if desired.

Figure 10:
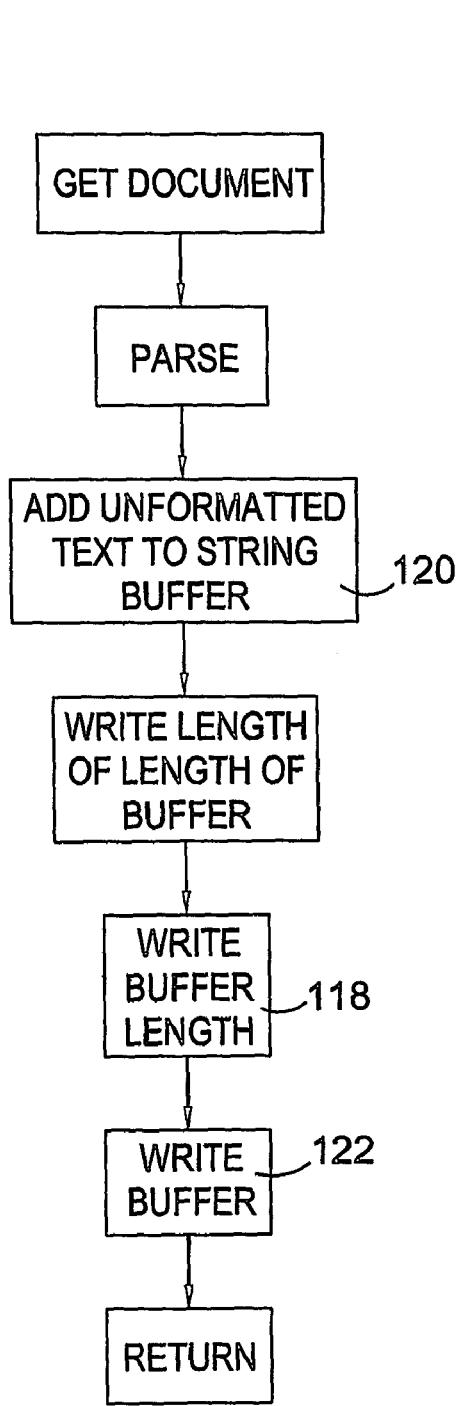

FIG. 10 shows the handling procedure for obtaining a page/content request. The response of this procedure is then handled on the remote server host accordingly (see procedure depicted in FIG. 54). The message identifier is sent along with the length of content buffer 118. The content itself 120 (plain text although any binary data could be sent) is then sent in the buffer 122 of the specified length.

Figure 11:
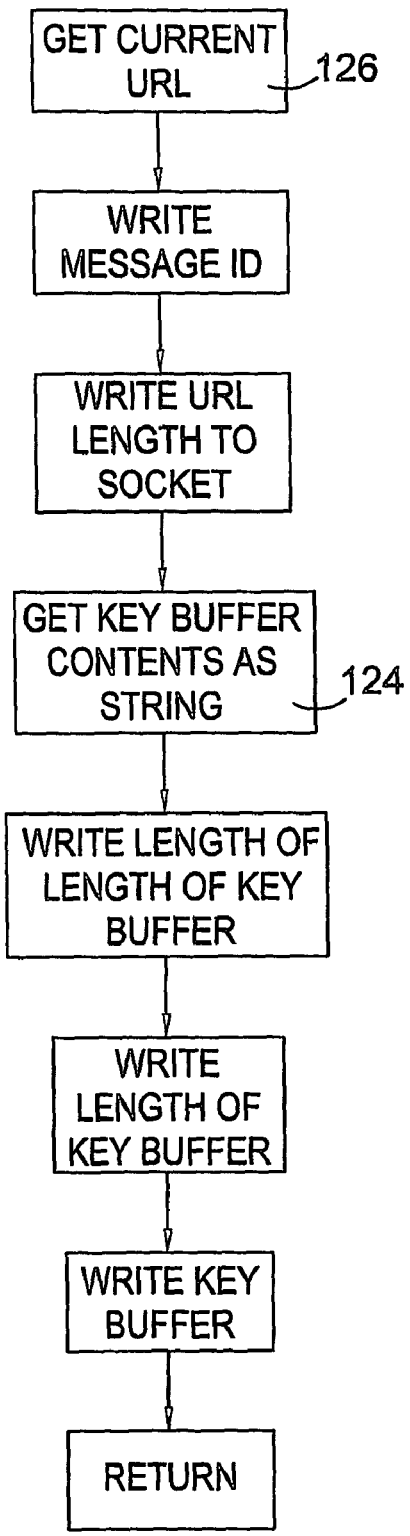

FIG. 11 shows the handling mechanism for the capture of keystrokes. Keystrokes are recorded in a buffer 124 for each page visited and the buffer flushed with each change in site. The reply message contains the actual keycodes (for possible server side processing) and the URL 126 of the document they were associated with.

Figure 12:
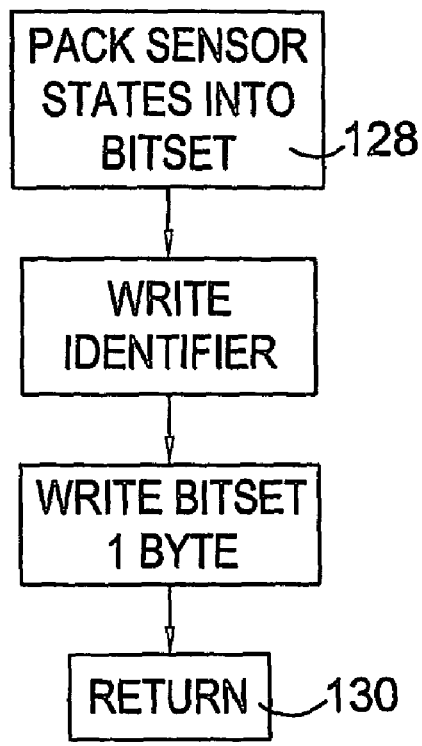
Figure 53:
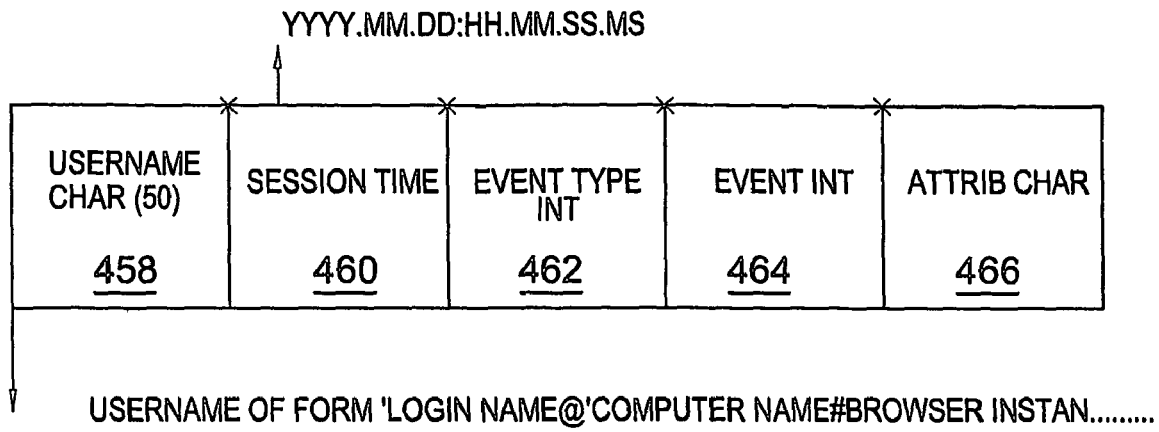

FIG. 12 depicts the response to a sensor enumerate request. This is used to notify the remote host what events are being monitored on the current sensor instance. The server side handling of this notification is shown in FIG. 53. The message sends an array of ordered bits 128 representing the state of capture of each type of event before returning 130.

Figure 13:
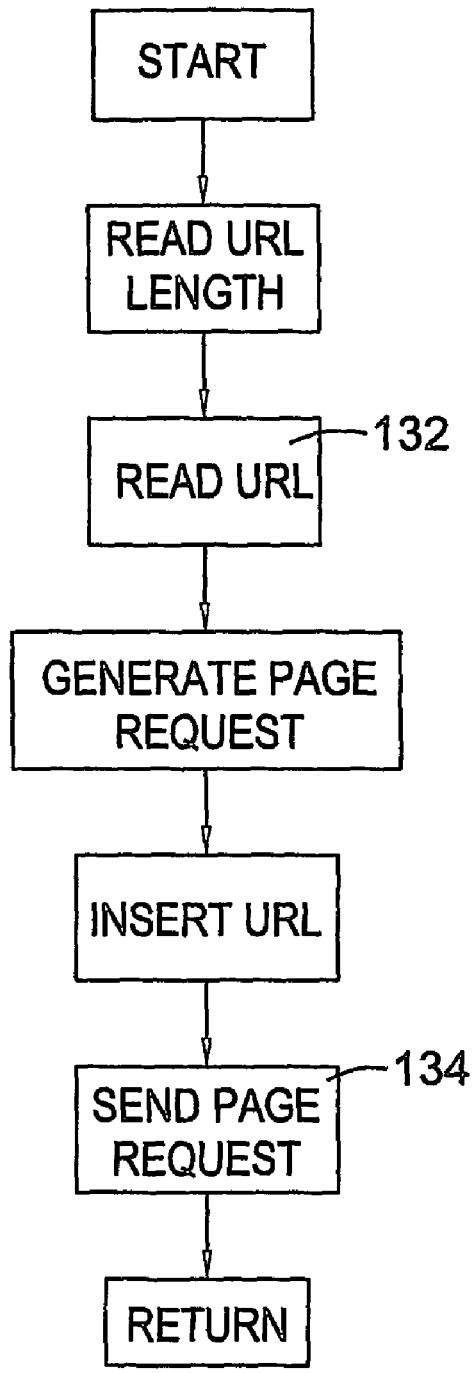

FIG. 13 shows a navigate request being handled. This forces the browser to display the site specified in the request 132 by sending the appropriate HTTP request 134 to the server specified by the URL.

Figure 14:
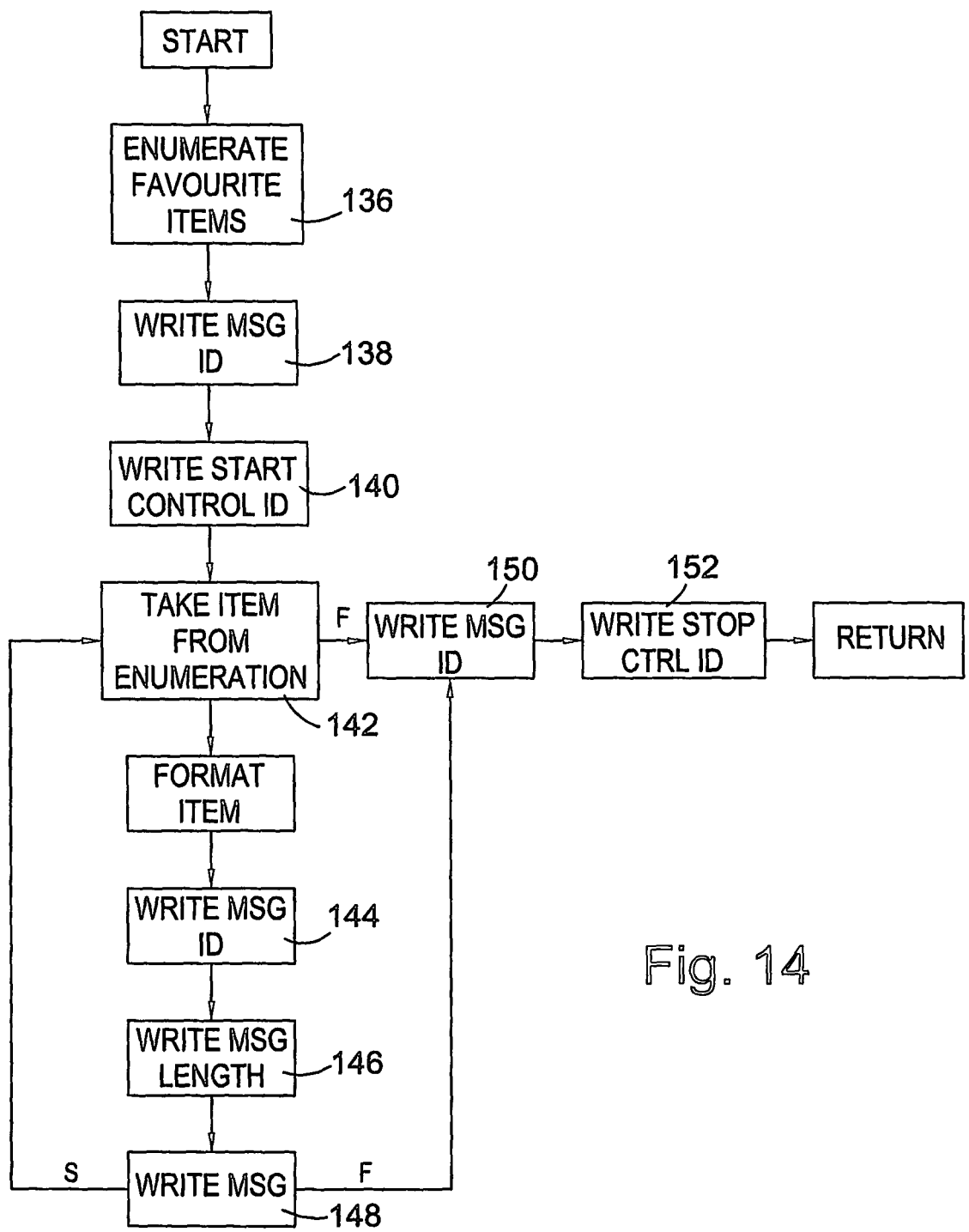
Figure 15:
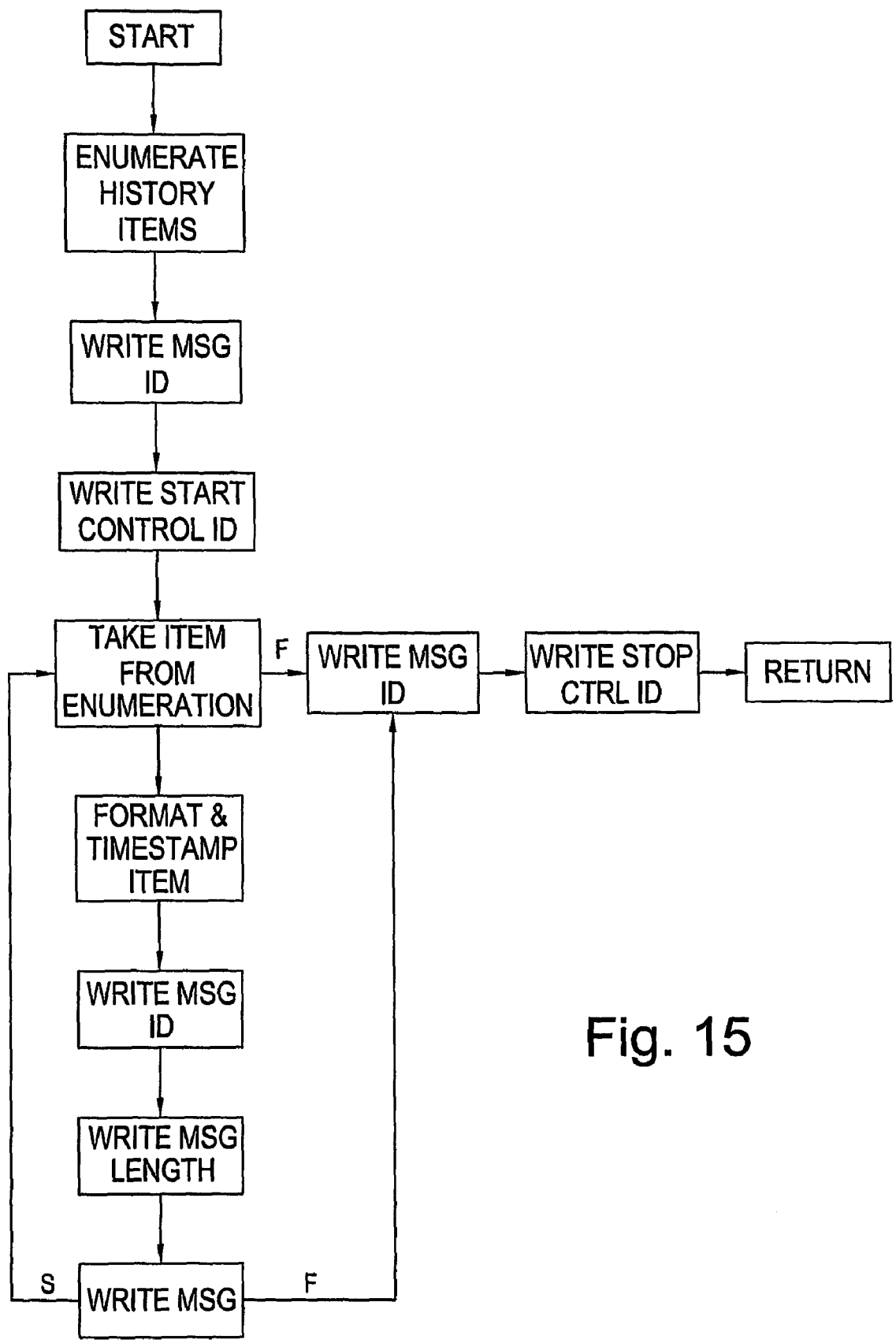
Figure 49:
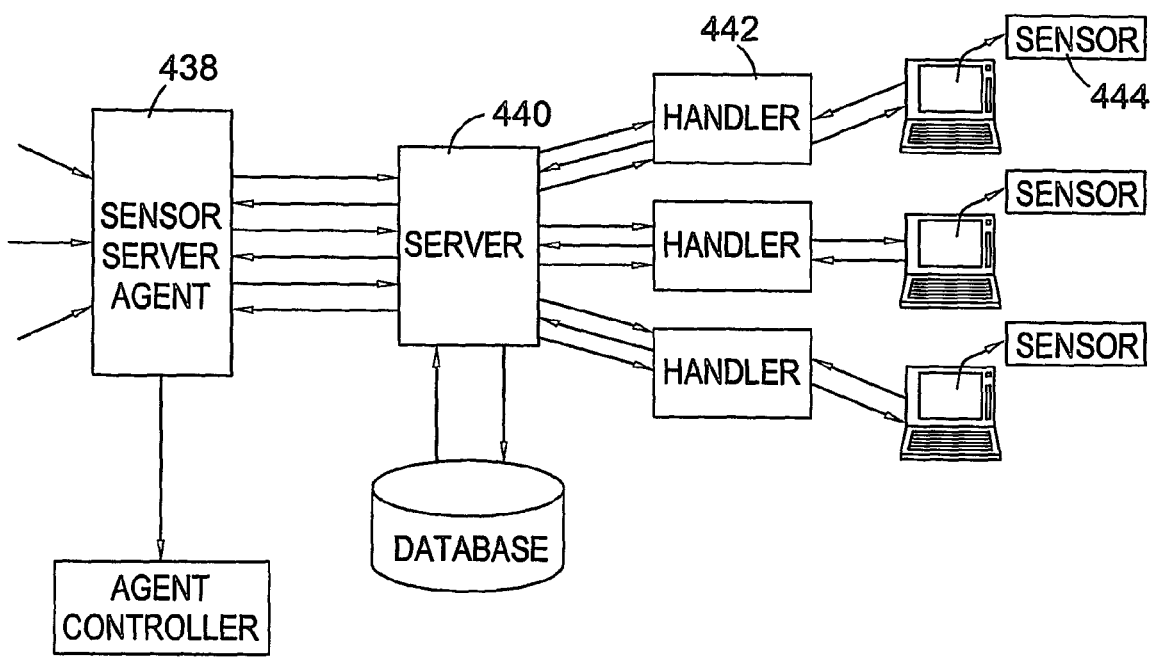
Figures 50, 51:
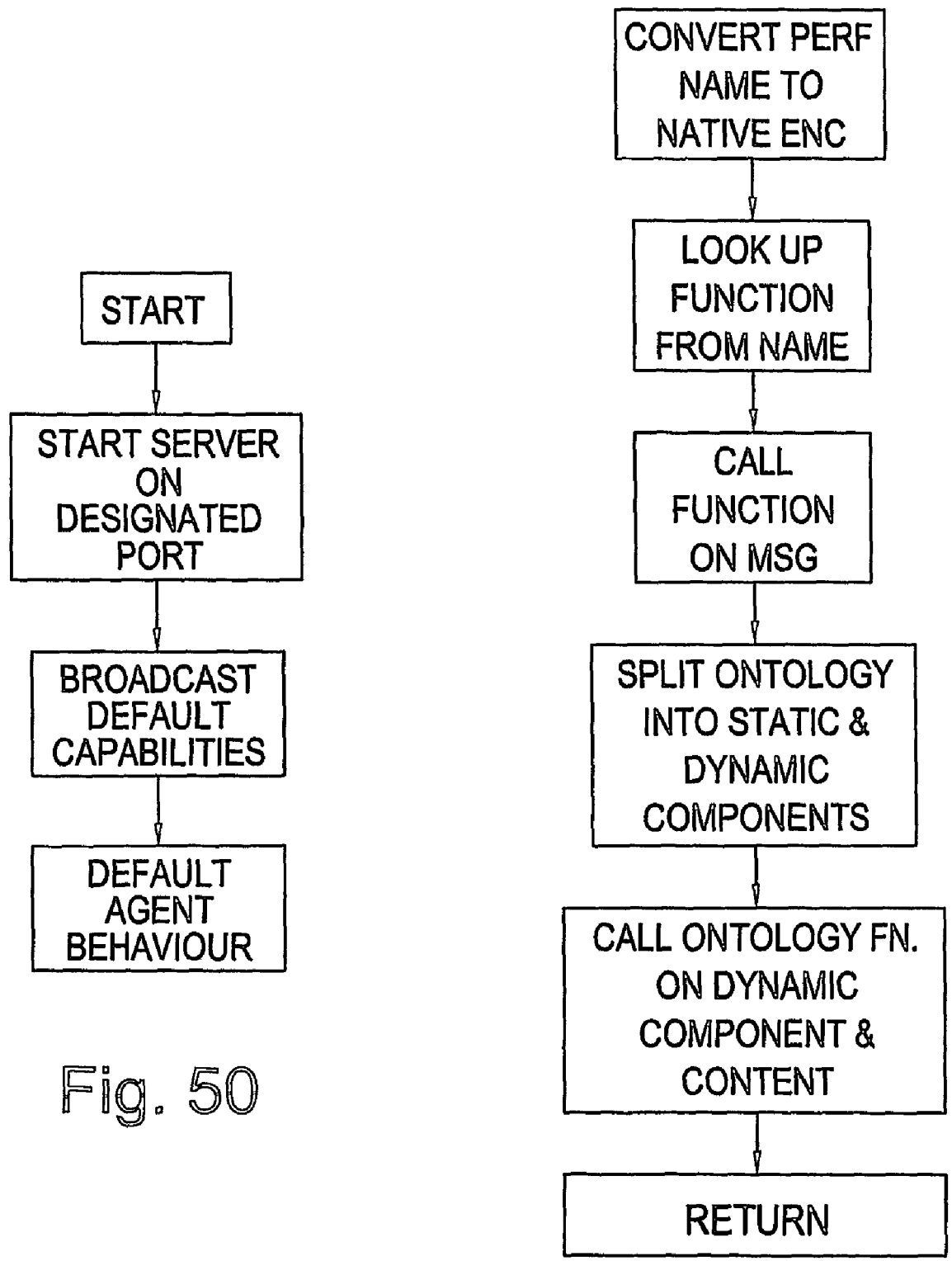

FIGS. 14 and 15 show the functionally similar favourite and history request handlers, whose responses correspond to the procedures illustrated in FIGS. 49 and 50 respectively. In both cases the requested set of items are enumerated 136 which leads to a list of timestamped URLs. The message identifier is written to the connection 138 followed by a zero (item length is zero since a control code comes next) and a start control code 140. Then for each item in the list 142, the message identifier is sent 144, followed by the length of the formatted message 146 and the message itself 148. When the list is exhausted, a message identifier is sent 150 followed by a zero and finally the stop control code 152. In the case of the History request, the format of the message incorporates the URL of the page, the time the page was visited and the title of the age. In the case of the Favourites (Bookmarks), the message contains the URL of the page, the user's description of the page and the time that the user added it to the favourites repository.

In FIG. 16 the handler for a change of server host message is shown. This message is sent by the server host to inform the sensor that the next time the sensor initialises (that is, the next instance that is created) it is to attempt to connect to the specified host every time thereafter. First the length of the network address is read from the connection 154, then the network address itself 156. The network address is then committed to persistent storage as the preferred remote host 158.

FIG. 17 shows the stand down handler. This request causes the sensor to send a 'Quit' message 160 (with attribute set to indicate that it was forced) to the remote server host. The shutdown procedure 162 illustrated in FIG. 5 is then followed and the host application carries on its execution unaware of sensor disengagement. Such a message may be sent by the remote server host when the number of sensor connections is too great or when there is no further requirement of information from this particular sensor instance.

Figures 18, 19:
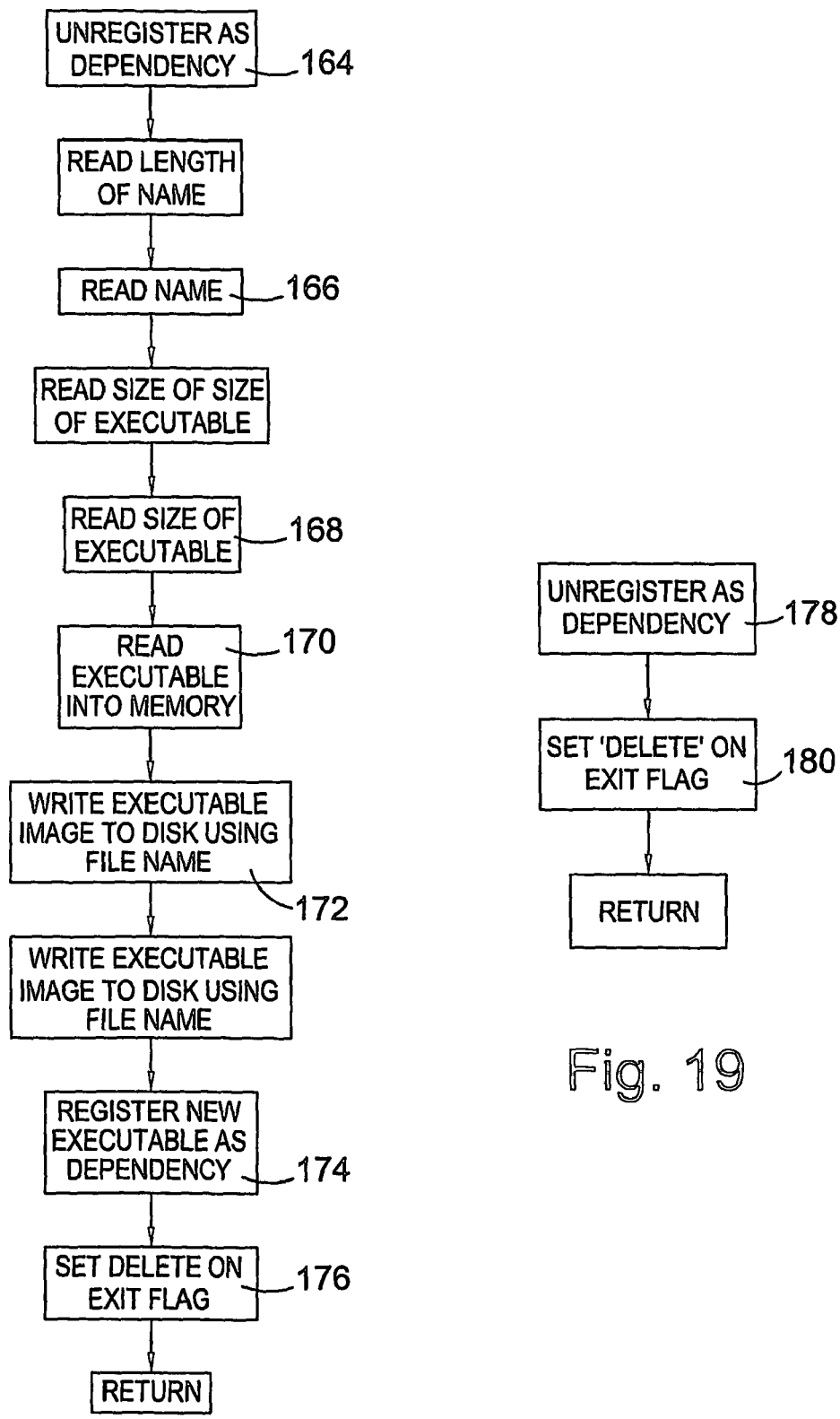

FIG. 18 shows the handler for a sensor update. The purpose of this message is to remotely update the sensor. The first thing the currently installed sensor does is to unregister itself as a dependency of the client host application 164. Then, the name of the new sensor is read from the connection 166, followed by the size in bytes of the sensor 168. The specified number of bytes is then read into a buffer in memory 170 and then written to disk 172. The new sensor is then registered as a dependency of the host application 174 and will be loaded, deleting its obsolete predecessor in the process 176, when the next instance of the host application is created.

In FIG. 19 the 'destroy' handler is shown. This is sent by the server when it no longer wishes to receive data from any instance of the sensor at this location. First the sensor unregisters itself as a dependency of the client host application 178 so that it is not sought the next time it executes. Then a flag is set 180 specifying 'delete on exit'. When the 'sensor' completes its shutdown procedure and the last instance of it is unloaded from memory, it deletes itself.

3. Setup/Installer/Auditor

Figure 20:
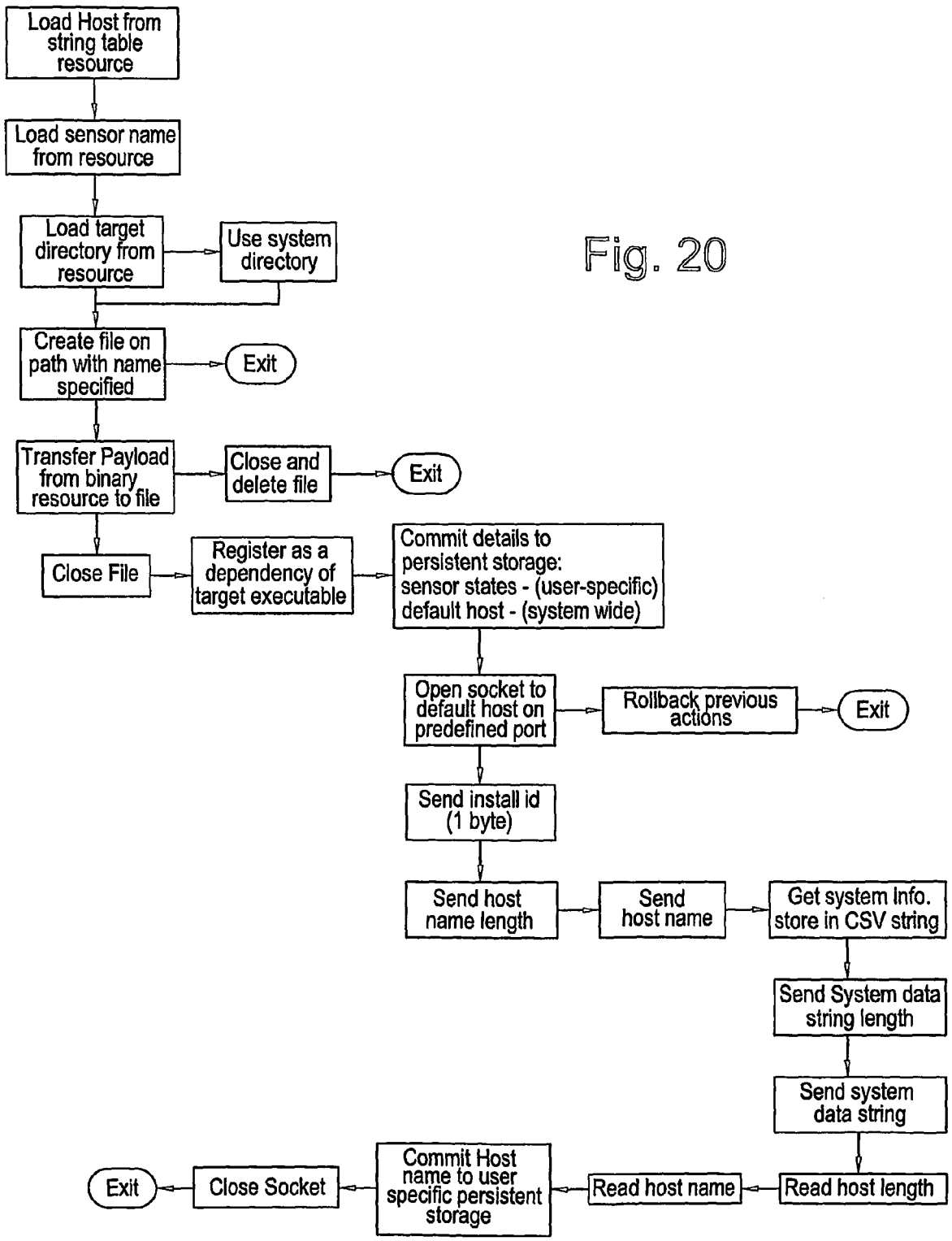
FIGS. 20 to 22 show a thread for operation of the Installer agent.

FIG. 20 depicts the primary thread of the installer. Sensors are installed on target machines using a small installer application in which they are embedded. Unlike most installers, this application registers its progress with a remote agent (this feature is not essential, although it is preferred). Although capable of taking several forms (a network install, conventional installer application, executable) the general way of working is the same even if the means of invoking it is not. The Installer contains the host name of the server it is to notify of installs and uninstalls of the sensors. On the aforementioned host is the auditor agent. This agent is described under section 4.4.6 below ('Notifier'). The information the Installer communicates to the Notifier Agent upon successful install includes: machine name; operating system version; processor; install time. In its reply, the Notifier Agent communicates the IP address and port number of the host the sensor is to connect to upon its instantiation. In future this may be used to balance loads throughout multiple distributed systems but at present it is merely to retain an audit of sensor instances currently active.

The installer makes use of 'resource containers'. For convenience, resources used by applications such as icons, audio files and text strings (this is not an exhaustive list—anything can be used as a resource) can be encapsulated into the executable file that requires them enabling applications to be entirely self contained. At runtime, the executing code can then access and reference these resources by an identifier specified at compile time. Alternatively it can enumerate the entire contents of the resource table sequentially.

When the installer starts it first retrieves the name and path of the sensor binary image from a string table resource stored within the installer executable. Failure to retrieve these values results in default values of a default name and the system directory being assigned to the name and path respectively. The name and path are then used to create a file to which the sensor binary image will be written, failure to create this file causes the installer to exit.

The binary data which constitutes the executable portion of the sensor is also stored as a resource within the installer executable and is retrieved and written in its entirety to the aforementioned file. This data may be compressed and/or encrypted for compactness and obfuscation. The sensor is then registered as a dependency of the target executable. At this stage configuration details are entered into persistent storage: initial Sensor states are stored as user specific settings while the default host is stored as a system wide setting. On multi-user machines this will enable the sensors to contact a remote host regardless of whether it has been their account the installer was run in.

Using the default host name retrieved from the string table resource (and set using the configurer application described below) the installer establishes a connection to an instance of an Install Notifier agent to which it sends a single byte denoting an installation and the name of the machine it is currently executing on. The installer then uses the functionality provided by the host operating system to query the processor architecture and operating system version which it then sends in the form of a comma separated string to the Notifier agent. The Notifier agent sends back a string containing the name of a host that the sensor is to use to report back to when it first executes within the context of the intended target application. The installer places this host name in the user specific section of persistent storage. The socket is then closed and the installer exits.

Figure 21:
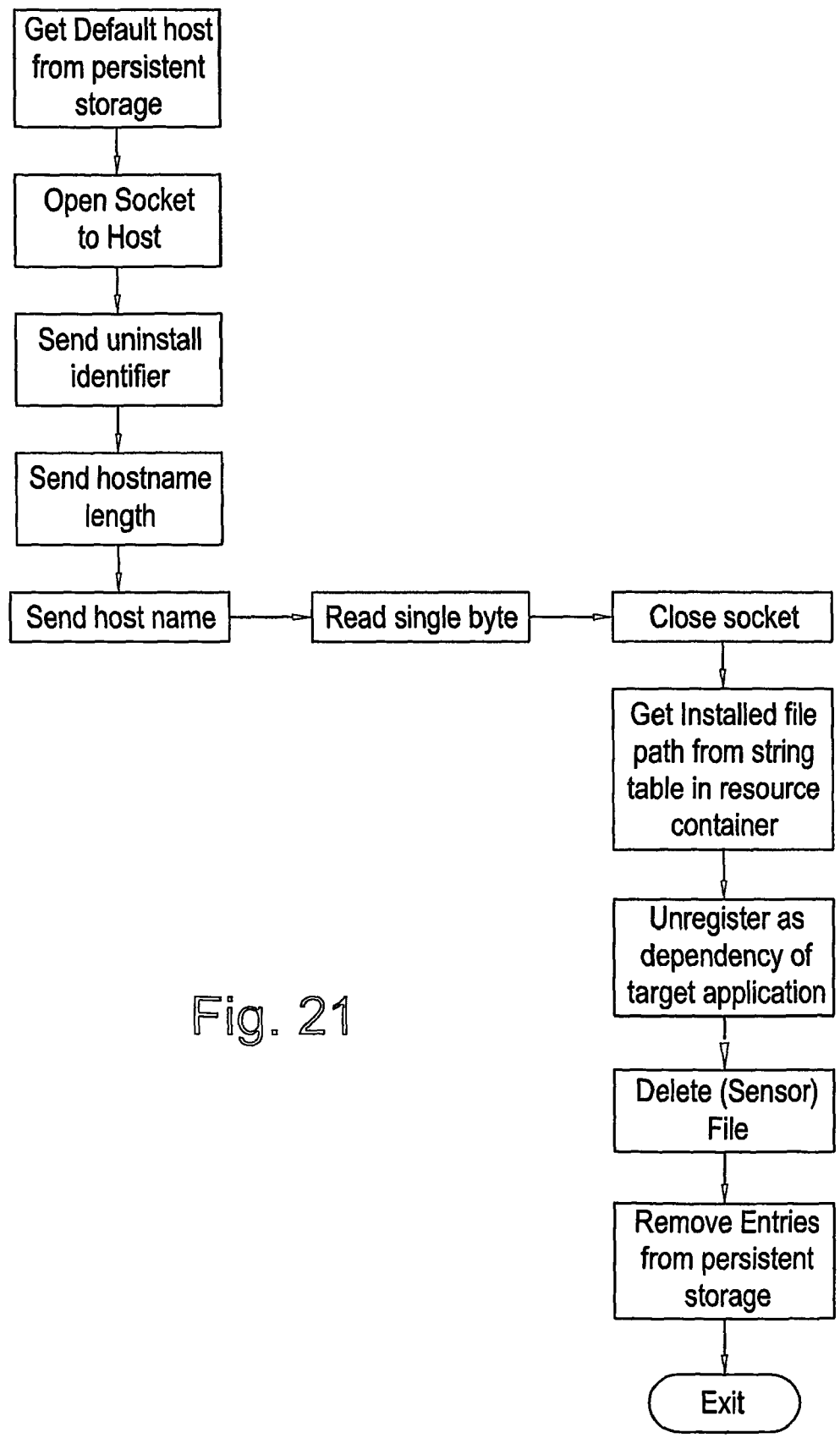

FIG. 21 shows the uninstall process. The installer first retrieves the default host name from persistent storage which it then uses to contact the Install Notifier server that it contacted when it originally made the installation. Upon making the connection, it sends a single byte denoting the uninstall process followed by the host name length and the host name. When the Notifier sends a single byte of acknowledgement the installer closes the connection, unregisters the sensor as a dependency of the target application, deletes the sensors binary image and removes all entries placed in persistent storage during the install.

Figure 22:
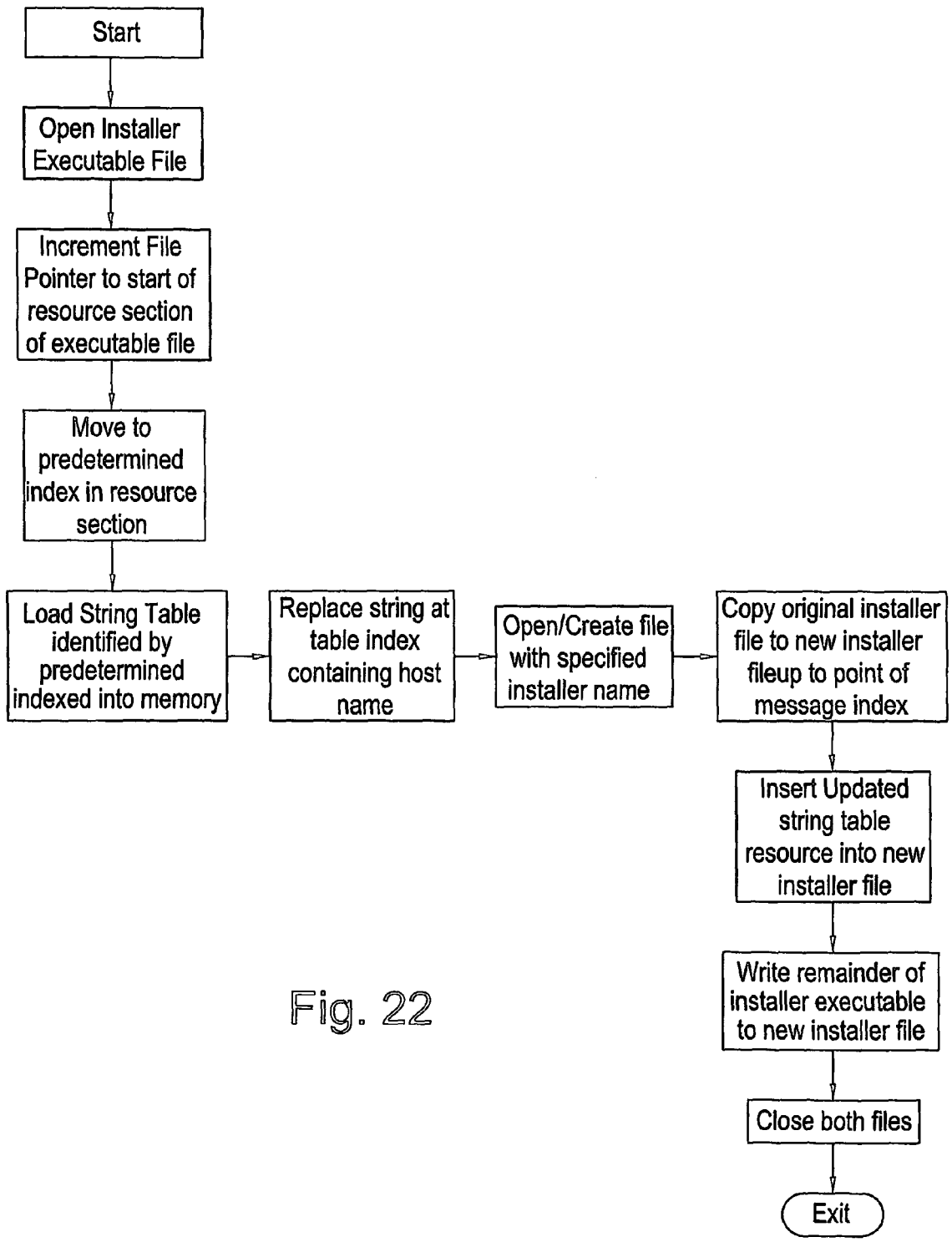

In order to inform the installer as to which remote host it is to notify of its intention to install a Sensor instance, the executable file which constitutes the installer is physically modified. A separate application is used to perform this task, its main thread of execution is shown in FIG. 22. This tool prompts an administrative user for a hostname, a sensor filename and an install path as well as (optionally) an installer file name which it then uses to configure the installer in the way described in the following.

To change the installation path, the sensor file name and the primary host name, the configurer opens the installer executable, reads up to the point where the resources are contained and loads the string table at a predefined index into memory. A string table, as the name suggests is a table of strings indexed by unique identifiers that enable these strings to be retrieved (but not modified) during the execution of the executable part of the installer application. The configurer then uses the predefined identifiers of the resource strings to lookup their values in the string table and replace them with those specified by the administrative user.

Finally the original installer executable file is copied up to the point of the string table into a newly created/opened file possibly named to reflect the host and path combination selected. The string table is then copied from memory to the new file followed by the remainder of the original file (the portion that exists beyond the location of the string table).

4. Generic Agent Structure

Figure 24:
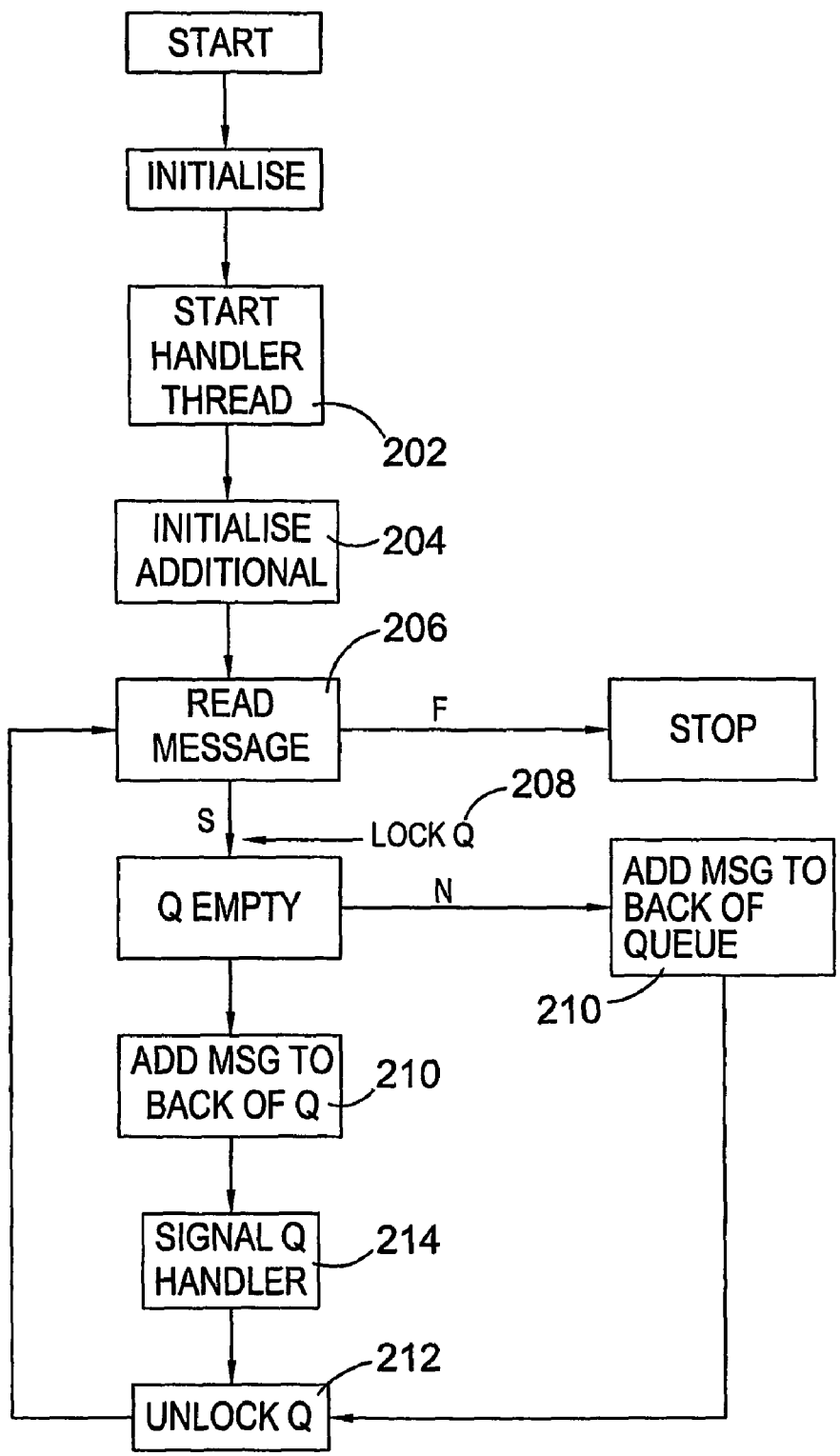
Figure 25:
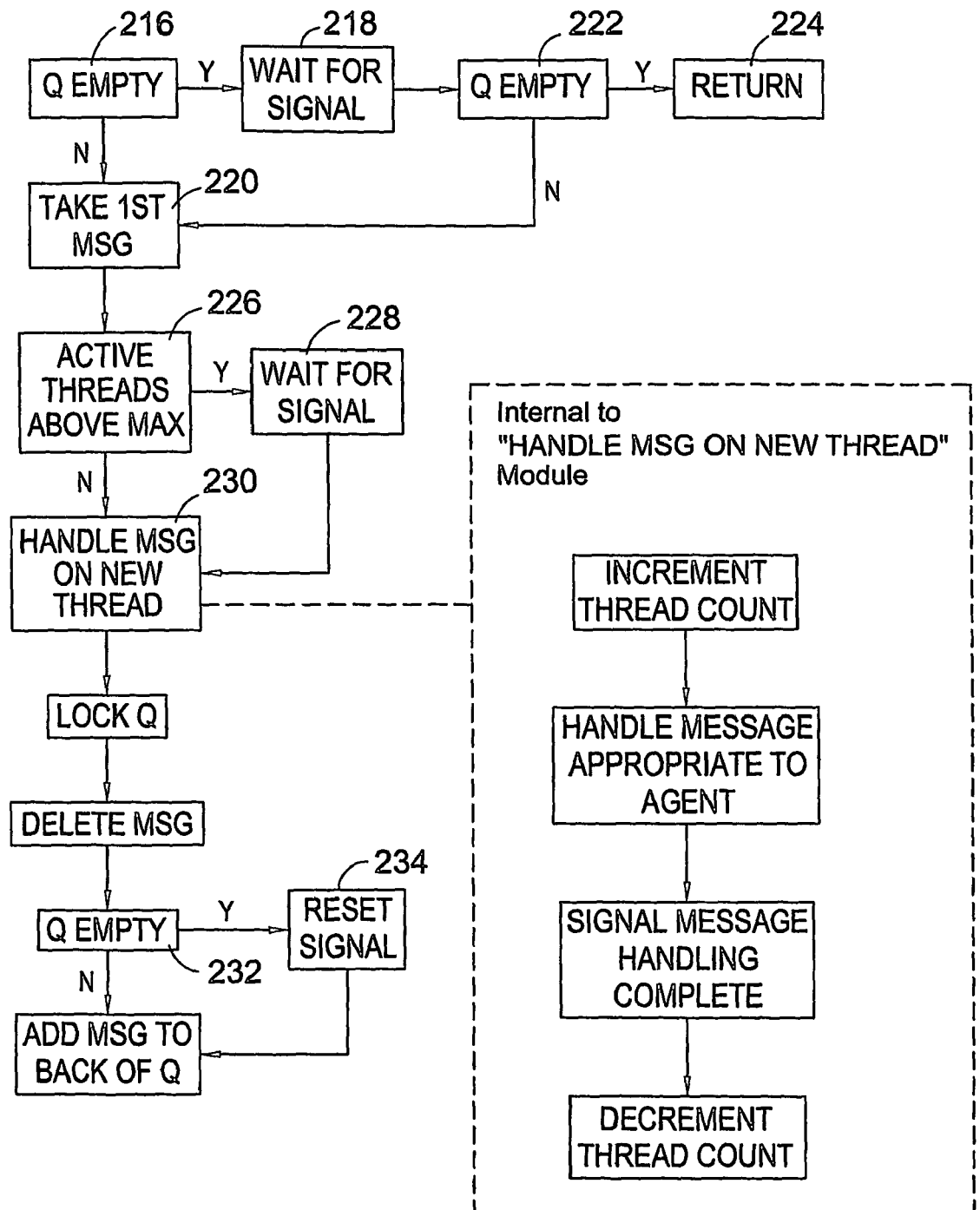
Figures 26, 26A:
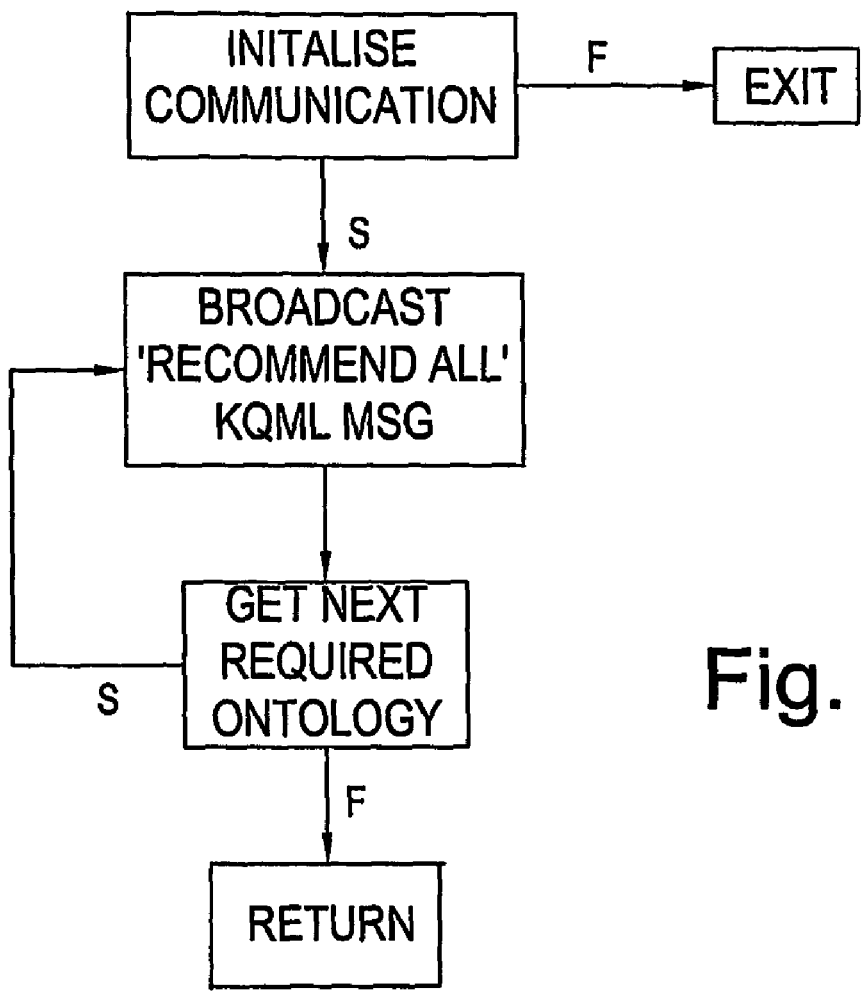

All of the following agents discussed here adopt a generic structure originally outlined in Finin et al. (Finin, T., Fritzson, R., McEntire, R. & McKay, D. KQML as an Agent Communication Language. Proceedings of the 3$^{rd}$ International Conference on Information and Knowledge Management. 1994) but modified to comply with more recent practices in software engineering. In connection with this generic structure, FIG. 24 depicts the primary thread for each agent, FIG. 25 depicts the incoming message handling thread for each agent, and FIG. 26 depicts the message handling thread for each agent.

Figure 23:
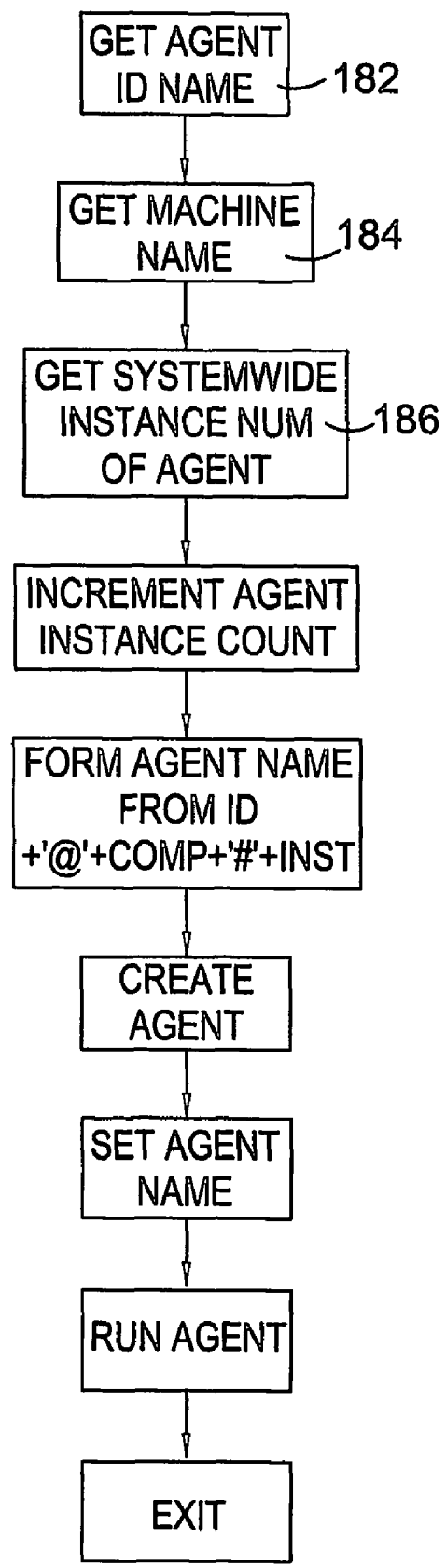
FIGS. 23 to 35 show various agent procedure threads.

At the beginning of execution, each agent must assign itself a unique identifier so as not to cause ambiguity in communication with other agents. FIG. 23 shows this procedure. Agents are named using a combination of the identifier each type of agent has 182, the host the agent is running on 184 and the number of instances of that agent executing 186. A typical agent identifier may be as follows— COMPACTOR@OMAHA#3—where COMPACTOR is the agent type, OMAHA is the host computer, and #3 represents the third instance of the COMPACTOR agent running on the OMAHA host.

Figure 27:
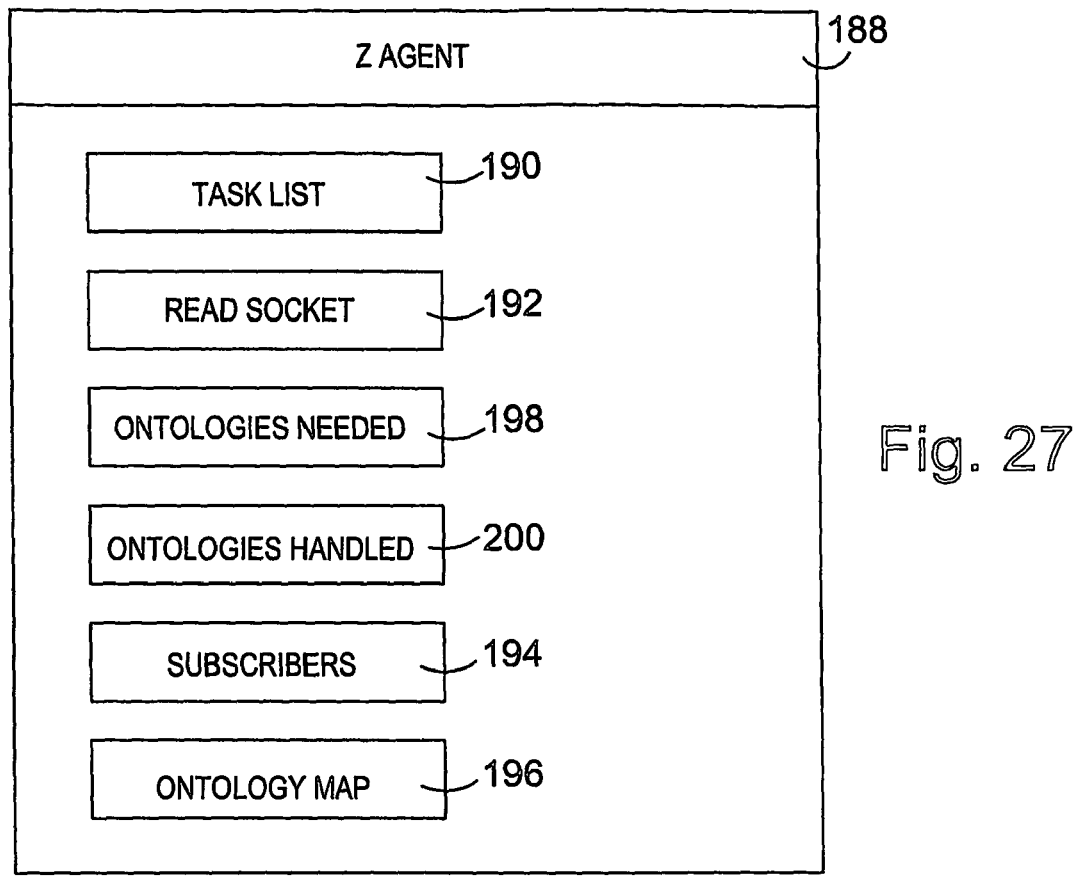
Figure 28:
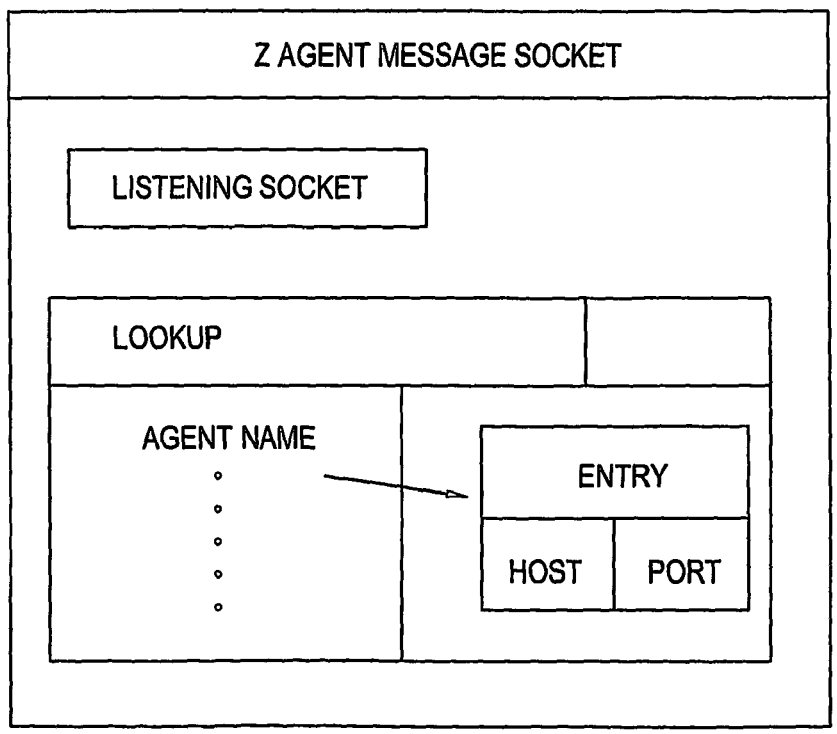
Figure 29:
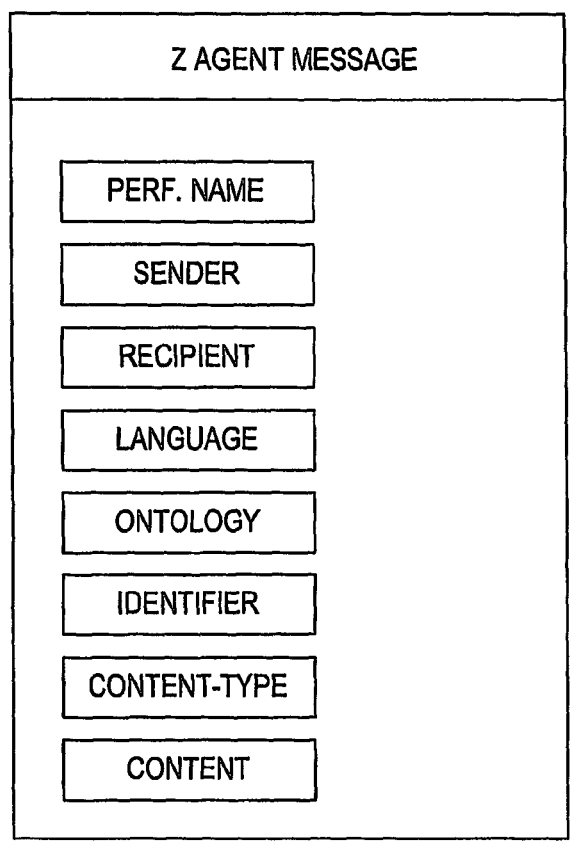

FIGS. 27 to 29 show the components of a generic agent in increasing detail. FIG. 27 shows the generic structure of an agent 188, of particular interest are the Task List 190 (operations detailed in sections 4.1.2 & 4.1.3) and the Read Socket 192 (detailed in 4.2.1 to 4.2.3). The Read Socket's own structure is illustrated in FIG. 28, while the structure of the messages it sends and receives is pictured in FIG. 29. Also shown in FIG. 27 are the lookup tables for subscribing agents 194, ontology providers 196 and lists of ontologies required 198 and ontologies capable of being supported 200.

4.1.1. Agent Initialisation

When an agent starts up it first has to find a transport address for communicating with other agents (this process is detailed in section 4.2.1). Once it has the capability to communicate, the agent then broadcasts the ontologies it supports using 'advertise' messages and broadcasts 'recommend' messages for the ontologies it requires to function. The agent can then start handling messages. By ontologies, it is meant collections of functionality.

4.1.2. Main Agent Thread

The main agent thread of execution is shown in FIG. 24. First the agent message handler thread is started 202, which allows the concurrent processing of messages detailed in section 4.1.3. After this any further initialisation specific to the particular agent is carried out 204, this may include but is not limited to connecting to a database, displaying a user interface or making a network connection. Once all initialisation is complete, the agent can start reading incoming agent messages from the transport medium 206. The reading of agent messages is detailed in section 4.2.2. When a message has been read the message queue is first locked 208 to prevent any other thread (specifically the message handling thread) from accessing it. The message is then placed at the back of the queue 210 and the queue unlocked 212. If the queue was empty prior to the message being added, the main thread signals 214 to the message handling thread that this is no longer the case (detailed in 4.1.3). This process repeats in a loop until the message source is shutdown.

4.1.3. Message Queue Handling Thread

The thread of execution for the agent message handler is shown in FIG. 25. This concurrent process is used to handle individual messages in time sequential order. If the queue is empty to begin with 216, the thread waits to be signalled 218 from the message reading (main) thread of execution, otherwise it removes the first message from the queue 220. If the thread receives a signal and the queue is still empty 222 then the thread terminates 224. Because of the overheads incurred by multithreading, the number of active threads processing messages is limited to a preset maximum. If the current number of messages being simultaneously processed is equal to this maximum 226, then the queue handling thread waits to be signalled 228 by any of the threads handling agent messages of their completion. Once signalled, a new thread is spawned 230 to handle the message being removed from the front of the agent message queue (see also inset of FIG. 25). Agent messages are interpreted and processed according to the behaviour implemented in concrete agent derivations (sections 4.4.1-4.4.12). If, upon removal of this message the queue should be empty 232, then the thread signal is reset 234 causing the thread to wait to be signalled before it attempts to read another agent message.

4.1.4 Agent Termination

Figure 30:
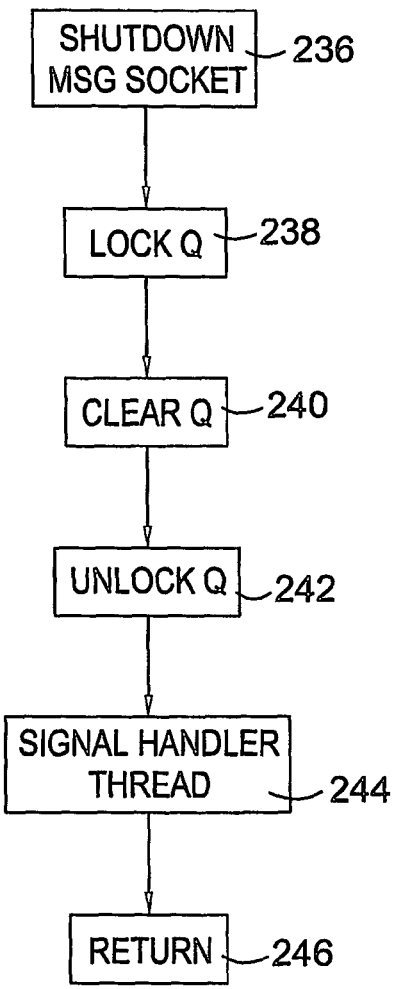

When the agent terminates, whether it be through major communication failure or instruction from another agent, the procedure shown in FIG. 30 is followed. First, the agent stops listening for incoming connections 236 (section 4.2.4). The message queue is then exclusively locked 238, to prevent additional messages being processed. The queue is emptied 240 before being unlocked 242. The message queue handler thread is then signalled 244 to terminate and when it does so the agent exits 246.

4.2. Agent Communication Language

The server agents communicate using a variant of KQML, equipped with XML syntax, allowing complex data representations to be embedded in agent messages. Messages typically contain fields storing sender name, recipient name, content language and content itself as well as a unique identifier.

4.2.1. Initialising Agent Communication

Figure 31:
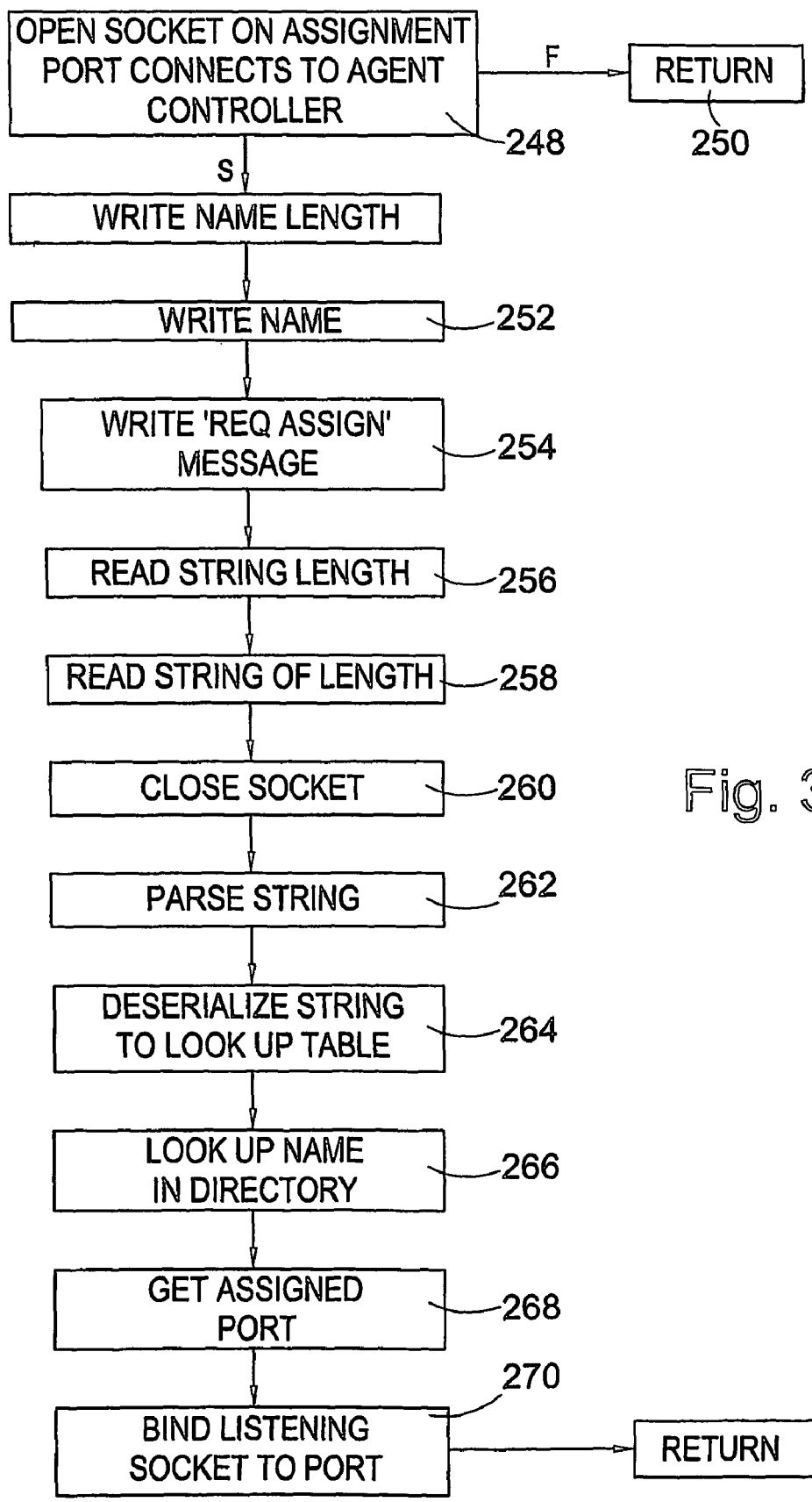

FIG. 31 shows the initialisation process for agent communication. The agent communication socket structure contained within each agent itself contains a permanently listening connection and a lookup table containing the transport addresses of all agents, indexed by agent name. To begin communication an Agent Communication Broker must be present on the system to allow exchanges with other agents (detailed in 4.3). A connection is first opened 248 to the predefined transport address of the Agent Communication Broker, failure at this point causes the agent to terminate 250 since communication with other agents is deemed impossible. When a successful connection is established, the agent sends its name 252 followed by an assignment request message identifier 254. The agent then reads the length of the string in bytes, followed by the specified number of bytes representing the string length 256 and finally the string itself 258. The connection is then closed 260. The string contains an XML representation (illustrated below) of the lookup table data structure which is then parsed 262 and deserialized 264 into the lookup table data structure. The agent then looks up its own name 266 in the lookup table, finds its transport address 268 and begins listening for messages there 270.

4.2.2. Reading Agent Messages

Figure 32:
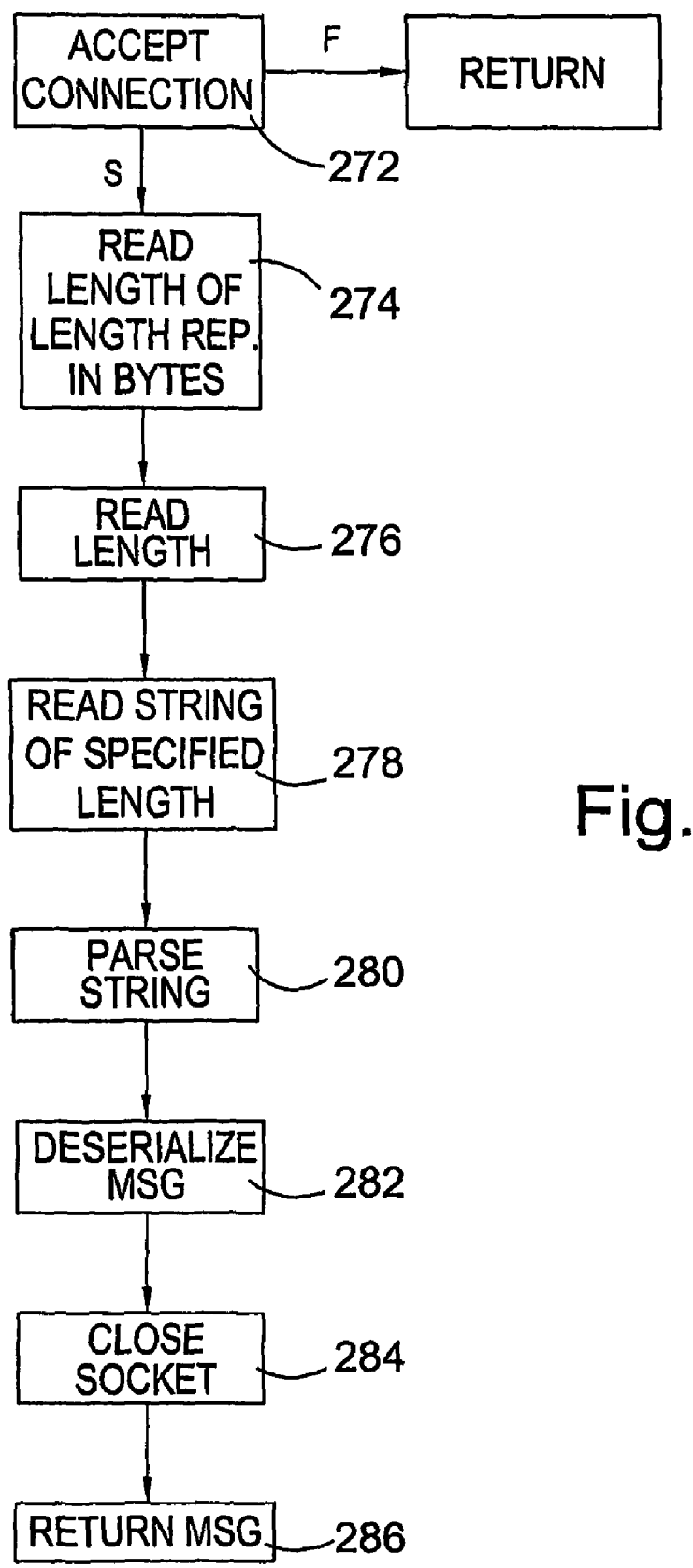

FIG. 32 shows the procedure for reading an agent message. The Message queue loop calls on this procedure to receive agent messages asynchronously, that is the procedure waits for an incoming connection from another agent, rather than repeatedly check and report the connection status. When another agent attempts to send a message to this agent (detailed in 4.2.3.) the listening socket produces a new connected socket 272. The first byte of the message indicates the number of bytes required to represent the length of the message 274. The number of bytes read next is dependent on the value of what was previously read (1 byte, 2 byte short or 4 byte integer) and is assembled into the numeric representation of the message length using bit shifting 276. The next number of bytes is received from the socket until the length value has been read 278. As stated previously, messages are sent in plain ASCII text (single byte character representation) for maximum portability. The string representation of the message is then passed to an XML DOM (Document Object Model) parser or SAX (Simple API for XML) parser 280 where the message is deserialized 282 into a data structure representation by either traversal of the DOM tree or implementing suitable call-back functions respectively. The connection socket is then closed 284 and the message data structure is returned to the message queue handler thread 286.

4.2.3. Writing Agent Messages

Figure 33:
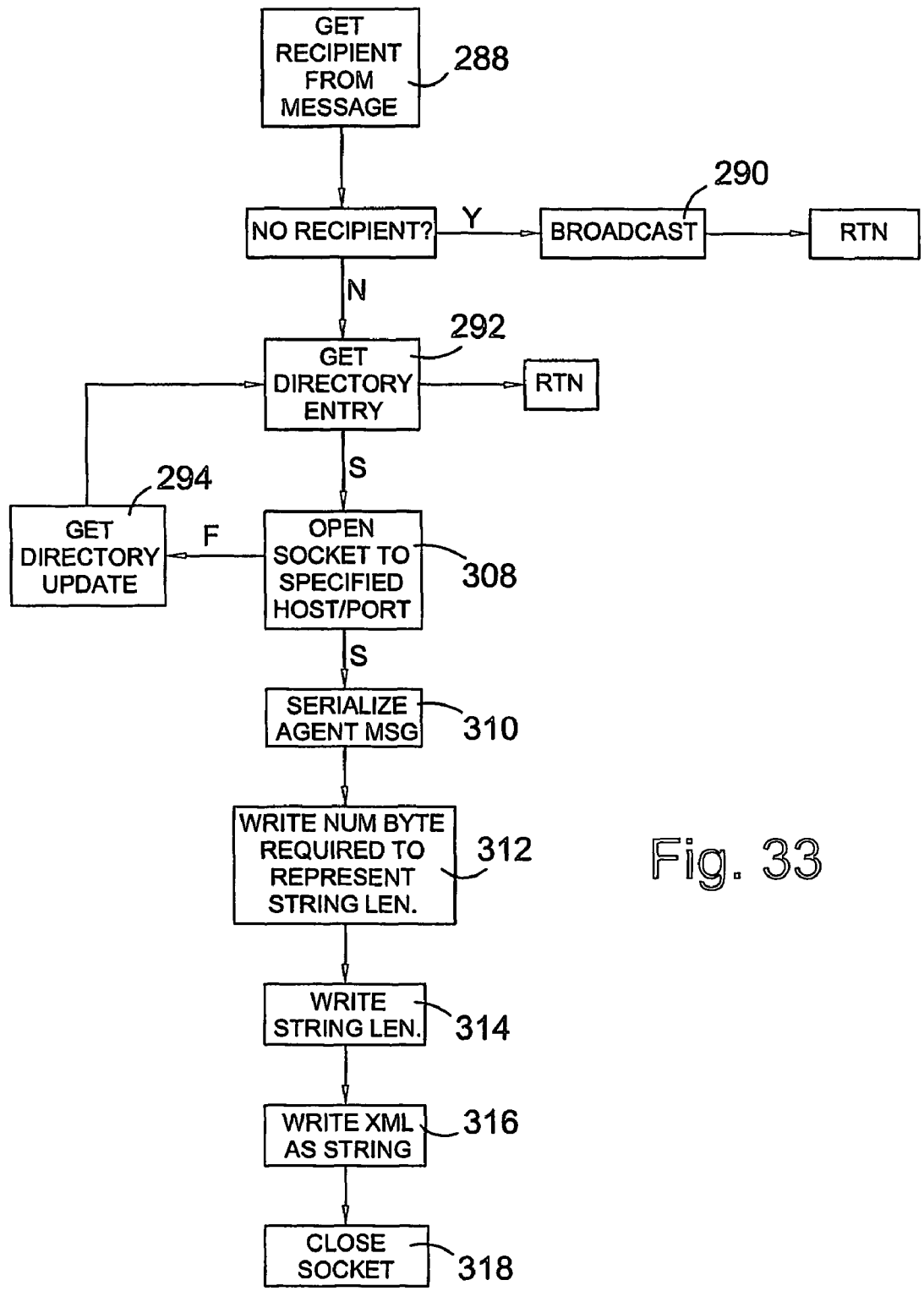
Figure 34:
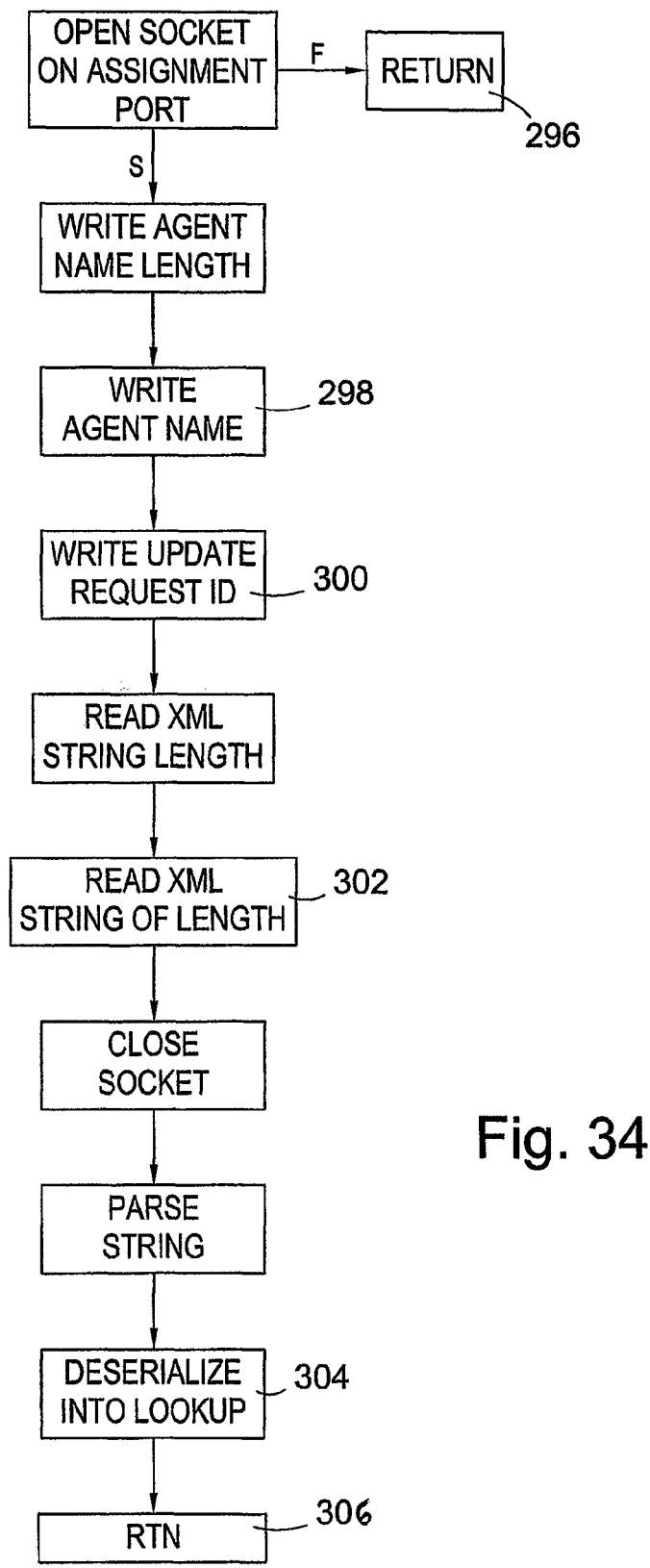

FIG. 33 represents the procedure an agent uses to send messages to another agent. The first step involves reading the value of the recipient field 288 from the agent message data structure. If this field does not exist then it is assumed the message is either malformed or intended for broadcast 290 (see 4.2.3.1). Using the recipient name, the transport address is obtained from a lookup table 292. If this operation fails, the procedure shown in FIG. 34 is followed, in which the agent contacts the agent controller for an update of currently available agents 294.

The transport address for the Agent Communication Broker is fixed to allow any agent (or Agent Controller on another platform) to contact it. If contact with the agent controller fails 296, the agent shuts down except in exceptional circumstances. If the agent is a 'pure source' that is, it depends on no other agent and mainly performs some task, execution will continue. The SensorServer agent (described in section 4.4.9) is an example of this. Upon contacting the Agent Communication Broker, the agent sends its name 298 followed by the identifier of the request it is making 300. It then receives an XML string 302 that can be deserialized 304 into an array of directory entries which the agent uses to update its lookup table. The connection to the Agent Communication Broker is then closed 306.

Returning now to FIG. 33, if the agent name is still absent from the lookup table the message cannot be sent since the recipient is assumed to be either inactive or no longer wishing to receive messages. When the recipient name is found a connection is made using the transport address associated with it 308, the message data structure is serialized to XML 310 and rendered to an ASCII string. A single byte representing the number of bytes required to represent the byte length of the string is sent 312 followed by the length of the string itself 314 and finally the string 316. The connection to the recipient agent is then closed 318.

4.2.3.1 Broadcasting Agent Messages

Figure 35:
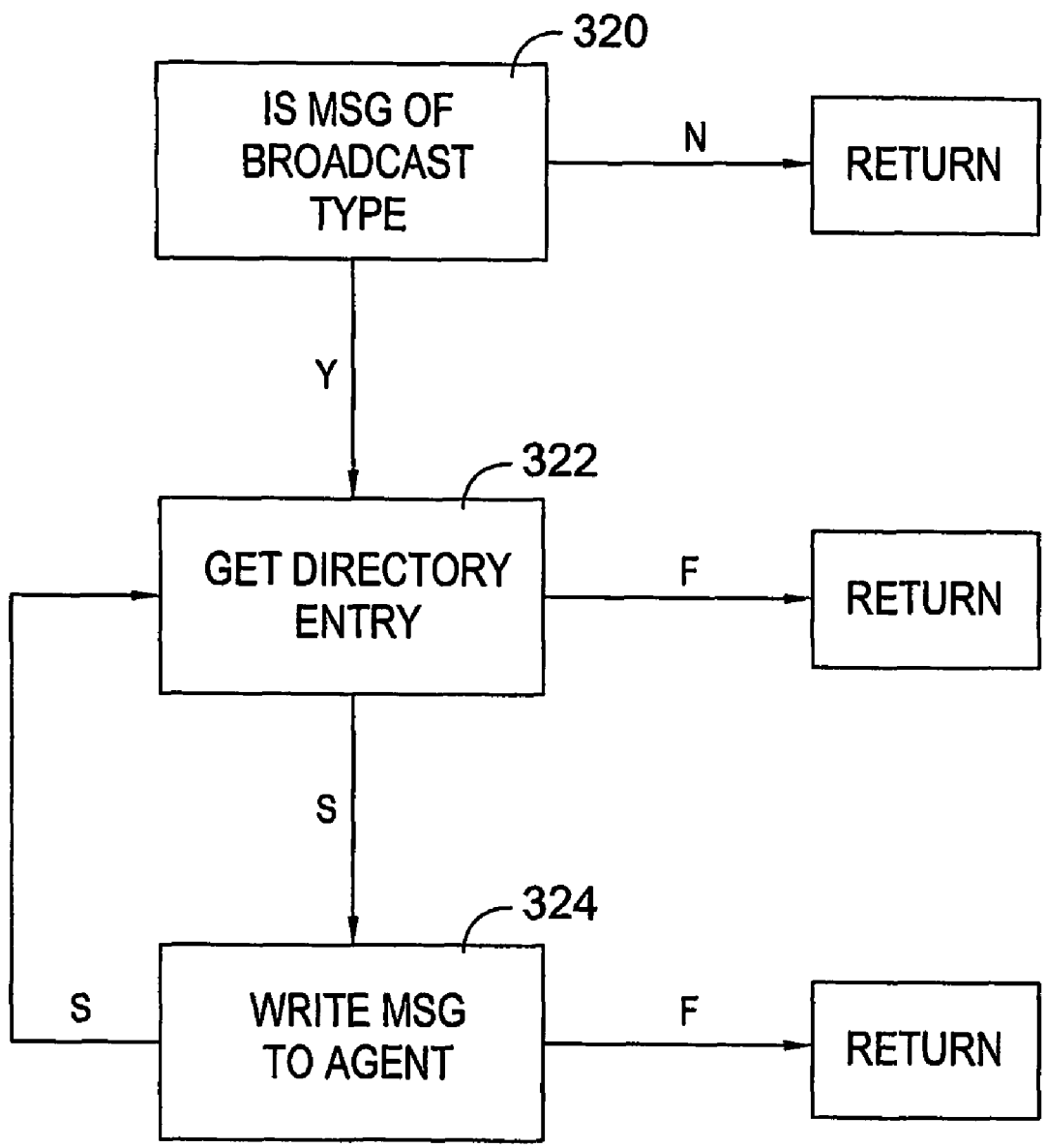

FIG. 35 shows how an agent would broadcast an agent message to other agents. First a check is made 320 that the message is of a type suitable for broadcast, such as an advertise message, and not merely malformed. Then the entries of the agent lookup table are enumerated 322 and the message sent 324, addressed to each one.

4.2.4. Terminating Agent Communication

For an agent to stop communicating within a community of agents, there is a need for graceful degradation to avoid failure in other agents caused by the inability to communicate. To do this properly, a connection to the Agent Communication Broker is opened. The agent sends its name followed by the identifier of the request it is making which in this case is a 'remove' message. The connection is then closed. The server side of this exchange, handled by the Agent Communication Broker, is dealt with in section 4.3.

4.3. Agent Communication Broker

Prior to the running of any agent, the agent communication broker (also referred to as the agent controller) must be present and running. This handles the assignment of transport addresses of agents regardless of the communication medium, controlling the execution priorities of agents and storing capabilities of agents for facilitating future communications between agents. In addition, the Agent Communication Broker enables the brokering of communication with agents running on remote machines. That is, the Communication Broker is one means of allowing the invention to be implemented across a network. Agents on remote machines may be executing on a different platform or may be written in different languages. However, since the communication protocol and language are independent of both, this has no consequence.

Figure 36:
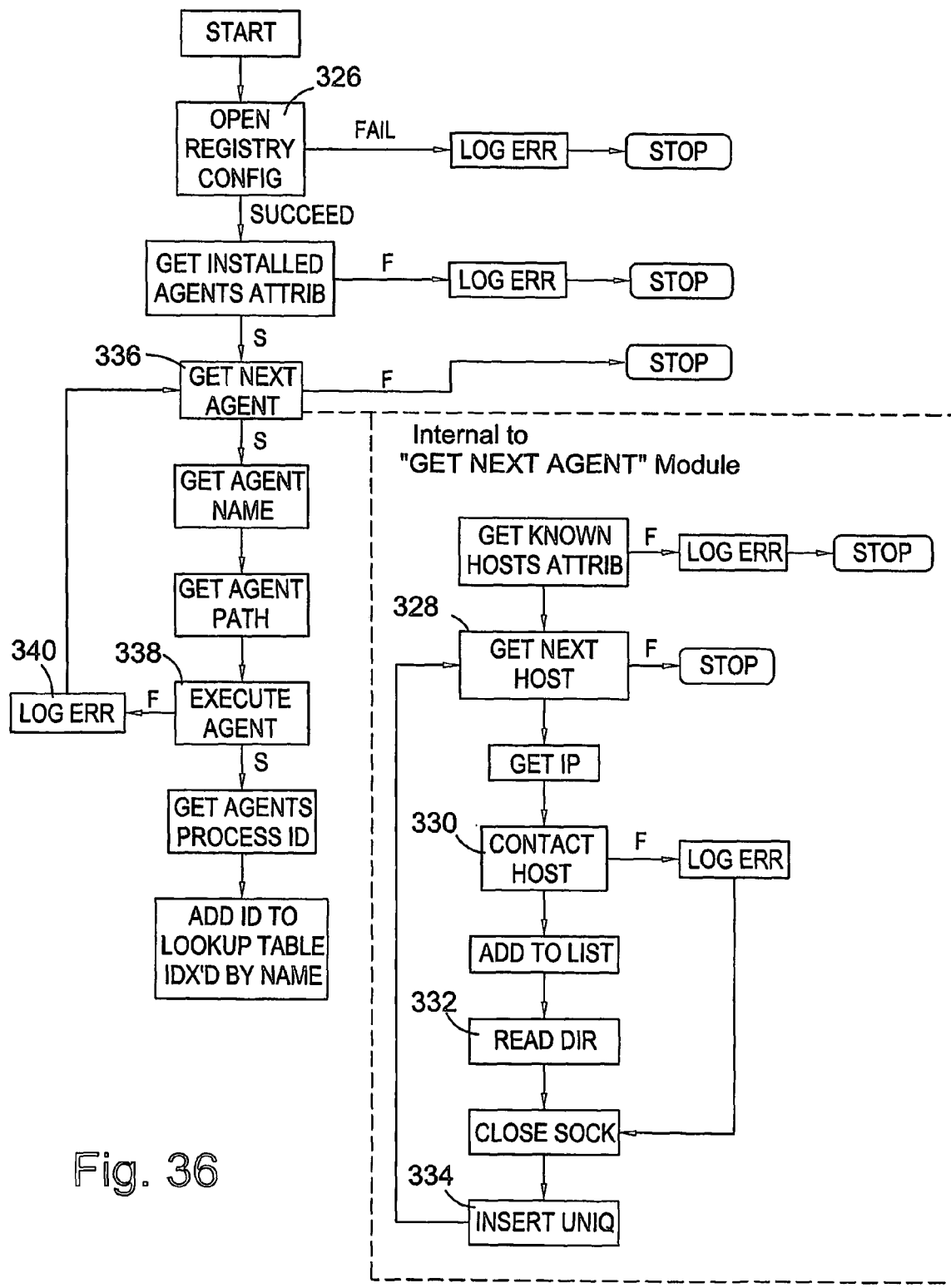

FIG. 36 shows the initialisation of the Agent Communication Broker. The Agent Communication Broker reads from whatever the persistent storage facility is on its host Operating System (e.g. Registry on Windows, Config Files on UNIX) 326. It then contacts any other Agent Communication Brokers it is configured to interact with. The inset on FIG. 36 shows the initialisation of the Agent Communication Broker for distributed use. For each known host 328 containing an Agent Communication Broker, the local host establishes a connection 330 and obtains a copy of their agent transport address directory 332. If successful, the local directory contents are merged with the incoming ones and the host is added to a list 334 of known peer Agent Communication Brokers.

With communication in place the Agent Communication Broker can then start up whatever agents the system is configured to use. Agents running in the system are by no means limited to those started by the Agent Communication Broker, but for a minimally functional system these are deemed adequate. Iterating through the list of configured agents 336 the Agent Communication Broker attempts to start each one in a new process 338—failure to do so is recorded in a log 340.

Figure 37:
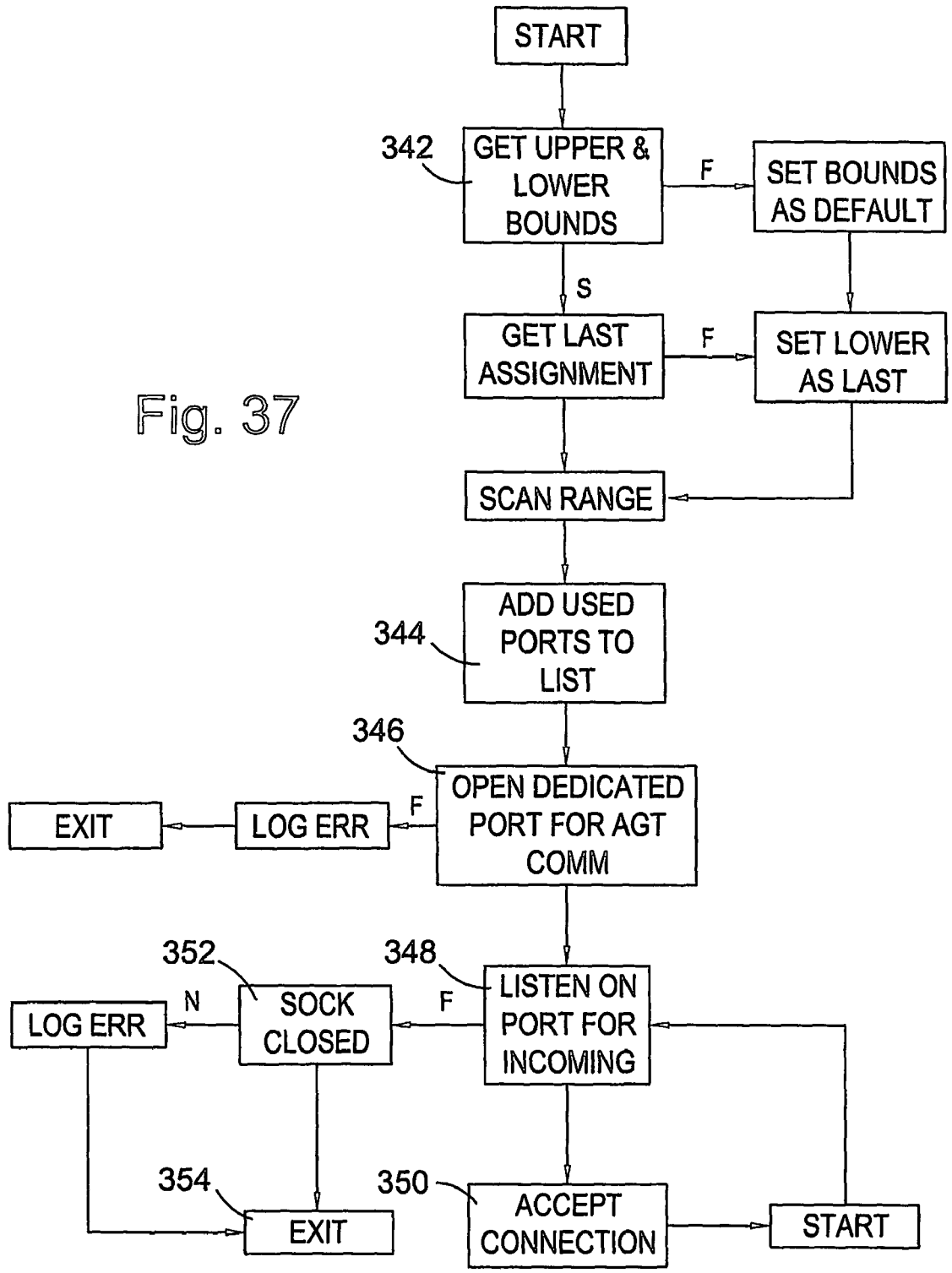

FIG. 37 shows the main thread of execution of the Port and Directory Assigner. The Port Assigner is given a range of port numbers 342 to assign to agents to communicate on. The bounds of this range are set when the Agent Communication Broker is configured or set to the defaults it was given when it was installed. Each port number is added to a list 344 from which new port assignments are made by removing the first element from the list. Similarly, when a port is surrendered, the port number is added to the end of the list.

All Agent Communication Brokers await communication from the same predefined transport address 346. Initialising the means of this communication is the next stage—if this part fails no communication can be made and therefore no agents can interact so the Agent Communication Broker terminates in this instance. If establishing communication is successful, then the Port Assigner awaits incoming requests 348, spawning new handlers 350 (discussed below—see FIG. 38) for each one. When the means of communication is purposefully closed 352 the Port Assigner exits 354 after notifying all peer Agent Communication Brokers (see FIG. 45) that it is doing so.

FIG. 38 shows the concurrent procedure of each handler spawned by the Port and Directory Assigner. From the connection established 356 in the Port Assignment procedure (FIG. 37) the request identifier is read 358, which determines the type of handler 360 required for the request. After this, depending on the value of the request identifier, any one of the procedures detailed in FIGS. 39 to 44 can be followed.

Figure 39:
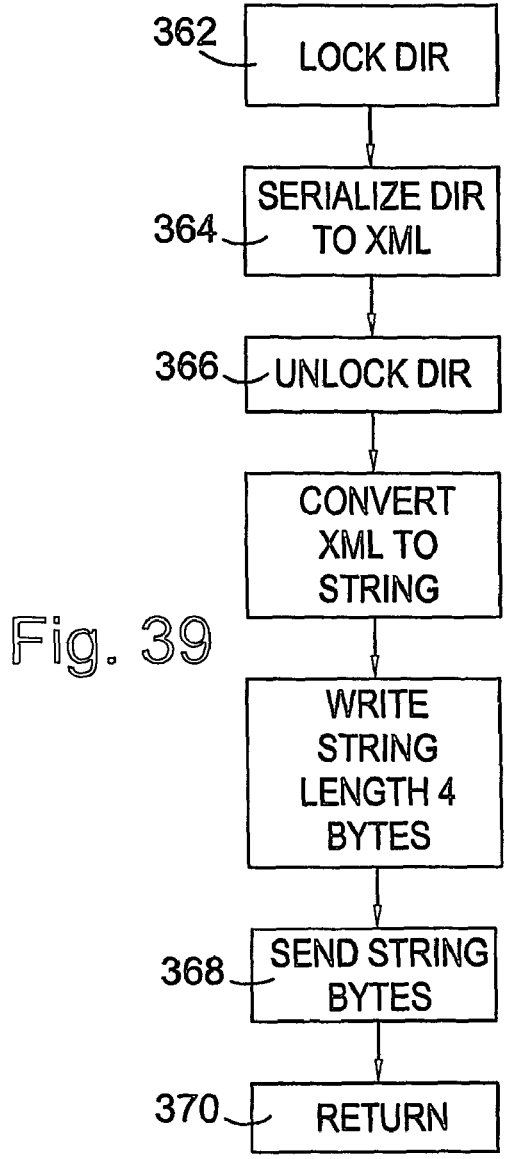

FIG. 39 depicts the situation where a remote host requests the directory contents of the local host. This action is performed by an Agent Communication Broker during initialisation. The details of the client side of this communication are elaborated upon in FIG. 36. In response to this request, the local Agent Communication Broker locks its transport address directory 362 so that no other concurrently running request handler can modify it, serializes a copy of it to XML 364, then unlocks it 366. The XML representation of the directory is then written to the connection in the form of an ASCII string 368 before the connection is closed 370.

Figure 40:
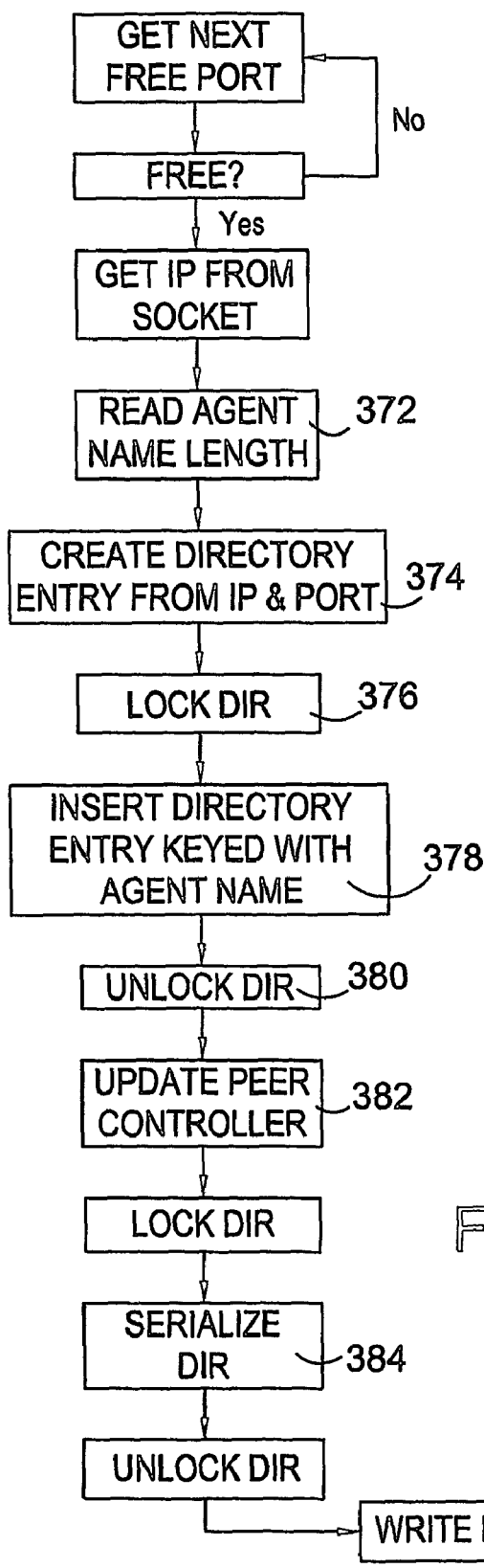

FIG. 40 shows the procedure for assigning a transport address to a new agent. First the agent name is read from the connection 372, providing a key in the transport address lookup table. The remote host name that the agent is running on coupled with the next free port obtained from the Port Assigner make up the agents transport address 374 which other agents can use to contact the agent. The Agent Communication Brokers directory is then locked 376, the transport address inserted 378 using the agent name as an index/key and the directory unlocked 380. Any peer Agent Communication Brokers are then notified of the changes 382 (in this case updates) to the transport address directory (detailed in FIG. 45). Finally the agent itself is notified of its transport address 384 and the connection is closed 386.

Figures 41, 42:
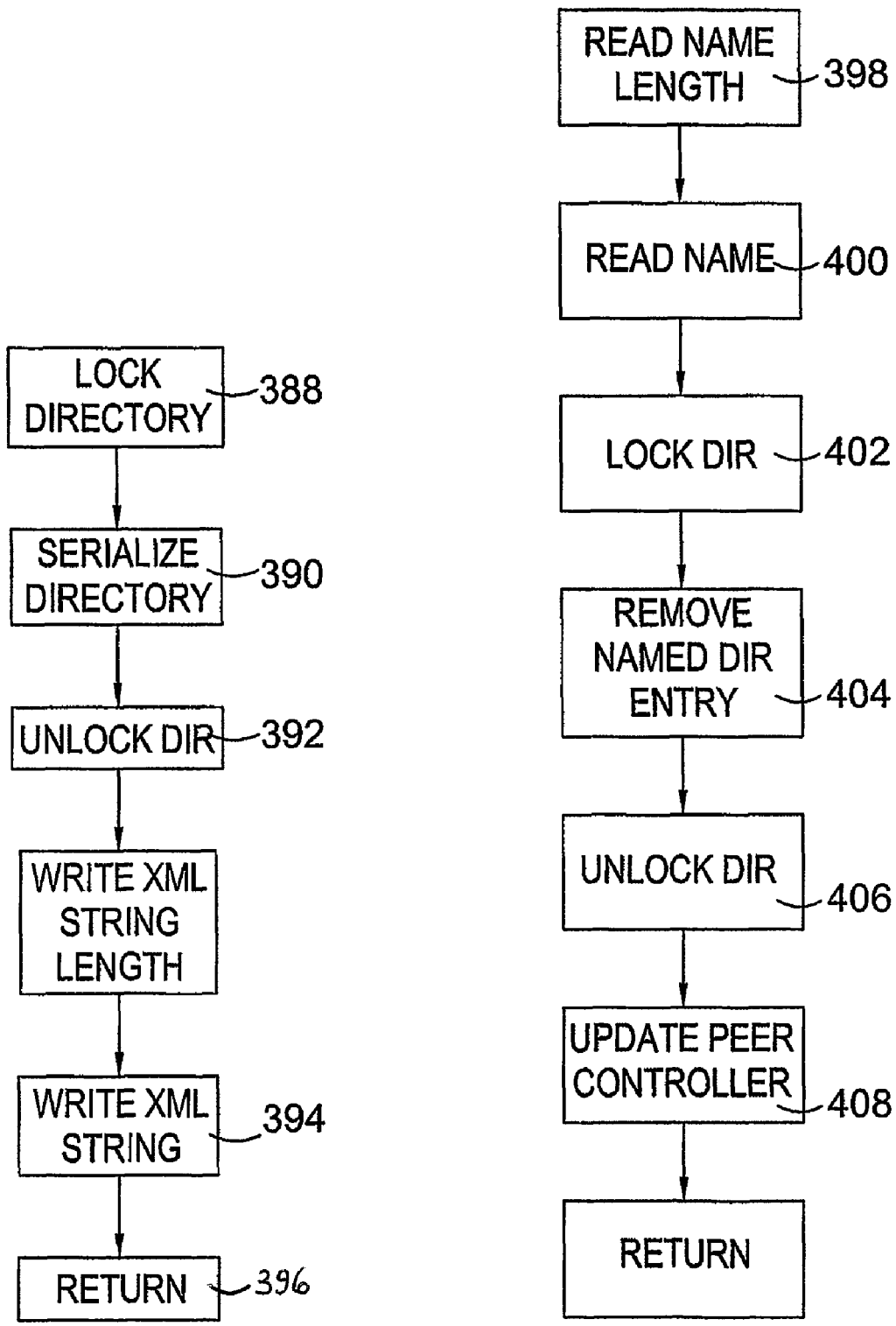

The procedure used for updating individual agents is shown in FIG. 41. To update, the agent transport address directory is locked 388 and a copy serialized 390 before being unlocked 392. The serialized copy is then converted to a ASCII string and sent to the agent making the request 394. The connection to the agent is then closed 396.

FIG. 42 shows the removal of an agent from the system. From the connection to the agent, the length 398 and string representation 400 of the name are read. The Agent Communication Broker's transport address directory is locked 402, the given agent name looked up, its entry removed 404 and the directory unlocked again 406. The connection to the agent is then closed and all peer Agent Communication Brokers are updated 408 (detailed in FIG. 45).

Figure 43:
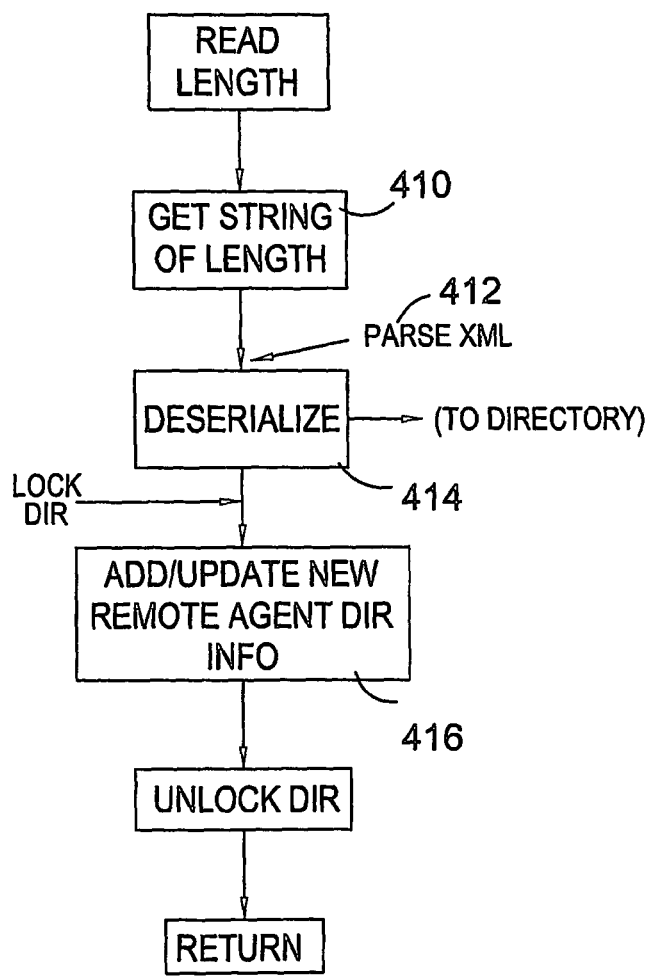
Figure 44:
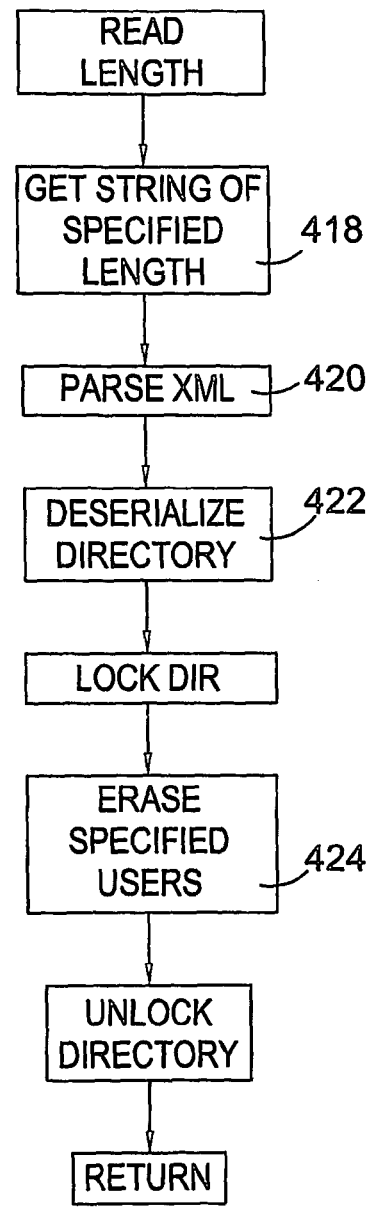

FIG. 43 and FIG. 44 respectively show the notification of addition and removal of peer Agent Communication Brokers. The procedure for adding a peer Agent Communication Broker involves reading its transport address directory in string form 410, parsing it into XML 412, then deserializing it 414 into a lookup table data structure. The contents of the lookup table are then inserted into the local directory 416. Removal of a peer Agent Communication Broker again involves reading the remote Agent Communication Broker's directory contents in string format 418, parsing 420 and deserializing 422. The connection to the peer is then closed and, using the deserialized lookup table, entries found in the local hosts transport address directory are erased 424.

Figure 45:
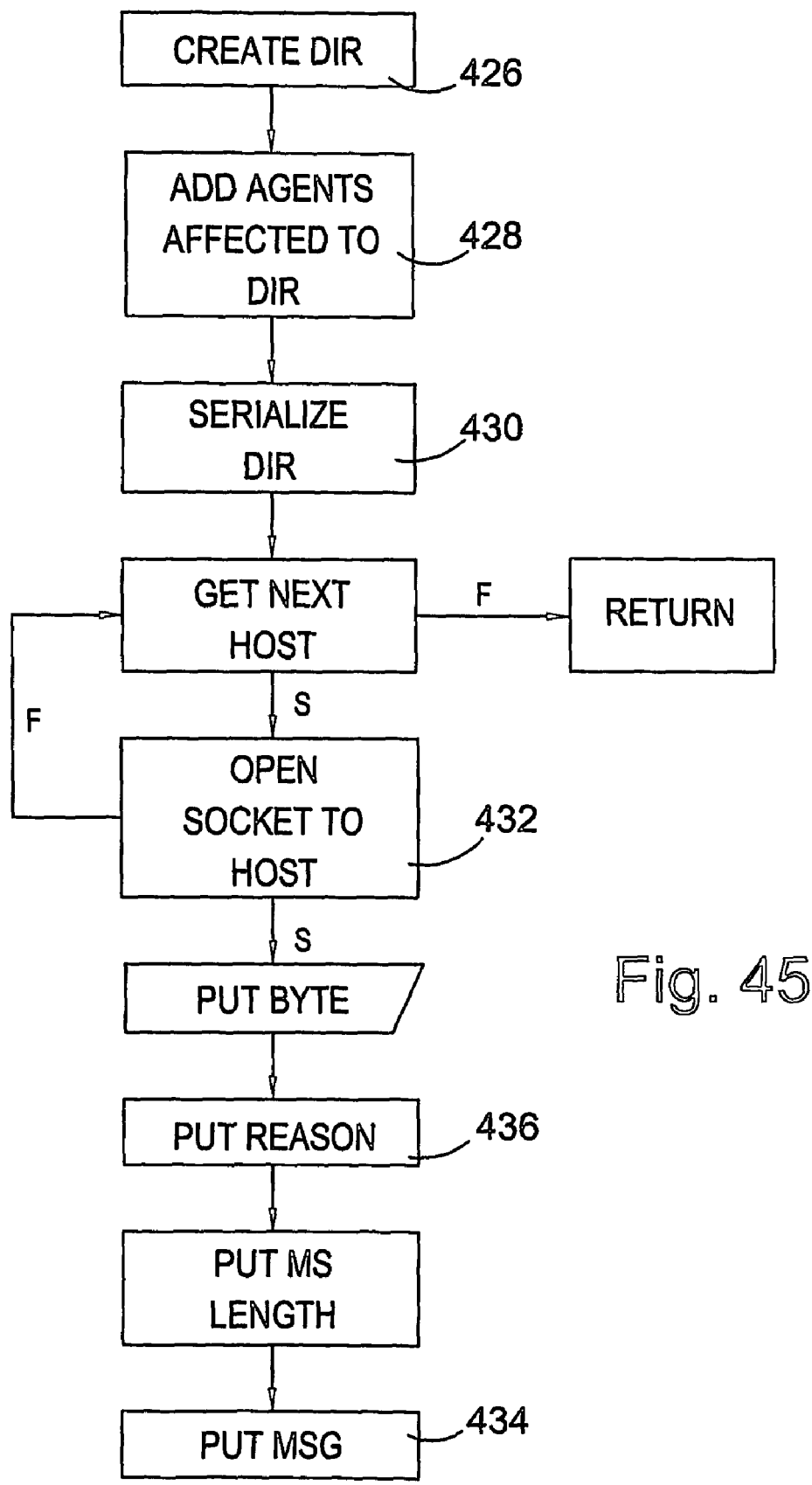

FIG. 45 depicts the updating of peer Agent Communication Brokers. This notifies all known peers of changes to the transport address directory of an Agent Communication Broker. This involves creating an instance of the directory data structure 426, inserting the affected (added, deleted, changed) agents and their corresponding transport addresses 428. This lookup table is then serialized to XML 430 and converted to an ASCII string (of course, any alternative encoding may be used if desired). Then, for each known Agent Communication Broker, a connection is made 432 to their defined port for communication and the string sent 434 along with the reason for it being sent 436 (add, remove, change). The connection is then closed before the next Agent Communication Broker is dealt with until all are updated.

4.4. Individual Agents

The following describes each agent by a shorthand name and gives a brief breakdown of the functionality of each.

4.4.1. Bootstrapper:

The 'Bootstrapper' agent is used to provide 'cold call' approximations on data gathered by recently installed sensor instances. One example of this is described further below, with reference to FIG. 73.

4.4.2. Correlator

The 'Correlator' agent is used to compare, and report on the similarity of, objects stored in the database.

4.4.3. Compactor

'Compactor' is effectively the system 'garbage collector'. It is an agent that goes through the main database either on request or when scheduled reducing the size by eliminating redundant data, deleting old data and merging similar data.

4.4.4. GestureMiner

'GestureMiner' is used to turn the streams of system level atomic events captured by sensor instances into higher level 'gestures' learned, unsupervised, from monitoring past output. The mechanism by which it does this is detailed in section 6 below.

4.4.5. LiveUserMonitor

'LiveUserMonitor', as the name suggests is an agent used to observe the output of connected sensor instances in real-time.

4.4.6. Notifier

The 'Notifier' agent is used in conjunction with the sensor installer (see section 3 above) to keep track of installed instances of sensors. Specifically, where they were installed, what they were installed on and when they were installed. The Notifier agent also assigns newly installed sensors with a host to connect to when they first initialise.

Figure 46:
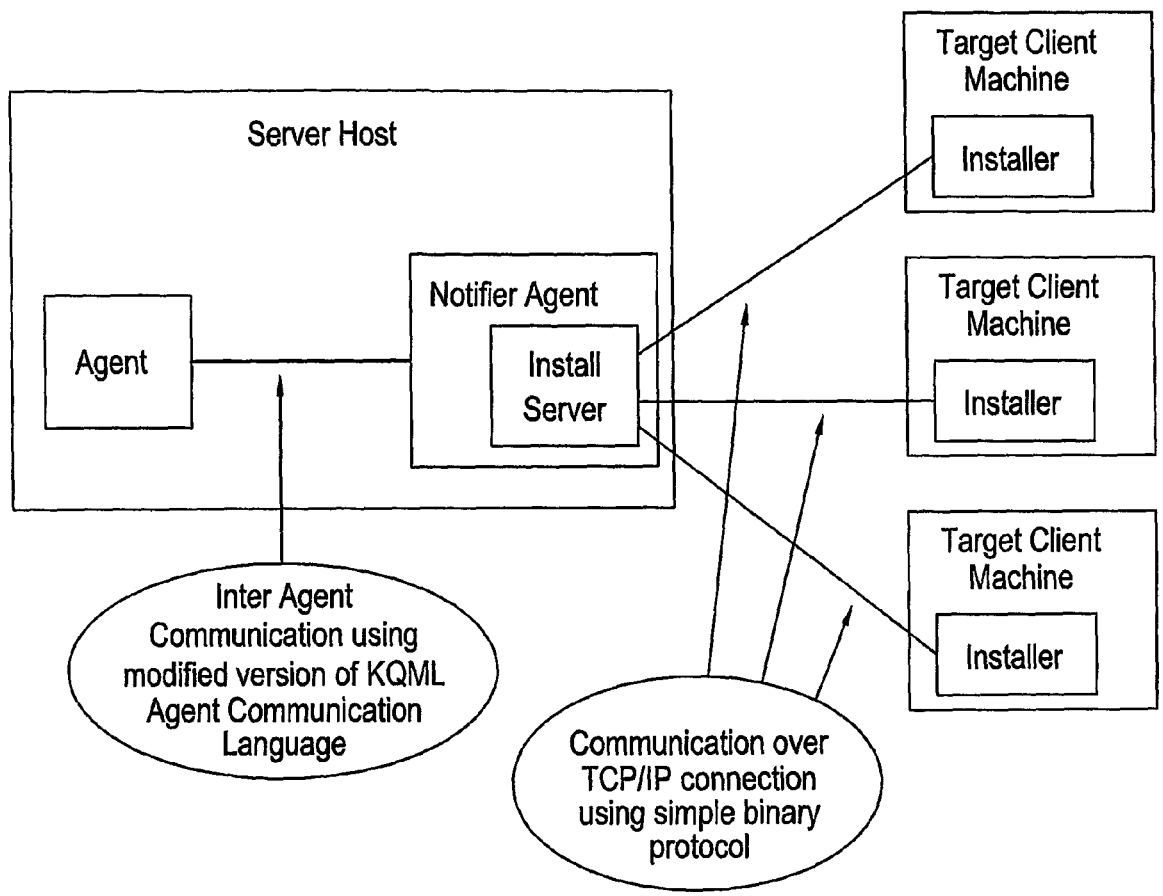
FIGS. 46 to 48 show the operation of the Notifier agent.

FIG. 46 shows the top level view of the Notifier server with the Notifier agent wrapper. As with the functionally similar SensorServer (described in section 4.4.9 below), communication with remote clients is via a simple binary protocol and communication with other agents is with our modified version of KQML.

Figure 47:
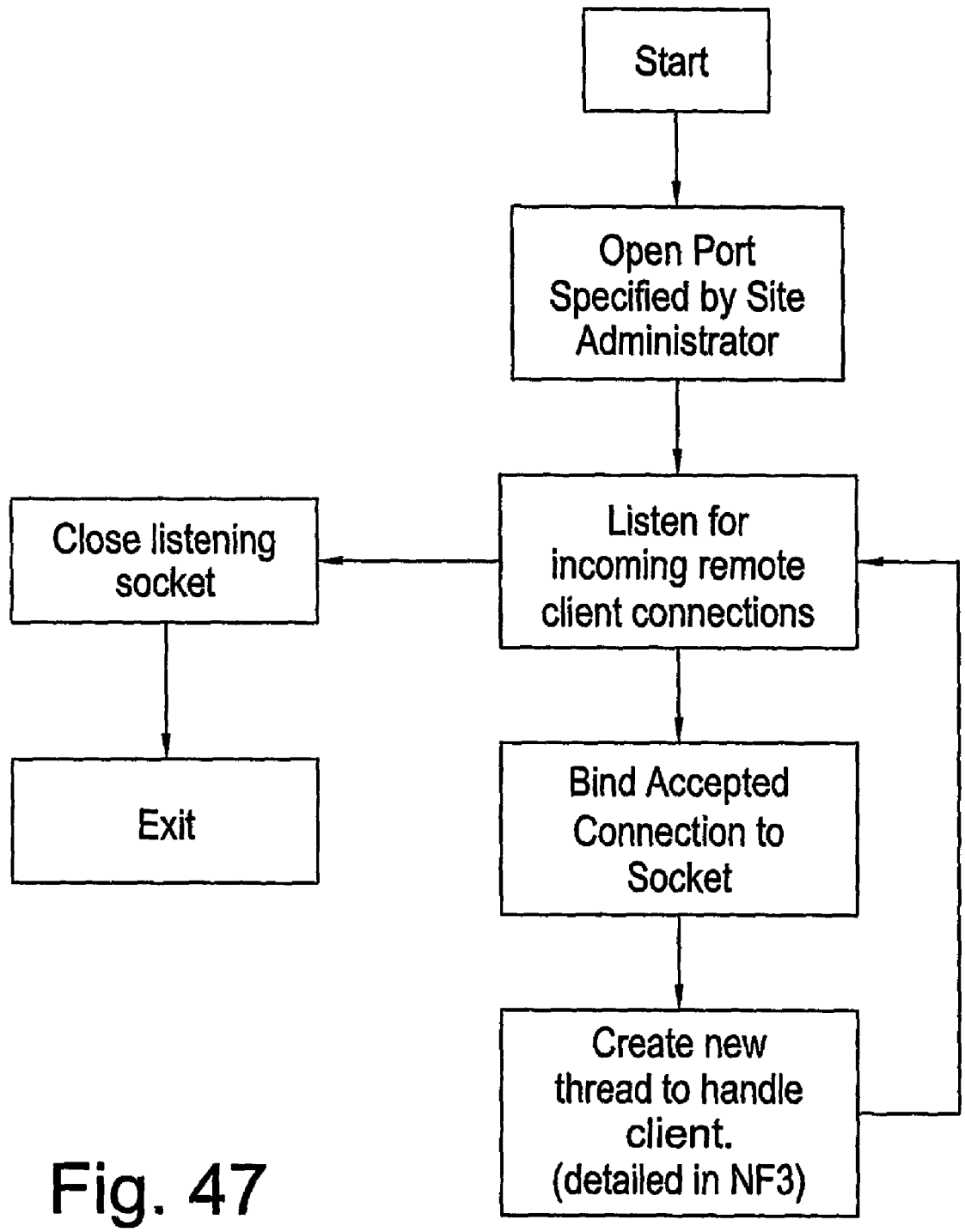

FIG. 47 shows the main server thread of execution that is spawned when the agent starts up—all agent activity is identical to that described in the section on SensorServer. It can be seen that the Notifier server thread is nearly identical to the SensorServer server thread in the way it functions. As with the SensorServer server thread, a predefined network port is listened to until a prospective client attempts to connect. If this connection is established successfully, the client is handled on a new thread and the server thread goes back to waiting for other connections. This process repeats until such time as the agent closes the listening socket.

Figure 48:
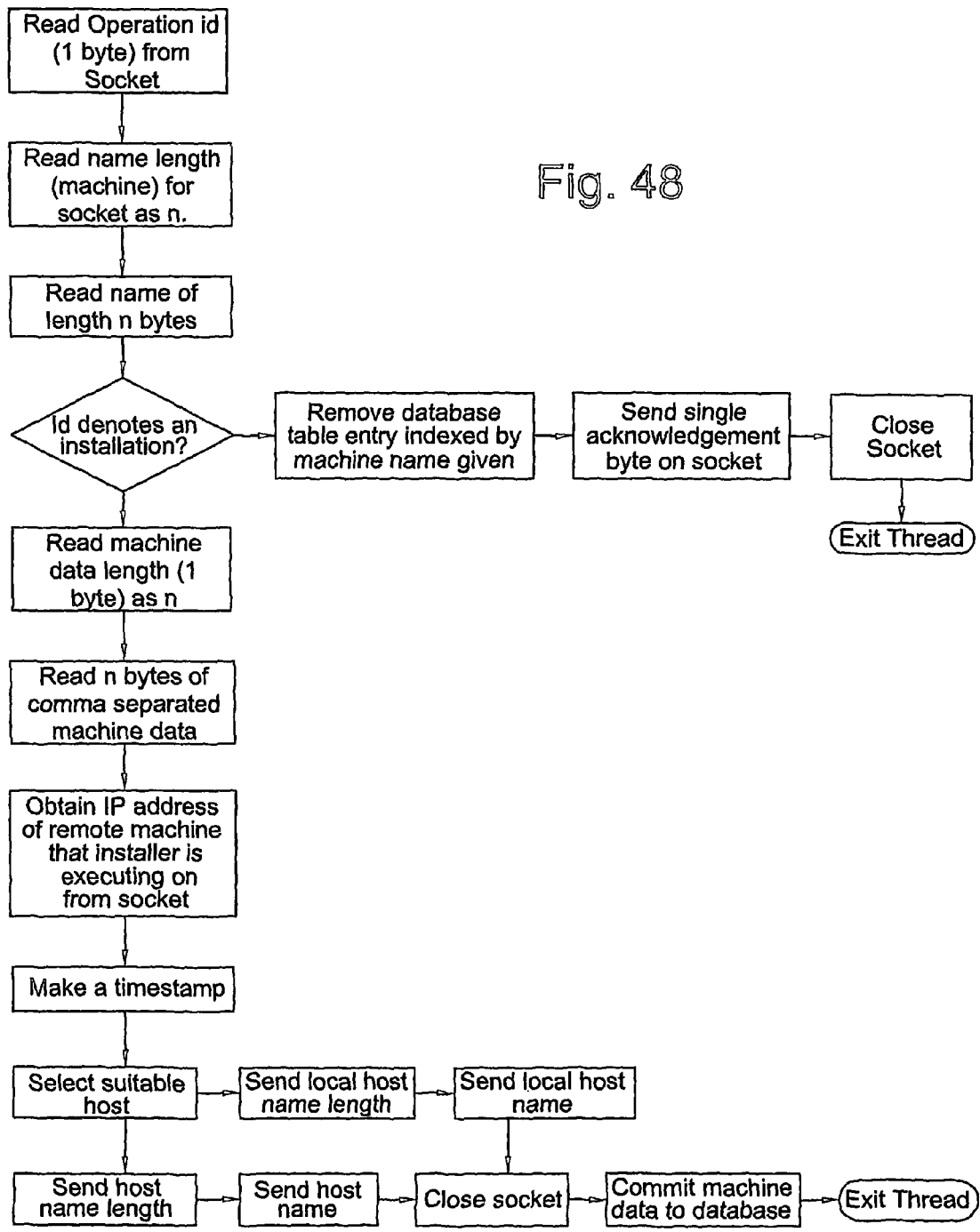

FIG. 48 shows the client handler thread for handling each instance of a remote installation. Upon accepting the connection to the installer instance, the handler then reads a single byte which indicates the operation to be performed (install/uninstall) followed by the target machine name length followed by the machine name itself.

If the operation identifier denotes an installation, then the handler thread reads a single byte containing the installation data length from the socket followed by the specified number of bytes of data. The data could take any form (XML representation of a serialized object, binary representation of a serialized object) but in this case a plain text string containing comma separated values of installation data. The data includes the operating system installed on the target platform, the processor architecture on the target platform and the browser version. In addition to this, a timestamp is generated by the handler to record the installation time and the IP address of the remote machine is obtained from the socket connection. Additional data could be obtained if required. A suitable host is selected by the system for the sensor instance to connect to. In future this could be decided according to load but at present is restricted to a list of available hosts. Failure to find a suitable host results in the local hostname being sent. Lastly, the installation data is committed to the database where there is a dedicated table for storing installation details of all currently installed sensor instances. The socket is then closed and the thread exits.

If the operation identifier denotes an uninstallation of the sensors, the given machine name is used to remove the database entry for that sensor installation. The handler thread sends back a single byte of acknowledgement to the remote installer then closes the socket. The handler thread then terminates.

4.4.7. Pageseeker

The 'Pageseeker' agent is used to receive previously viewed content in whatever format it exists. Essentially this agent is similar to a web crawler.

4.4.8. Scheduler

The 'Scheduler' agent is one of two user interfaces to the system ('LiveUserMonitor' being the second). This allows the scheduling of tasks to be performed by agents such as the frequency of monitoring and the nature and content of notifications and reports.

4.4.9. SensorServer

The "SensorServer" agent and the sensors connecting to it are the main components of the system. FIG. 49 shows the relation between the SensorServer agent 438, its server component 440, the handlers it spawns 442 and the remote sensors 444. This agent is responsible for accepting incoming connections from remote sensor instances and assigning a separate handler to each. Each handler is responsible for inserting data read from the incoming connection as well as sending control messages to the remote sensor. Control messages include (but are not limited to) redirection requests, favourite requests, history requests, status requests, shutdown requests, keystroke requests and content capture requests. The server thread is interfaced to the agent's main thread to allow it to both manipulate and monitor the server, again entirely by agent messaging.

FIGS. 51 and 50 show the SensorServer agent behaviour and start up routines respectively. SensorServer, like all other agents discussed herein, simply extends the behaviour described in section 4.1. In FIG. 50 the procedure is identical to that of the generic agent model save for the capabilities it broadcasts which are application specific. Similarly in FIG. 51, the means of dealing with the agent message removed from the front of the messaging queue are the same as with the generic agent model. The difference in behaviour is obtained through the implementation of the communication language performatives for this specific agent.

Figure 52:
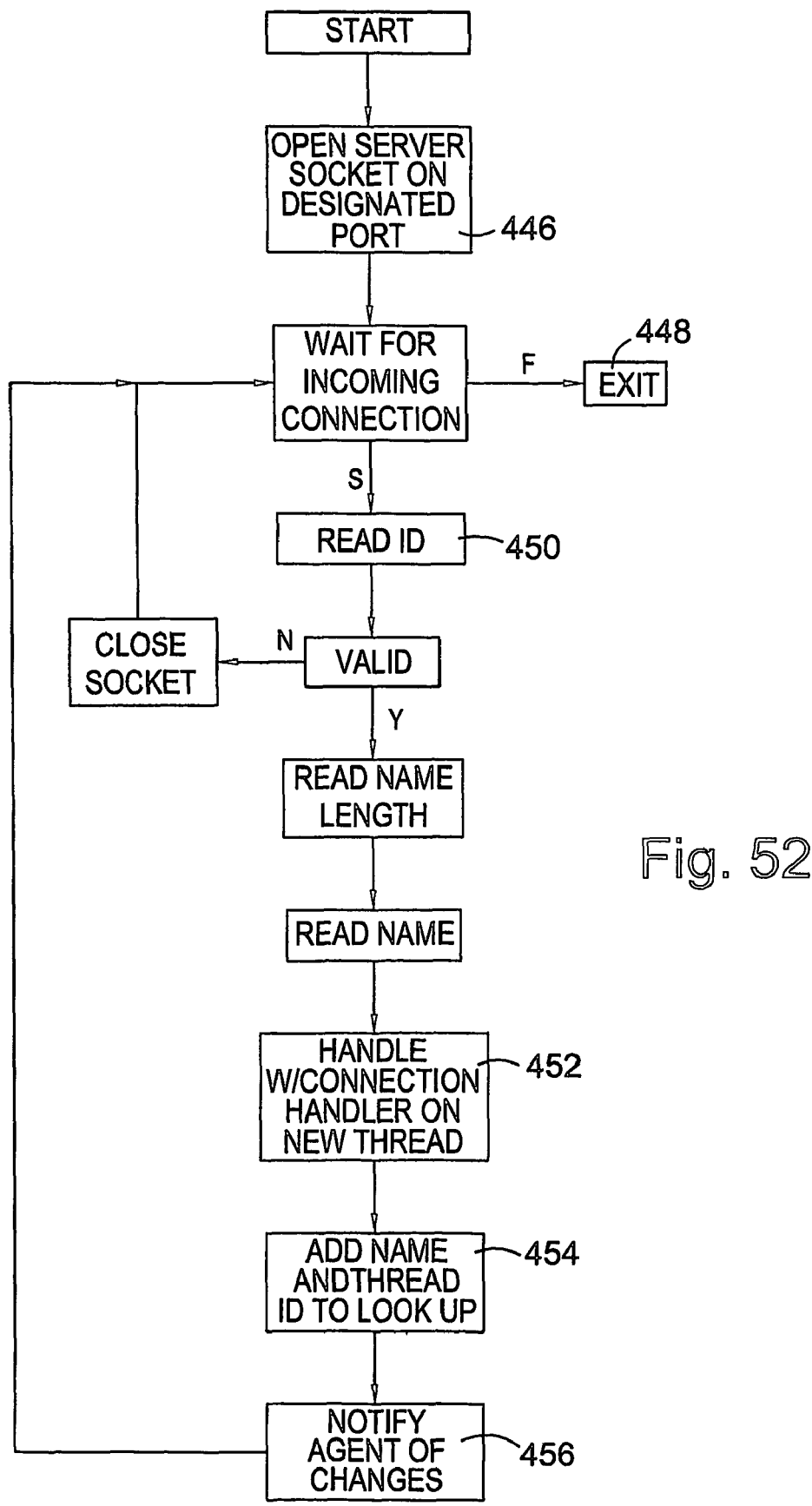

FIG. 52 shows the main thread of execution for dealing with new connections from new remote sensor instances. The server thread is started by the agent during the agent's initialisation (described in section 4.1). The server opens a network socket 446 to listen for connections on a predefined port. Failure at this point causes the agent and the server to shutdown 448. When a connection is incoming, the server reads the identifier of the sensor 450, the composition of which is illustrated in FIG. 4, and assigns it to a new handler 452. The handler is added to a table 454 indexed by the sensor identifier for future access and run on a new thread (see FIG. 54). The agent is then notified of the change in the system state 456 and in turn notifies any subscriber agents of this. The server then waits for the next connection.

FIG. 53 shows the storage format in which messages from the remote sensor are stored for later processing. The message includes a username 458, a session timestamp 460, an event type 462, an event specific string 464, and an attribute character 466. Incoming event messages read from the session handler (FIG. 54) are committed, for temporary storage at least, to a database consisting of a single table. Each session handler has an identifier generated from the timestamp of the first event message it receives, coupled with the sensor identifier this provides a means of uniquely identifying the session. All event messages are timestamped both for preservation of their sequence and for future analysis on the temporal data associated with them.

Figure 54:
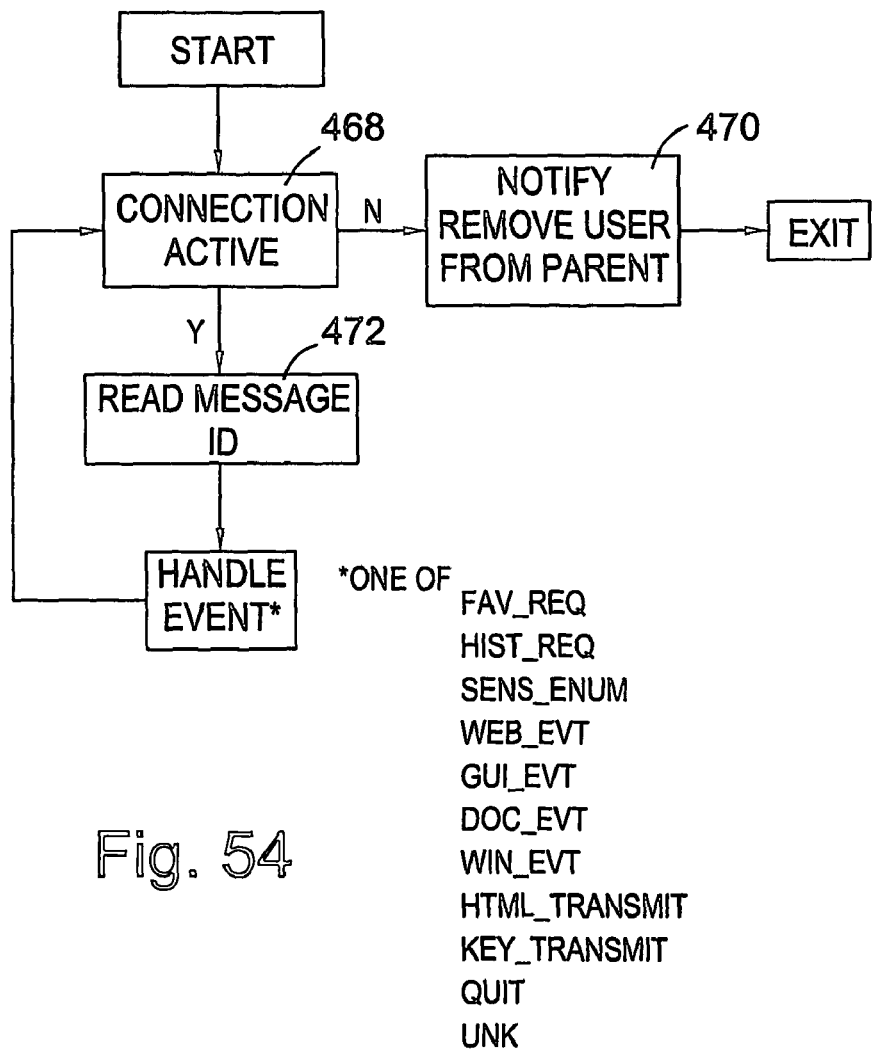

FIG. 54 shows the concurrent procedure for the session handler spawned for each remote sensor instance. The lifespan of a session stretches from when the sensor first makes the connection 468 until the sensor shuts down or fails, at which point the server is notified that the session has ended 470, which in turn removes the handler from its lookup table and notifies any interested agents (through the agent) of the occurrence. For the existence of the session, the procedure remains in a loop reading message identifiers 472, and then handling events requested by the messages (handling of different events is shown in FIGS. 55 to 62) which is only broken when the connection to the sensor is closed by either party. The following sections describe the handling of each message received from the remote sensor.

Figure 55:
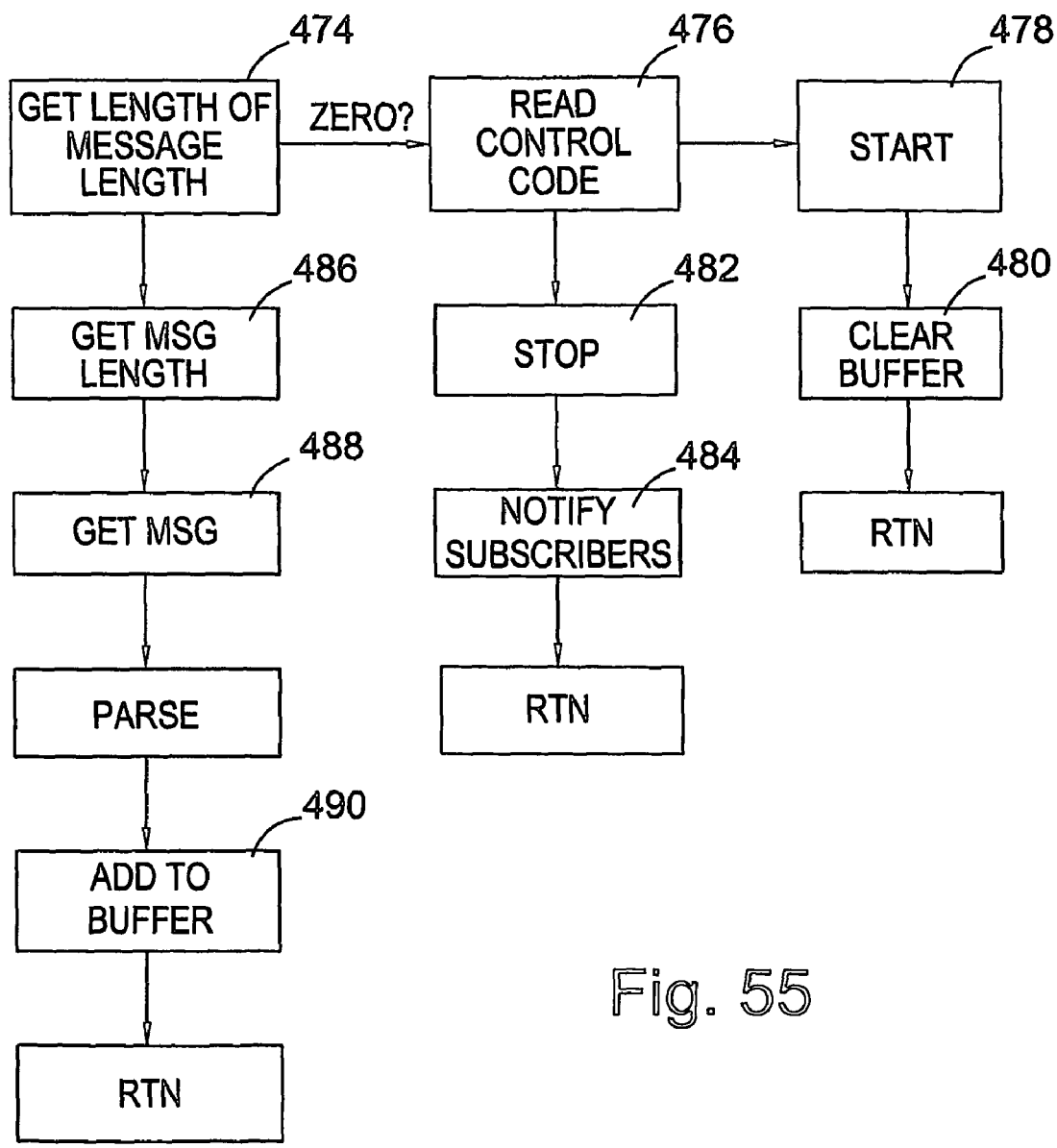
Figure 56:
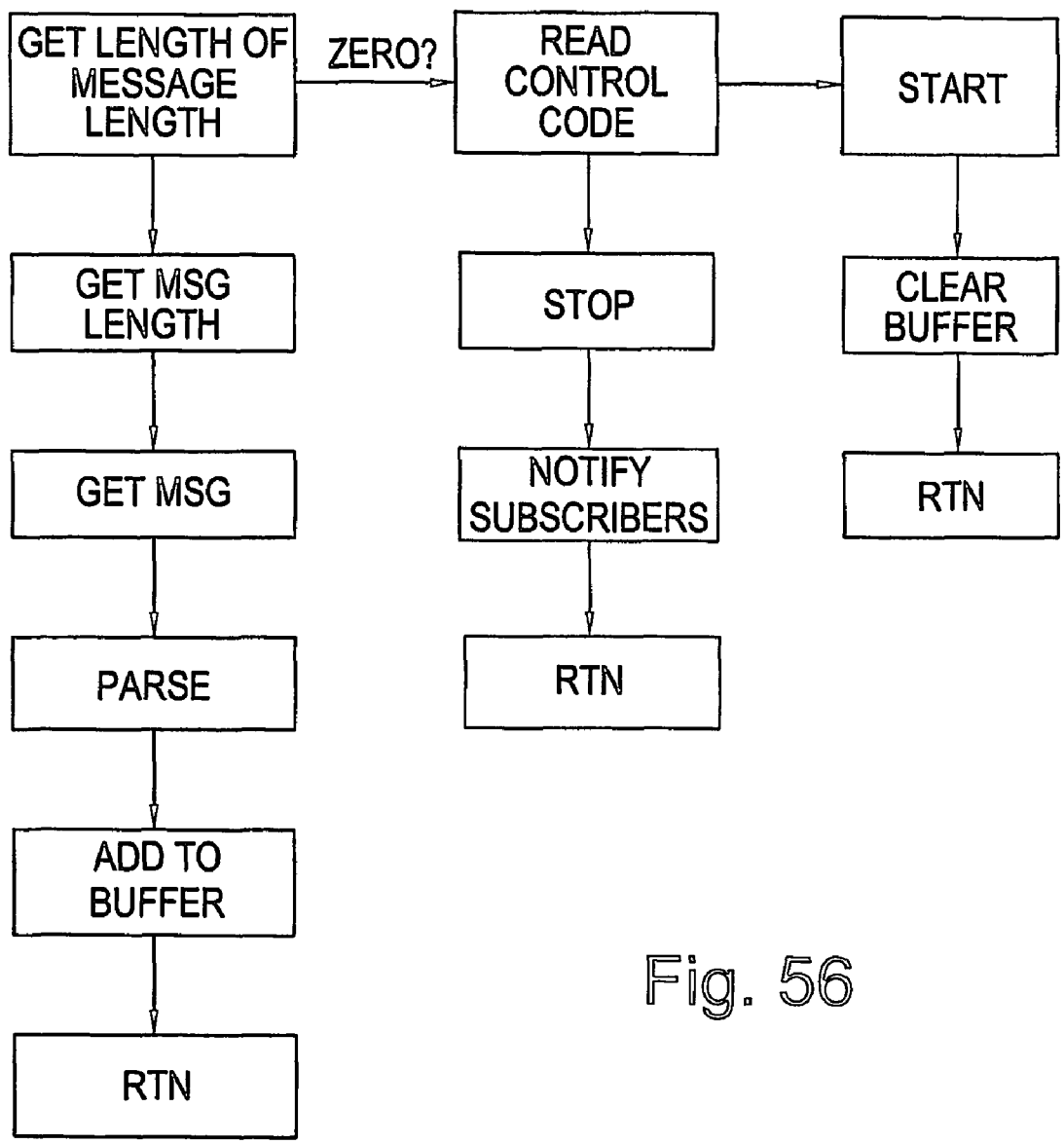

FIGS. 55 and 56 show the functionally similar responses to the requests for favourites and history respectively. Both messages are the result of respective requests sent by the agent, through the server, at the request of another agent, to the remote sensor. For both message handlers the length of the length of the message is read 474. If this length is zero, then the next byte read will be a control code 476. If the control code denotes the start of transmission 478 of a list of history/favourites then a new buffer is created to contain them 480. Otherwise the control code must denote the end of transmission 482, upon which the list or history/favourite items is serialized to XML, embedded in an agent message and sent via the server and agent to any subscribers to this particular ontology 484. If the length of the message is not zero, the appropriate length of the message is then read 486 followed by the message itself 488, which is added to the buffer 490.

Figure 57:
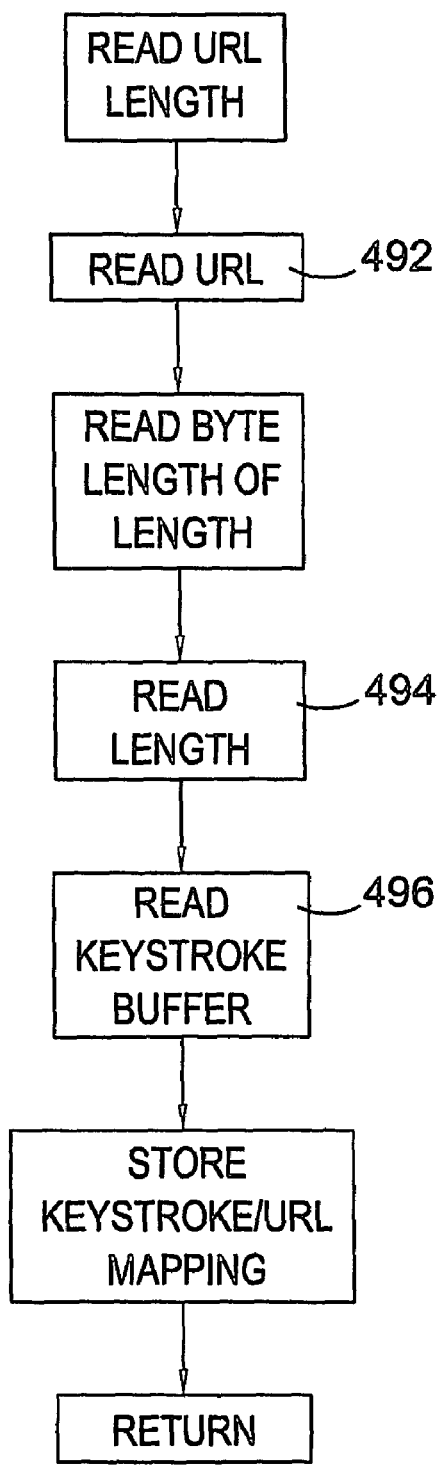

FIG. 57 shows how the response to a keystroke request is handled. All recorded keystrokes in a session are indexed by the URL at which they were recorded. Consequently, the associated URL is read first 492 as a string followed by the length of the buffer 494 containing the keystrokes and finally the contents of the buffer itself 496 in string format. As with the history and favourite requests, the keystroke message is received as the result of a previously sent request by the agent, through the server and finally through the handler.

Figure 58:
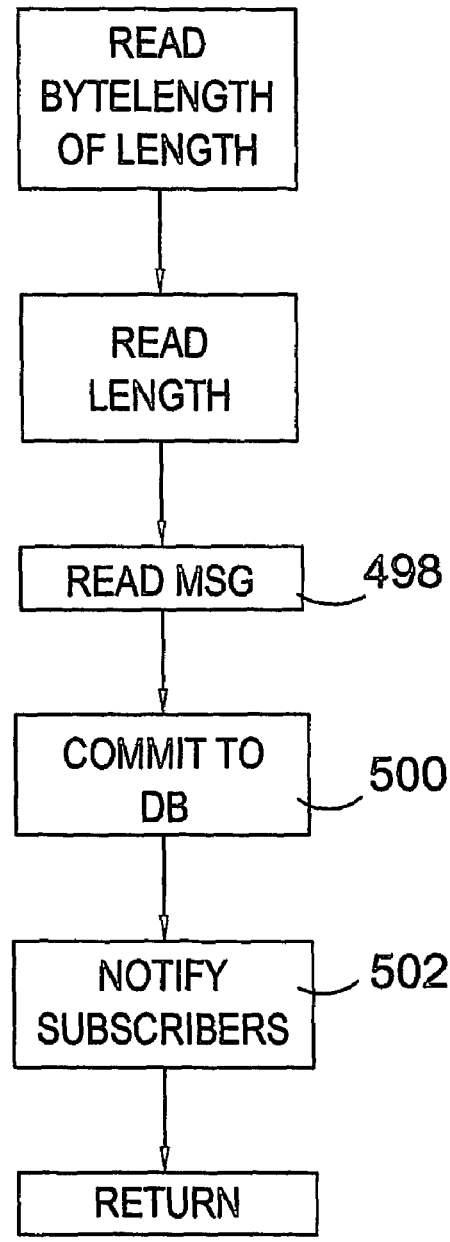
Figure 61:
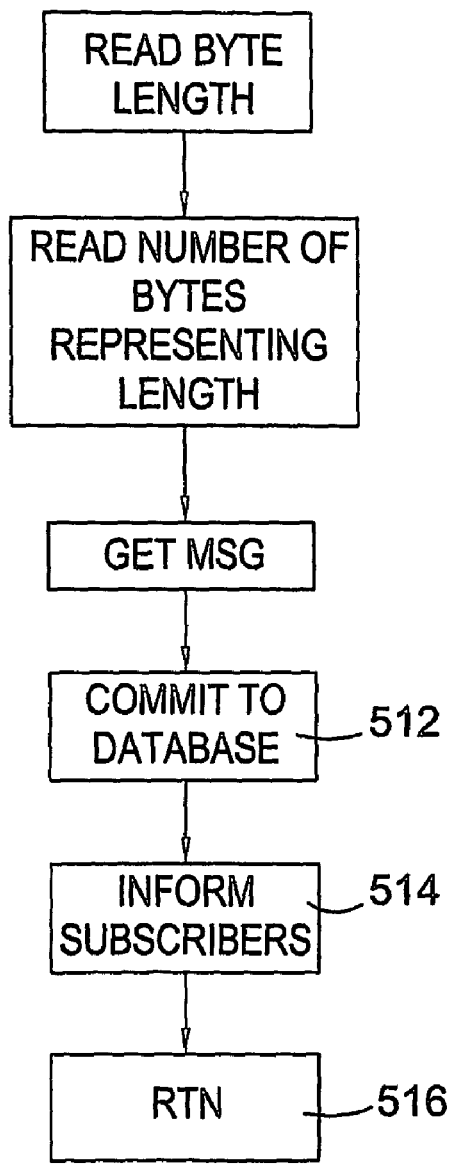
Figure 62:
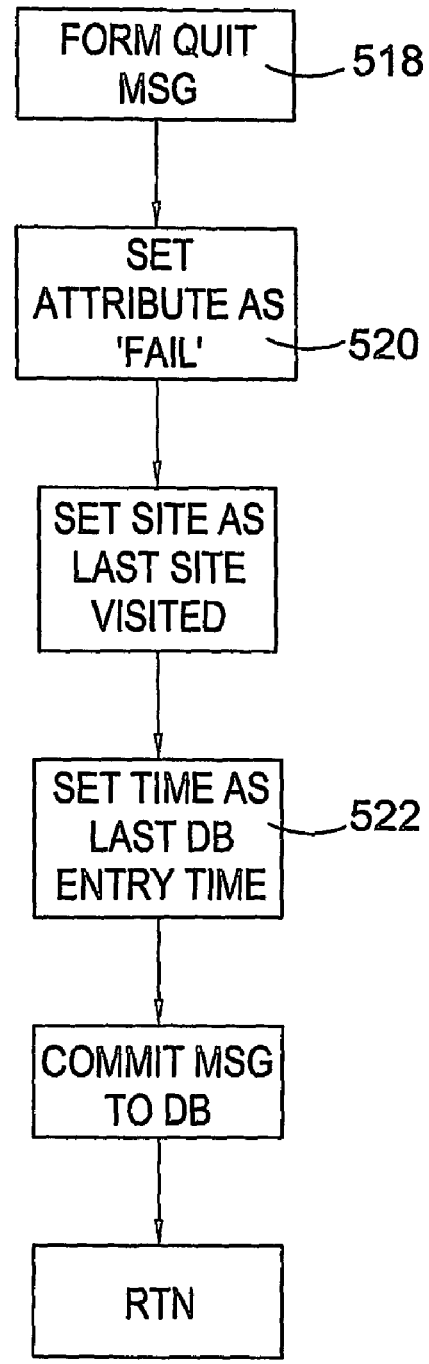

The basic event handler is shown in FIG. 58. This simply reads the message 498 as a string, commits it to the database 500, then notifies the agent to inform any interested agents 502. FIGS. 61 and 62 show the only extensions to this procedure. The handling of a response to a sensor enumeration message is shown in FIG. 59. This shows which types of events are currently being monitored by the remote sensor. A fixed length array of Boolean values is read from the connection denoting the state of each monitored type and the agent making the request notified.

FIG. 60 shows the handling of a content transmit message. Such a message is received as the result of a previously sent request by the agent, through the server and then the handler. The message simply contains the length of the buffer length in bytes 504, followed by the buffer length 506 and finally the buffer 508 containing whatever content has been requested. The content is then passed on to the agent 510 who originally requested it.

FIG. 61 shows the handling of a 'Quit' message sent by the remote sensor. As with other event messages this is committed to the database 512 in the format shown in FIG. 53. Similarly, any agents subscribing to notification of this message are notified 514 via the agent. The connection to the sensor is then closed 516 causing the session to terminate.

FIG. 62 shows the handling of either an unknown message sent by the remote sensor or the generation of a session terminator to handle a catastrophic failure. Since no message is read from the connection a 'Quit' message has to be formed 518 using the standard format shown in FIG. 53. The attribute field of the quit message is set 520 to denote that the session has ended in failure rather than by conventional means. The timestamp for the message 522 is obtained from the last message successfully committed to the database by the handler. The connection is closed, if it isn't already. Any subscribers are notified.

4.4.10. Timeslicer

The 'Timeslicer' agent monitors the system and controls agents' execution priorities in accordance with their forecast workload and past system statistical resource usage.

4.4.11. Tracker

The 'Tracker' agent takes user sessions and documents as its inputs (in various forms) and uses them to monitor and predict an approximation of the topic of the content.

4.4.12. URLserver

The 'URLServer' agent is used to process URLs found either through crawling or in user sessions.

It should be noted that only the 'SensorServer' agent is required for a minimally functional system, that is, it collects data only and accepts/maintains connections with the remote sensors. Further functionality can be added 'on the fly' with the addition of other agents possibly on other (remote) systems.

5. Simultaneous Monitoring and Control of Agent Behaviour by Several Users

Figure 63:
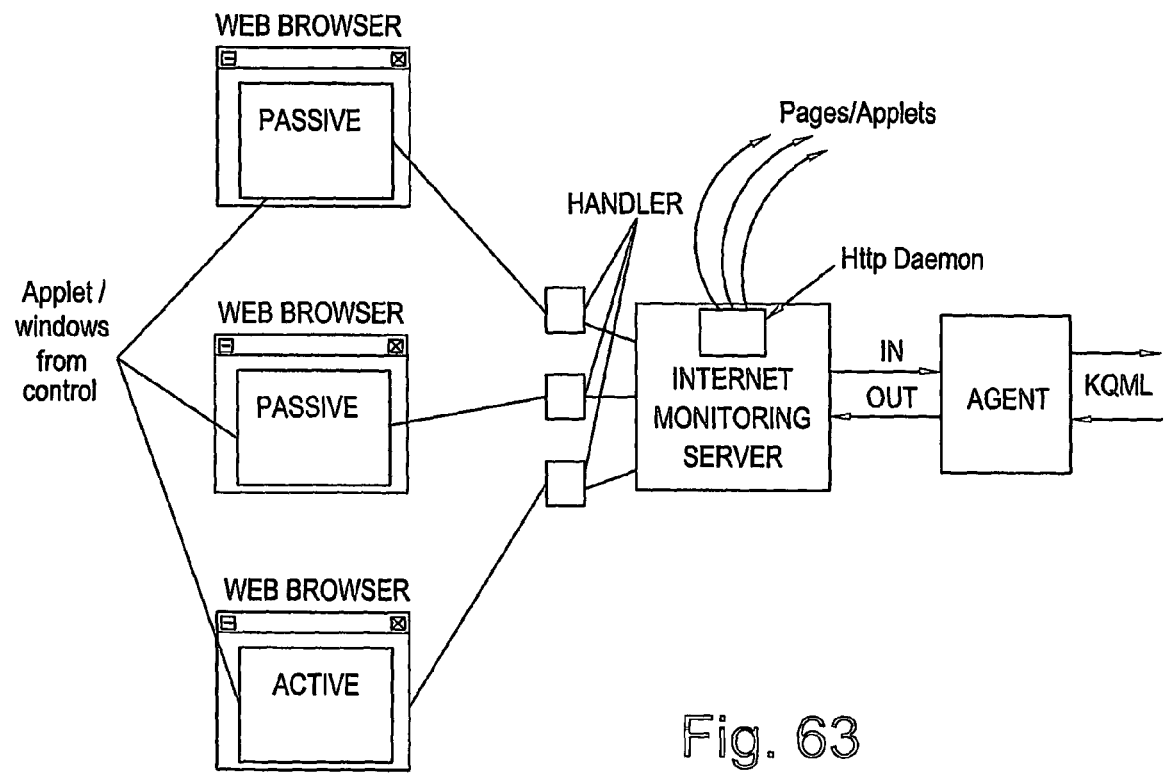
FIG. 63 shows an arrangement of the invention for allowing multiple users to monitor a single user.

Using the invention described in the present inventors' co-pending International Patent Application WO 03/007151, the manipulation and monitoring of any agent's behaviour can be effected and observed simultaneously by several non co-located users from anywhere on the internet with no additional software dependencies. FIG. 63 depicts such a scenario. Agents communicate among themselves as described in section 4, but receive operating commands through a binary protocol interface like any other software application according to the process outlined in WO 03/007151. Information output from the agent can then be multicast to all simultaneous observers and input commands to the agent multiplexed through a remote platform independent user interface in the way described in WO 03/007151.

6. Learning and Recognition of Behaviour Patterns from System Level Events

As noted previously, see section 4.4.4, the GestureMiner allows the creation of a user profile based on characteristic gestures or actions performed on the client computer, and subsequent identification of users based on such profiles. This is done using finite state machines (FSM).

6.1. Finite State Machines

The FSM is a useful mathematical abstraction often used to model a variety of systems as well as providing the backbone architecture of many types of software such as compilers, parsers and natural language recognisers. The formal mathematical definition of an FSM is that it is an ordered quadtuple:

$$M=(Q,V,T,q_0),$$

where Q is the (finite) set of start states $Q=\{q_0 \ldots q_n\}$; $q_0$ is the initial state; T is a function that maps inputs to states, and V is the set of input states. An alternate representation is that of a quintuple:

$$M=(I,O,S,\delta,\lambda),$$

where I is the set of input symbols; O is the set of output symbols; S is the set of states; $\delta$ is $S \times I \rightarrow S$, the state transition function, and $\lambda$ is $S \times I \rightarrow O$, the output function.

The number of states is given by $|S|$, the number of (possible) inputs by $|I|$ and the number of (possible) outputs by $|O|$. States change from s to s' by using the state transition function which takes both the current state s and the current input a as its arguments:

$$s'=\lambda(s,a),$$

while the output associated with this change in state is given by:

$$o=\lambda(s,a)$$

It should be noted that in changing from s to s' for $s=s_n$, s' need not equal $s_{n+1}$, that is, state transition need not be sequential.

The present invention makes use of FSMs to extract and analyse atomic event identifiers from the operating system event queue. The system event queue is a data structure intrinsic to the operating system user interface that takes not only all user input and passes it into the active application but also dispatches events generated by software as a consequence of user input to their intended destination. In the currently-described embodiment of the invention, based on monitoring events on Microsoft Internet Explorer browser, only a select few (eighteen at present) events are selected, as follows (with the identifier we refer to them as bracketed).

DISPID_STATUSTEXTCHANGE (HOV)

This is obtained from the browser and is sent as an event to all or any automation clients (typically the top level shell) that the status text (usually displayed on the bottom left of the status bar in the browser) has changed. The text usually changes to indicate download status or any errors that have occurred in obtaining the page, but also displays the URL of any hyperlink the mouse happens to be over. The instrumentation is designed as to only capture this hovering action of the mouse over a hyperlink by switching off notification while the browser is navigating to a site. Upon completion of all page downloads the status text event is acted upon again. The importance of this event lies in the ability to detect potential interest/disinterest of users in a particular link. Parameters obtained from this event consist of the text to be displayed in the status window.

DISPID_BEFORENAVIGATE2 (NAV)

Whenever the browser starts to load a page, either when a hyperlink is clicked, an item from the 'Favourites' menu is selected, the browser loads up or the user enters a URL into the address bar, this event is fired. Among its parameters, only the destination URL is recorded. This is probably the most useful event recorded as it can accurately measure time spent at pages and also partitions user behaviour into site-specific actions.

DISPID_ONTITLECHANGE (TICH)

This is not actually generated by the user but fired as navigation progresses. Useful mainly in the instance that a user cancels navigation between instigating navigation and the page downloading completely i.e. denotes a decision change regarding the usefulness of the document.

DISPID_ONQUIT (QUIT)

This signals the browser being closed either through the menu or whatever means exist on the title bar. Again this is obtained by automation.

DISPID_HTMLDOCUMENTEVENTS2_ONCONTEXTMENU (CMENU)

This signals the instantiation of the context menu, invoked by the right mouse button in the client area of the browser.

DISPID_HTMLDOCUMENTEVENTS2_ONCLICK (CLICK)

This indicates a left or right mouse click on the document. On its own it is of little use however, combined with the HOV and NAV events indicates a click on a hyperlink.

DISPID_HTMLWINDOWEVENTS2_ONSCROLL (SCROL)

Whenever the document is scrolled through the use of the scrollbars, the keyboard or a wheel mouse the browser is notified using this event. The sole act of scrolling through a document is enough to denote some level of user interest in a document. Sequences of this type of event interspersed with other events could be used to infer levels of interest through document navigation patterns.

DISPID_HTMLDOCUMENTEVENTS2_ONSTOP (STOP)

Received through automation, fired when the browser stop button is pressed. Occasionally fired spuriously upon document completion.

WM_ACTIVATE (WACT)

Obtained by hooking the event queue for this window. This tells whether or not the browser is currently the active window on the desktop. Parameters accompanying this message tell whether the window is activated or deactivated. This is useful as it can explain long periods of browser inactivity and avoid confusion with excessive user interest in a document.

WM_ACTIVATEAPP (AACT)

As above only relating to the change in activation of a top-level window.

WM_HELP (HELP)

Again, window hooking detects this message, generated when the F1 key is pressed. Used rarely but by only the most experienced users, hence the significance.

WM_MENUSELECT (MSEL)

Whenever a menu item is highlighted or selected this event fires. Unfortunately it is not always possible to obtain the menu text.

WM_ENTERMENULOOP (ENML)

This is used when the user clicks on a menu, regardless of whether it is a menu, a sub menu or a pop-up menu, this event is fired.

WM_EXITMENULOOP (EXML)

This is used when a menu closes (after being opened with the above event) this event is fired.

WM_INITMENUPOPUP (IMPUP)

This is fired when a sub menu appears. As with the previous four events, this event alone is fairly meaningless unless put in context.

WM_PRINT (PRNT) and WM_PRINTCLIENT (CPRNT)

Typically, this message and WM_PRINTCLIENT are used to make the window redraw itself into a printing device. If a user has gone as far as printing the document significant interest is suggested. Can be produced spuriously by OS to provide quick screen repaints.

WM_SIZING (WSZ)

The resizing message is accompanied by parameters denoting the current size of the browser window. Increasing the size of the browser window may indicate interest in a document.

6.2 Sequence Alignment

Naïve comparison (an element by element or 'brute force' approach) of sequences is of little use in the search for recurring motifs ('gestures') in the stream of events—common sub sequences would be undetected by such an approach. Alignment distance algorithms operate on pairs of sequences and return a similarity metric based on the cost of converting one sequence to the other. Typically, for two sequences of length M and N an M×N similarity matrix would be generated with each entry containing a weight incurred through insertion/deletion (known as an 'indel') or replacement of an element. One such alignment distance is the Levenstein Distance (Levenstein, A. Binary Codes Capable of Correcting Insertions, Deletions and Reversals. 1966)

Levenstein is a fairly simple alignment distance that takes two sequences, A and B, as its inputs: $A=\{a_1, \ldots, a_m\}$, and $B=\{b_1, \ldots, b_n\}$, and iterates through them producing a matrix D, the values of each element are given by:

$$D(i,j) = \min(1-\delta(a(i),b(j))+D(i,j), D(i-1,j)+1, D(i,j-1)+1)\delta(a(i),b(j))-1 \text{ if } a(i)=b(j) \text{ otherwise } 0$$

As an example, consider the sequences:

$$A = 0|3|1|2|0$$

$$B = 0|3|2|3|1|2|0$$

These give the following similarity matrix:

$$D(A, B) = \begin{bmatrix} 0 & 1 & 2 & 3 & 4 & 5 & 6 \\ 1 & 0 & 1 & 2 & 3 & 4 & 5 \\ 2 & 1 & 1 & 2 & 2 & 3 & 4 \\ 3 & 2 & 1 & 1 & 2 & 2 & 3 \\ 4 & 3 & 2 & 2 & 1 & 2 & 2 \end{bmatrix}$$

Compared with:

$$D(A, A) = \begin{bmatrix} 0 & 1 & 2 & 3 & 4 \\ 1 & 0 & 1 & 2 & 3 \\ 2 & 1 & 0 & 1 & 2 \\ 3 & 2 & 1 & 0 & 1 \\ 4 & 3 & 2 & 1 & 0 \end{bmatrix}$$

Calculating the similarity matrix is only the first step in aligning the two sequences. To obtain the alignment a trace-back algorithm is used to find the common sub sequences shared by the input sequence pair. A two-phase trace-back algorithm is used for this, beginning with the following:

1. Initialise the matrix to have row, column elements (r,c) = |r−c| for r<M, c<N.
2. For sequences A and B of lengths M and N respectively set i=M−1, j=N−1.
3. Stop if both i and j are zero.
4. Compare D(i,j) to D(i−1,j−1)
   a. If the value of D(i,j) equals that of D(i−1,j−1) then either a match or a substitution has been performed. If a(i) equals b(j) then the former is true, the value of j is added to the list and both i and j are decremented. If it is a substitution that has taken place then i and j are decremented.
   b. If D(i,j) equals D(i−1,j−1)+1 then a deletion has taken place and i is decremented.
   c. Otherwise an insertion must have taken place and j is decremented.
5. Repeat from 2.

The second phase of the trace-back algorithm is concerned with extracting an ordered list of subsequence start positions/lengths from the reverse ordered list of match positions:

1. Let k equal the last index of the match position list.
2. Create a position/length pair P with position at k and a length of 1.
3. If k is zero stop add P to the list, otherwise decrement k
4. If the element at k equals the value of the following element plus 1 increment the length of P and repeat from 3. Otherwise add a copy of P to the list and repeat from 2.

6.3 Sequence Matching

The Aho-Corasick algorithm (Aho, A. V. and Corasick, M. J. Efficient String Matching: An Aid to Bibliographic Search. *Comm. ACM* 18:6. 1975) marries the Knuth Morris Pratt (KMP) algorithm, one of the earliest string matching algorithms, with a Finite State Machine to extract instances of a finite set of strings from a given text. Formally, X is a set of k strings: $X=\{x_1, x_2, \ldots, x_k\}$ themselves formed from a finite alphabet $\Sigma$. The size of X is given by:

$$|X| = \sum_{i=1}^{k} |x_i|.$$

Y is an arbitrarily chosen text string (in practice an entire text document). The two-phase algorithm used in Aho-Corasick is used to firstly build a tree of state (observed character) transitions and secondly to connect nodes of the tree to provide failure transitions. Recalling the formal definition of a finite state machine as a quintuple $M=\langle I, O, S, \delta, \lambda \rangle$.

In this case I=Y, O∈X and S will be each node in the tree (conceptually a tree is easier to visualise but formally an FSM is more appropriate). The output and state transition functions are the most important aspects as these will determine when a match has been found in Y and which member of X it is. Aho and Corasick divide $\delta$ into two separate functions—'goto' and 'failure' denoting state transition based upon match and non-match respectively. The first phase generates an FSM with a completed 'goto' function and a partial output function. The second phase completes the output function and implements the 'failure' function.

The first phase involves building the tree of string suffixes starting with the start state, or root—an empty string. To prevent the FSM returning a failure immediately upon presentation of the first character of a string not in X, a loop is added to the root so that the start state is always returned to if no match is provided for the first element of Y. The next step is to enter all strings in X into the tree, referred to by Aho and Corasick as the 'goto' graph. This involves adding each unique $x_i(0) \in X$ to the root node of the tree then traversing in a depth first fashion with each $x_j$ from j=1 to j=k, appending unique child nodes to each node as they are encountered. Each path running from the root to each leaf will represent at least one element of X. While the 'goto' function is being constructed with the appending of nodes to the tree, the output function is implemented partially with the labelling of node associated with $x_i(|x_i|)$ for all i<k. The next phase adds the 'failure' function, which allows transition from a matched prefix to the first successful match in a potential suffix. The 'failure' function is constructed using the 'goto' function to traverse the tree breadth first.

Beginning with states of depth 1, i.e. children of the root, all nodes will return the root node as their failure node. Once all nodes of depth one are given a failure function, depth is incremented and the fail value of all the node of that depth are calculated from the combined 'goto' and 'failure' functions of the nodes of depth-1. The consulting of the 'goto' function of all of the previous generation of nodes continues until non-fail is returned. More generally:

1. Create a queue containing all nodes of depth d=1
2. Remove each node from the queue and assign the fail value it returns as the root node
3. Create a queue containing all nodes of depth d=d+1
4. For each node of depth d, iterate through the queue until a node is found whose 'goto' function does not return for every possible input symbol (i.e. it is not a leaf)
5. If the node at d−1 is the parent of the node at d, trace its 'goto' function back using the nodes returned by its 'failure' function until the 'goto' function returns non-fail.
6. Assign this non-fail to the node being examined at depth d as its 'failure' function return value.
7. Repeat 4 until all nodes at that depth have been covered, then repeat from 3 until maximum depth has been reached.

While the 'failure' function is constructed at each node, the output function is also updated—the output set of a node is merged with the output set of its failure node. Aho and Corasick note that the 'failure' functions generated for the FSM in the previous phase are not optimal in the sense that a node returned by the 'failure' function of a given node could itself fail immediately for the same input y. This problem is circumvented by letting the 'failure' functions of a node greater than depth 1 equal the 'failure' function of the node returned by its own 'failure' function unless the 'goto' function of the 'failure' node succeeds for all possible $\Sigma$ in which case the 'failure' function operates in the usual way.

6.4 Training

Training data is accumulated from prior browser use and is stored in a relational database. This is done by the GestureMiner agent. At this stage, recurring patterns found in the time ordered event stream are extracted and stored as individual finite state machines.

Firstly, the training data is partitioned by separating it on a user-by-user basis, then by session and finally roughly segmenting by page viewed. The data is then split on the first two criteria based using a simple database query but on the third point we partition using a FSM. Events are extracted from the database in the order of time in which they occurred and fed into an FSM. A change in the associated document URL signals a new FSM must be generated and the existing one stored. This procedure leaves us with a set of FSMs representing the state transitions for each document viewed by each user in each session. Each FSM contains sequences of common gestures. To extract these, a simple sequence alignment distance is used, typically the Levenstein distance described previously. Levenstein is ideal not only for gauging similarity of two FSMs but also for extracting their common sub sequences when used in conjunction with the trace-back algorithm also detailed in section 6.2. Since this approach to sequence alignment is commutative and aligning sequences with themselves is of no practical value, only elements in what would be the lower diagonal of a pair wise matching matrix are compared, thus avoiding the two aforementioned cases. Applying this process to the FSMs representing the roughly segmented event sequences gives a set of unique event sequences derived from the longest common sub sequences found by the trace-back algorithm.

6.5 Online Recognition

Using the training data extracted in the previous section a suffix tree (also known as a suffix automaton) is constructed from the sequences of the gestures retrieved. Beginning with the Aho-Corasick algorithm reviewed in section 6.2, a FSM is built from the FSMs extracted as the training data to recognise which FSM (gesture) a sequence of atomic events is closest to. To summarise the approach: (1) Roughly segment time ordered event data by URL co-occurrence; (2) generate FSM for each segment of data; (3) compute Levenstein distance and associated trace-back from pair each element in lower diagonal of pair wise comparison matrix of segments in (2); create FSM from each unique subsequence in each trace-back obtained from (3), and (5) input each FSM symbol sequence from 4 into the Aho-Corasick algorithm, generating an FSM capable of recognising any FSM symbol sequences found in (4).

Figure 64:
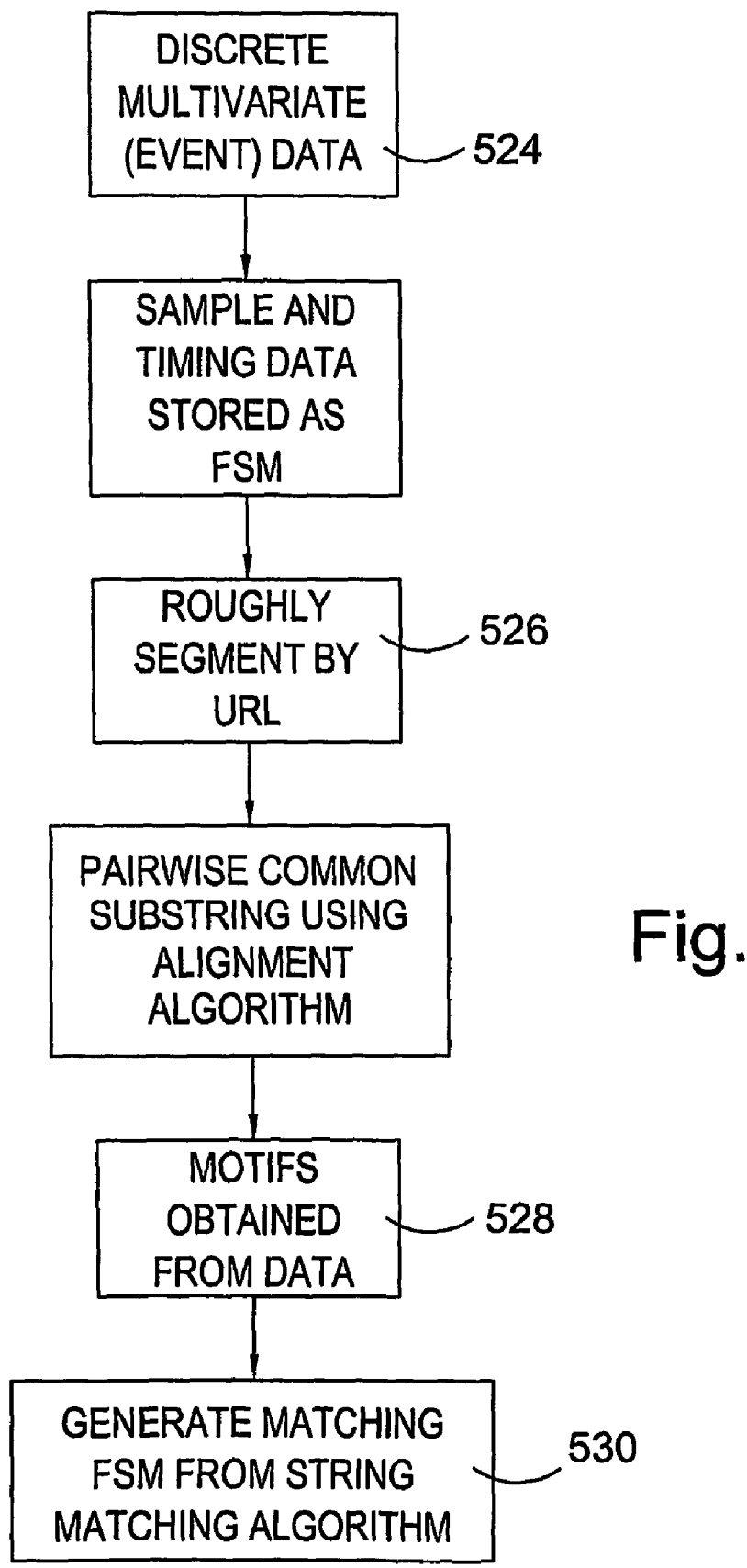
FIGS. 64 to 66 show the operation of a gesture recognition module.
Figure 65:
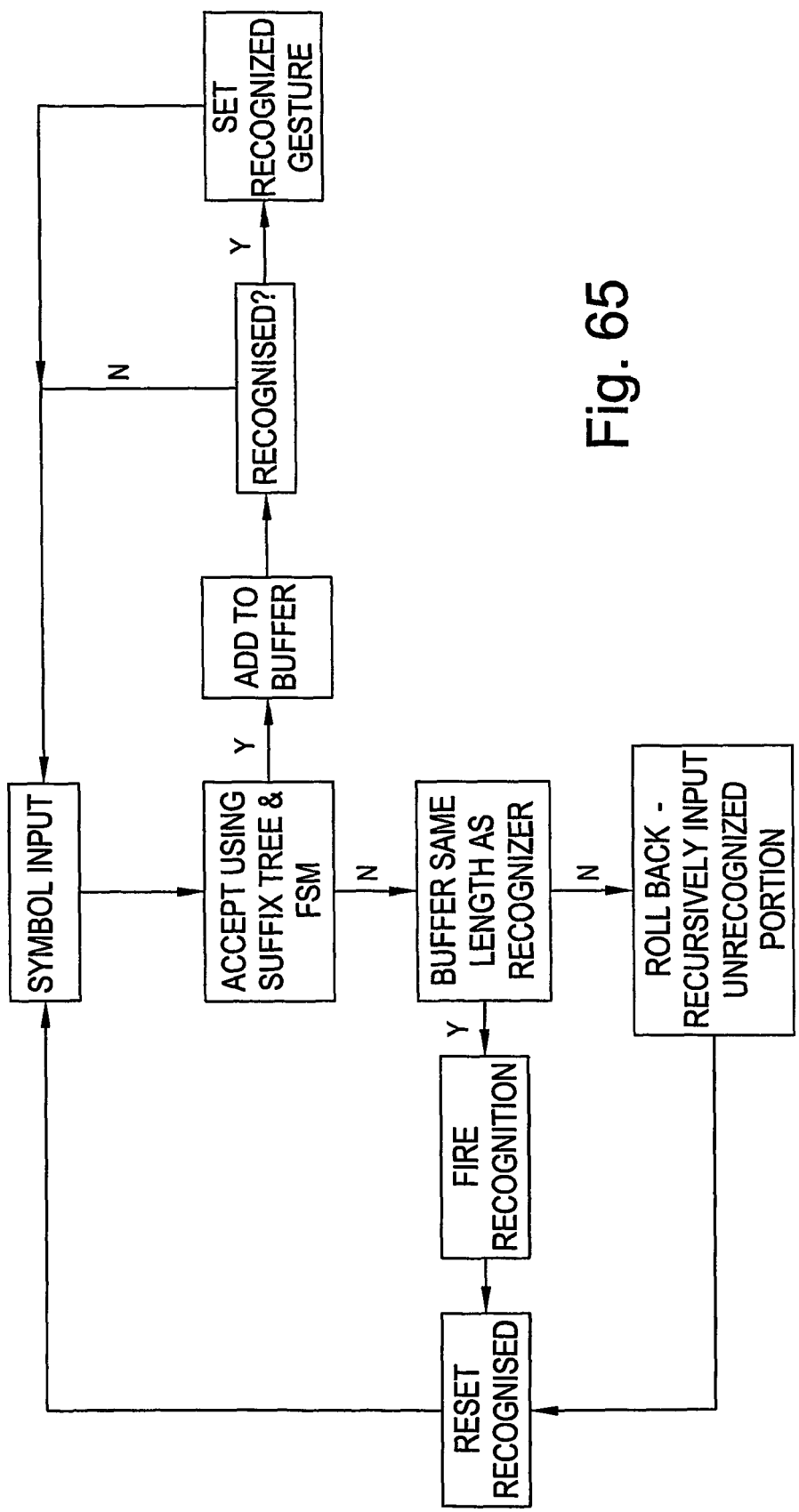
Figure 66:
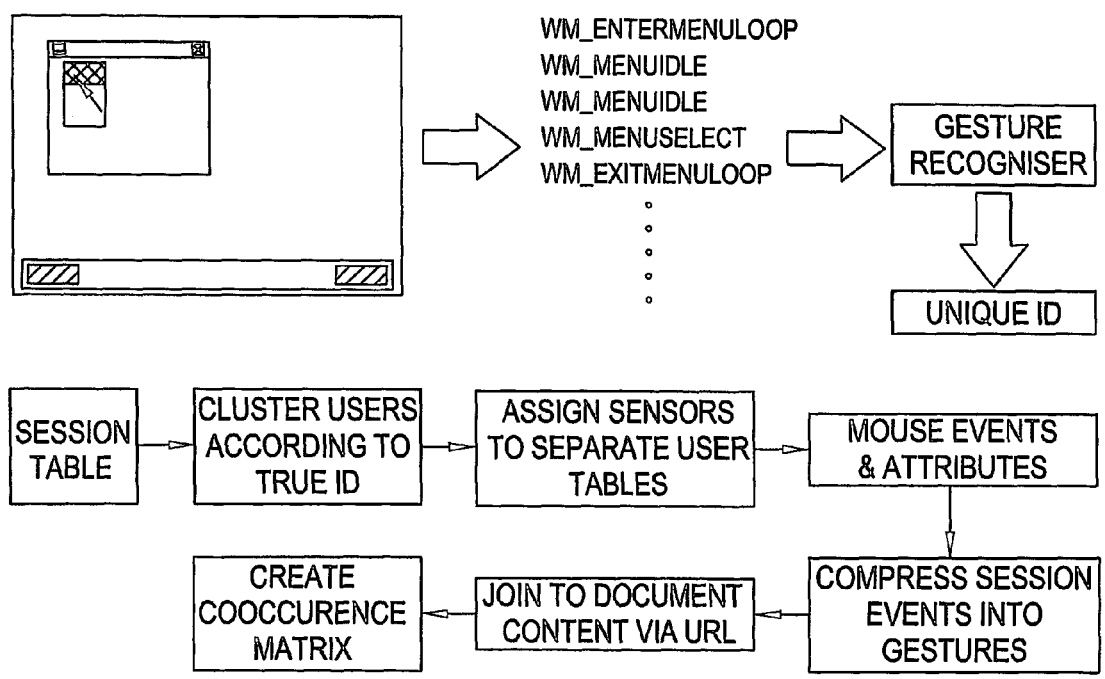

FIG. 64 shows the algorithmic process used for extracting training data and for learning patterns of behaviour from it. The process operates on the sequences of discrete system level events. These events exist in the server host database having been acquired by the sensors as described previously, and the process involves three major steps: (i) the sequences of discrete, multivariable system level events 524 (or the observations representing them) are roughly segmented 526; (ii) use of finite state machines (FSM) is made 530 to model these roughly segmented sequences, and (iii) recurring motifs are then extracted 528 using a sequence alignment algorithm. This process allows the creation of a user profile, representing characteristic behaviour patterns. Once sets of user behaviour patterns have been learned, online recognition of the same or similar patterns is possible. The process to achieve this is shown in FIG. 65 that indicates the algorithm for online recognition of previously learned patterns. The basis of this procedure is an FSM-based string-matching algorithm as described. FIG. 66 indicates the data transformations at each stage of processing beginning with the system level events, followed by the generation of identifiers for each new symbol (system event) found, then finding the patterns in past usage and finally recovering these patterns.

7. User Interface

Figure 67:
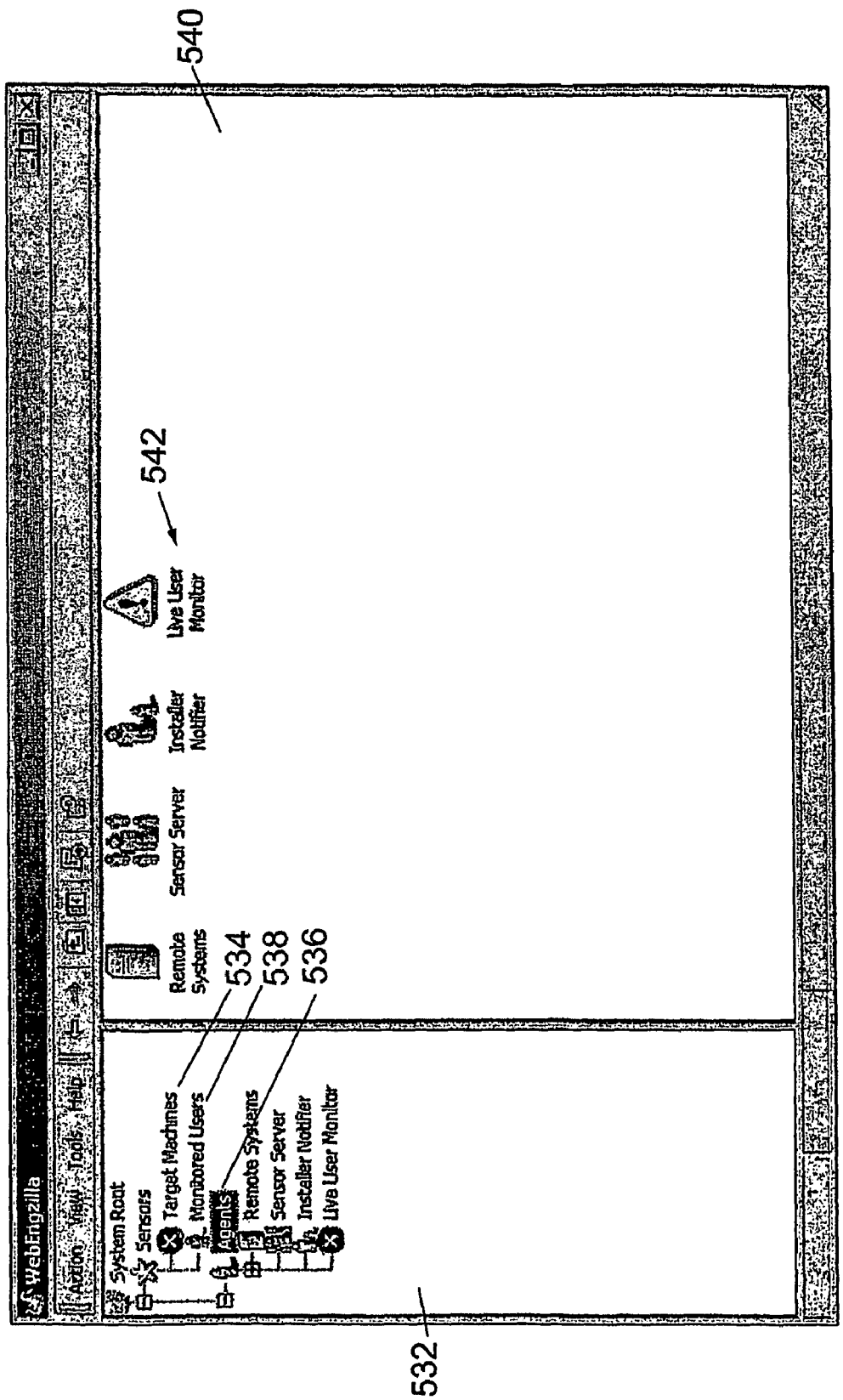

FIGS. 67 to 73 illustrate various aspects of an example User Interface (UI) for execution on the server device. FIG. 67 shows the main UI screen, with the left-hand frame 532 including a hierarchical view of the system, indicating the location of installed sensor instances 534, and details of the agents installed on the local server 536. The frame also includes an icon representing monitored user information 538. The main frame 540 shows the contents of the 'agents' directory, and indicates the currently-installed local agents 542—in this example, these include 'SensorServer', 'Notifier', and 'LiveUserMonitor'.

Figure 68:
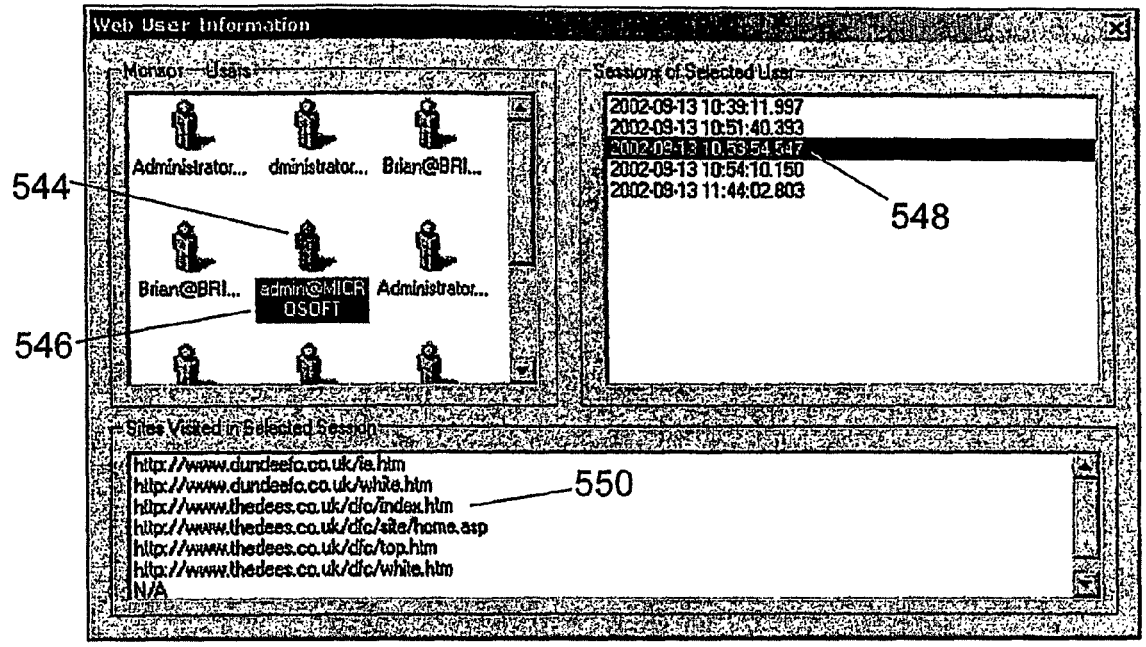
Figure 69:
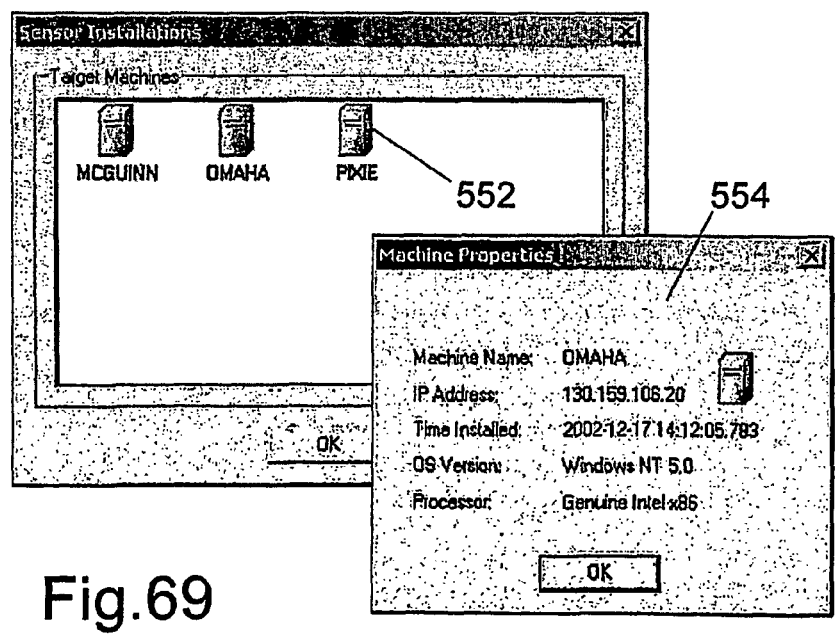

FIG. 68 shows the UI for displaying monitored user information. Each user is identified by an icon 544 and a username 546. Selecting a user highlights the times of each monitored session 548 for that user. Selecting a session gives a list of all URLs visited during that session 550. FIG. 69 shows the UI for identifying installed sensor instances. Each client machine is displayed 552, together with basic machine information 554. Further details of installed sensors may be displayed if desired.

Figure 70:
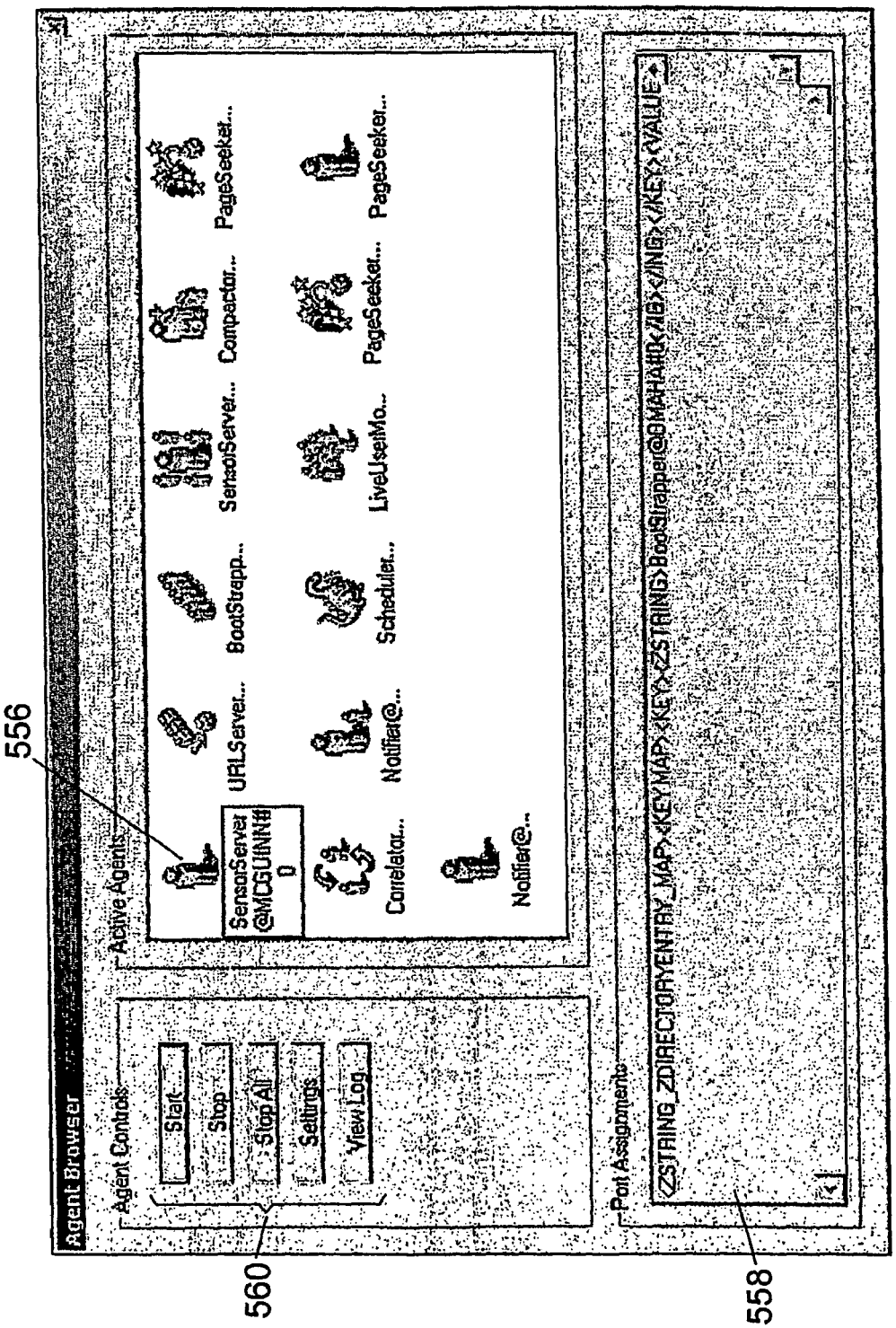

FIG. 70 illustrates the UI for operating the agent communication broker (described above in section 4.3). Each active agent is identified by an icon 556, with brief details of each agent displayed in a lower frame 558. The UI allows each agent to be terminated, an activity log viewed, and the settings modified 560.

Figure 71:
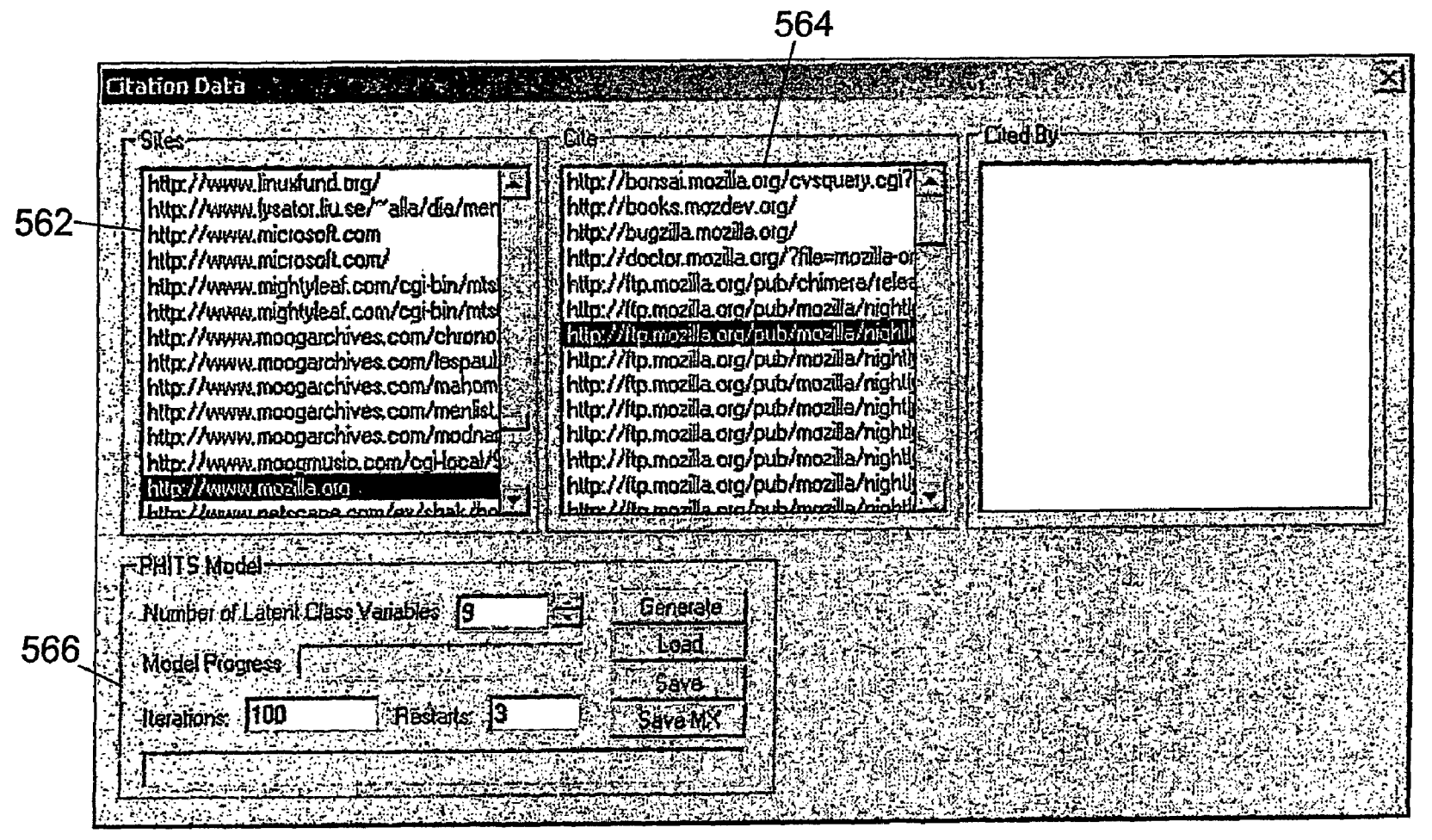

FIG. 71 shows the UI for interacting with the stored database of user activity. Each URL visited by a user is listed in a first frame 562, together with a list of URLs referred to by that visited URL 564. A statistical interface 566 allows analysis of the URL to be performed, for example, to identify likely content or the like.

Figure 72:
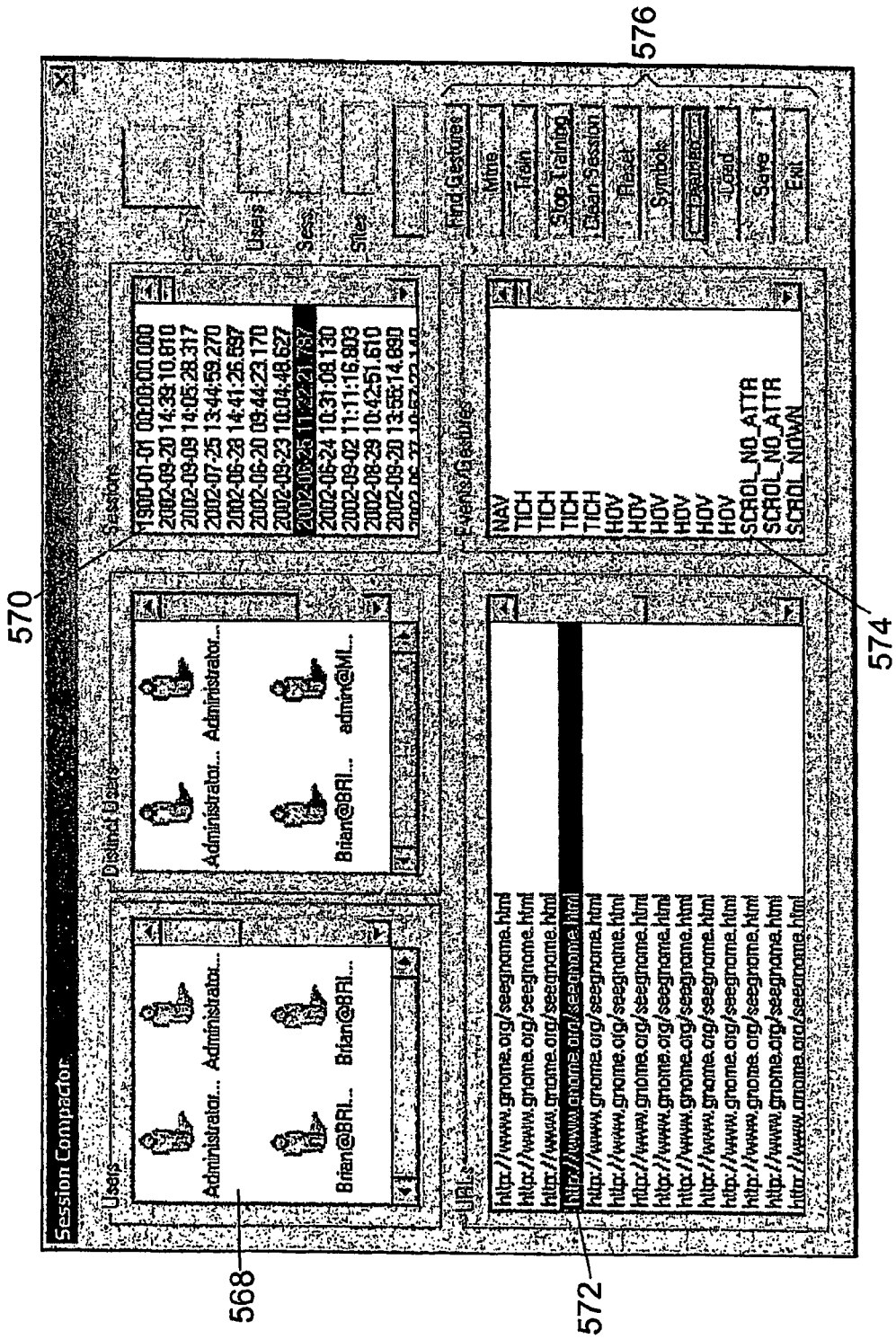

The UI for the DatabaseCompactor agent is shown in FIG. 72. This agent reduces the size of the stored database by eliminating redundancies. In addition to displaying users 568, sessions 570, and visited URLs 572, this UI also shows user actions or gestures performed on each URL 574. These actions can be combined into higher-level actions 576 to allow database compaction.

Figure 73:
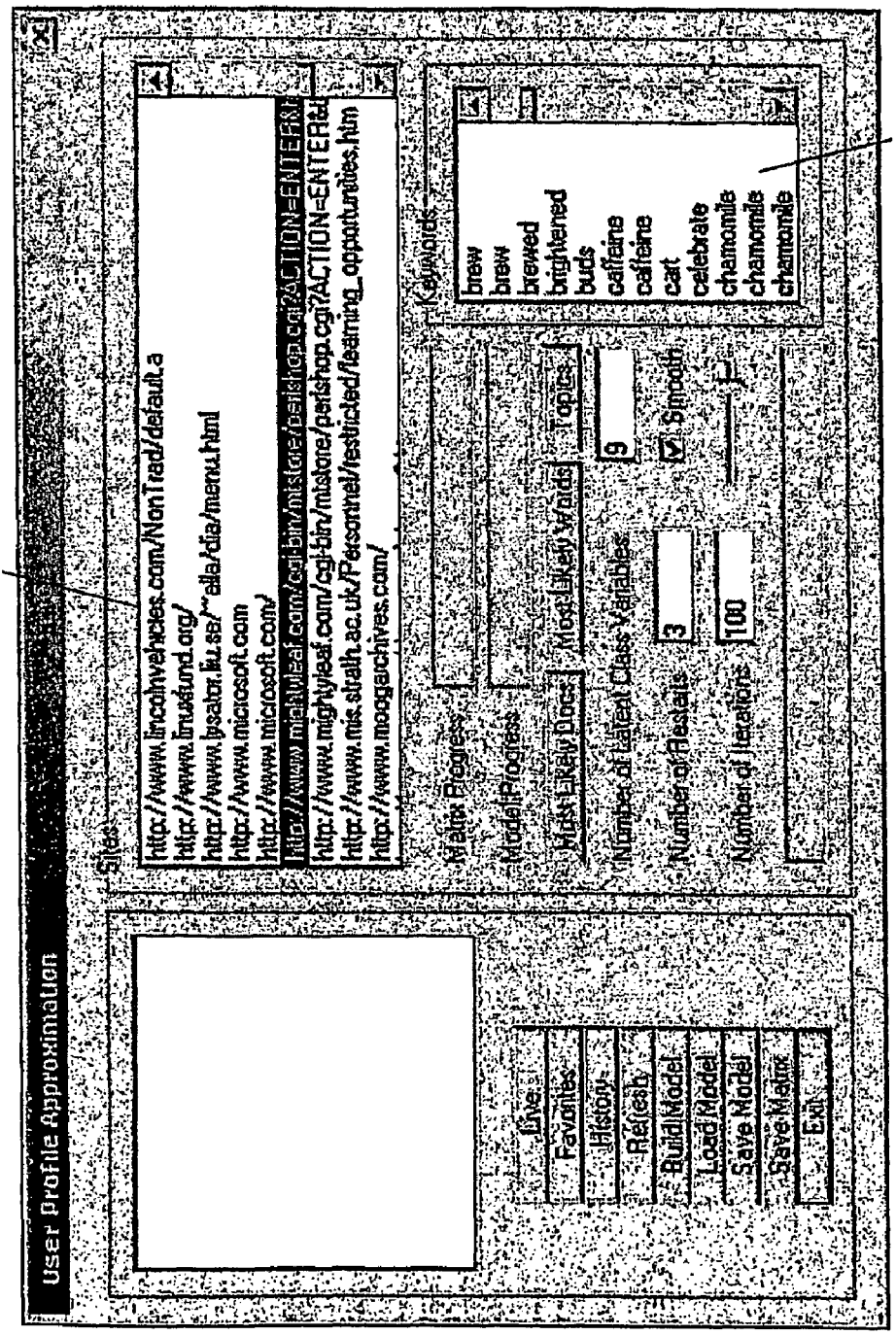

FIG. 73 illustrates a UI allowing a first approximation of a user profile to be assembled without undergoing initial periods of training. This UI relies on the sensors capturing a list of the user's favourites or history on request 578. Standard techniques may then be used to extract a list of keywords 580 from those sites to identify likely content, and a model of the user's probable actions and sites may then be generated. This will of course be refined as live data is acquired.

8. Modified Sensor for Dealing with Proxy Servers and Firewalls

In situations where security requirements mean that controlled access to the Internet is desirable and/or that a total block on all other outside network access is imposed, but access to the Internet is still available, an HTTP Proxy Server and/or a firewall are commonly used. This can be one (or more) machine(s) within a network that make HTTP requests for pages on behalf of local machines. Most Web Browsers have provision included for Proxy access to the Internet and allow configuration to be based on one of the following settings: a) Direct Connection; b) Specific Proxy Host; c) Automatic Configuration. For the 'Direct' setting, the browser can contact the web server on which the page being requested resides then request and receive the desired page—the proxy server is not used in this case. In the 'Specific' setting, a host name and port number are specified of a machine that the proxy server runs on. Web browsers configured in this way make a connection to the proxy server, issue the request for a page, the proxy issues a request to the host the page resides on, the proxy receives a response from the host the page resides on then sends the response to the browser that made the original request and the page is displayed. After this the connection between the proxy and the browser is closed.

The final configuration, that is automatic configuration, is the most complex. Before the browser makes its first request to any web server it downloads and parses a configuration script from a specified location. This script contains details of hosts that requests are to be made to directly and lists of hosts that are to be used as proxy servers. Using the rules in the script, the browser makes a decision which server it makes a page request to, the site or the proxy (there may be a number of proxies—the rules dictate which one to use). The script approach is convenient in that it allows access to be filtered through a proxy but can specify a direct connection to sites hosted locally. The same rules downloaded at the start of a session are adhered to for every request made for the entire duration of the session. In order to operate in this situation, the system in which in the invention is embodied includes a Web Sensor Server Agent at the server side, and at the corresponding client a 'connectionless' or web-sensor. These components could function either along side or independently of those described before, on both the client and server side.

The so-called web-sensor is functionally identical to the previously described sensors in that it is operable to capture the same navigation, user interaction and temporal data. It differs however in the way it communicates with the Server. Since it may not be able to contact the notification host directly, as described above, this Sensor does not connect directly to the host server for the duration of a session, but instead makes intermittent transmissions wrapped in HTTP 'POST' Requests. This means that the web-sensor is operable to create a message or data structure for sending to the monitor in a format or structure that is such that when it is sent, it causes a communication link between the sensor and the monitor to be opened, regardless of the communication path that has to be taken. Because of this, the sensor can utilise a Proxy Server to communicate with its notification host.

Figure 74:
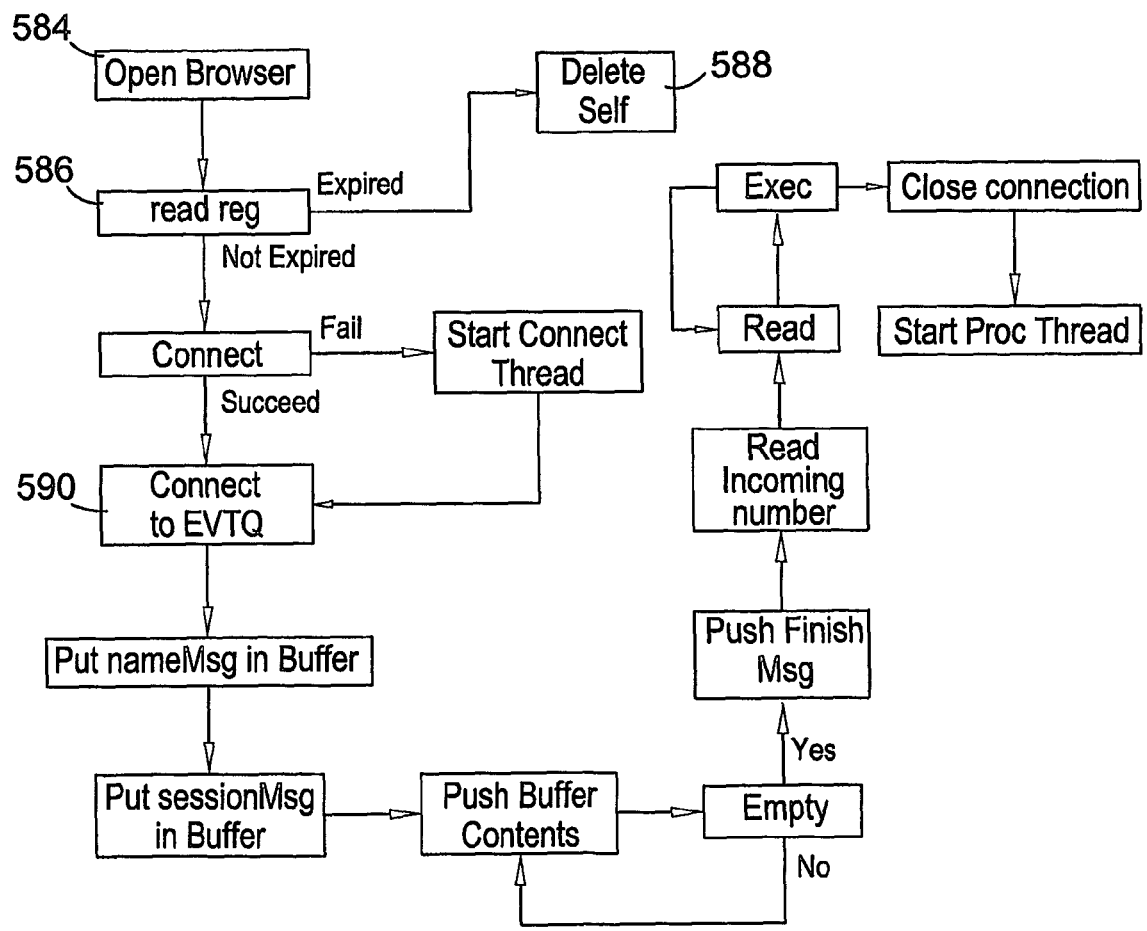
FIG. 74 shows a main client thread for a connectionless sensor.

FIGS. 74 to 80 show various threads for installing and running the web-sensor. As before, and as shown in FIG. 74, the web-sensor is initialised when the browser initialises 584. In addition to the adoption of specified monitoring options, the Web-Sensor detects and adopts the host browser's preferred means of accessing the Internet. Like the sensor described before, the Web-Sensor can be configured to have an expiry date. This is read from a registry or, more specifically, persistent storage, 586. If the expiry date has passed when the Web-Sensor is at the initialisation stage, a self-destruct thread is run 588, see FIG. 77, and the sensor is unloaded.

For the web-sensor, all system-level event interception is carried out in the same manner as before. The only difference is that instead of sending data straight to the server, it is placed in an event queue 590, the contents of which are periodically emptied and sent to the server. Data is added to the event queue each time a valid event is intercepted, read and processed to form a message, see FIG. 75. Periodically, the event queue is emptied. The steps for doing this are shown in FIG. 76, which shows the queue empty thread. At configurable intervals, triggered by the firing of a timer 592, the Sensor forms an HTTP 'POST' request, places the queue data in the body of the request and flushes the queue. This data may be compressed and encrypted as required. The HTTP request is then posted 594 to whichever host is dictated by the rules specified in the proxy configuration file. Upon successfully posting, the Sensor receives the corresponding HTTP response, reads any data contained within it 596, and then closes the connection, and the timer is reset 598. Data contained within the response is parsed into sequences of instructions that may include configuration changes, requests for History/Favorites or forced Navigation requests. Even if no data has been gathered over the duration of the interval, the Sensor still sends a 'heartbeat' message to inform the Server that it is still functional. Upon closure of the browser window (the end of the 'session'), the queue is also flushed and its contents posted to the notification host.

Since communication from the web-sensor is in short bursts rather than a fixed connection, it is wasteful to use a single thread per connection as the overhead of creating and destroying a thread is relatively high for the time it is used. Instead, the sensor server is adapted to include a thread pool. This includes a number of threads created when the server starts that reside in an inactive state awaiting work tasks to be assigned to them. When they complete their tasks, they go back to the sleeping state, i.e. the wait for message state. This removes the computational cost of initialising and cleaning up threads for every connection. Details of active sessions are maintained in the form of a data structure that records the user name, session identifier (both unchanged from the original design), URL currently being visited and index of that URL within the session. This data structure may also contain sequences of commands to be sent to the Web-Sensor the next time it connects.

FIG. 78 shows the main thread for the server for the web-sensor. When this is initialised, a read thread is run 600. This is shown in FIG. 79. In the event that a connection is accepted 602, the Http header is discarded 604 and the data, such as the user identifier and the session are read, 606 and 608. Then an appropriate handler is selected or created 610 and the data is input to it 612. Once this is done, a handler read thread is run, see FIG. 80. The handler resides in an inactive state and waits until a message is received 614. In the event that a message is not received within a pre-determined time period, the handler deletes or unloads itself. If an incoming post request is received, its ID is read 616 and it is parsed into the sequence of events monitored by the Sensor. The event identifiers are then posted into a state machine that alters the values of the associated session according to the attribute values contained in each message and commits them to the database 618. Any commands to the Sensor are read 620 and placed in an HTTP response 622. This message is then sent to the web-sensor and the connection closed. The posting of a quit message signals the end of a session and the data structure deletes itself signalling the end of the session. The aforementioned 'heart beat' from a Web-Sensor instance is used to detect if a client session is still active. Upon receipt of such a message, a timer associated with that connection is reset to begin counting down again once communication with that Sensor has ended. If the timer goes off, the data structure associated with the connection is deleted and a termination symbol denoting this occurrence is committed to the database signalling the end of the session. Any messages pending are serialised to disk and may be sent the next time the Web-Sensor connects.

The present invention advantageously provides a system for monitoring actions performed on a data processing device by a user, and preferably a plurality of different users. The system comprises a plurality of user data processing devices including means for interacting with a user and a system monitor that can communicate with each user device and a database. In a preferred embodiment, the monitor includes a plurality of software agents for carrying out specific functionality. These agents may be distributed over one or many different machines. Each user device includes at least one sensor for detecting events occasioned by interaction of a user with the data processing device. These sensors are operable to create a data structure representing a detected event, and communicate that data structure to the monitor. Once these structures are received, the monitor records them in the database. By analysing the event data for specific users, user profiles can be created. These can then be used to authenticate users.

It will be apparent from the foregoing that the present invention provides a means whereby the actions of a user on a network may be remotely monitored and logged, with forced actions also being possible in certain situations. It will also be apparent to the skilled person that the foregoing is descriptive of an embodiment of the invention only, and that various modifications and amendments may be made to the systems described herein without departing from the scope of the invention. For example, the sensors and agents may reside on a single computer, rather than on a client and server respectively. Further, although the invention has been primarily described with reference to monitoring a user's activities via a web browser program, it will be apparent that the invention may be applied to monitoring activities through a general user interface, such as a GUI, or via any other specific application, for example, documents accessed via a word processor or graphics package, or files transferred over a network, and so forth.

The invention claimed is:

1. A system for monitoring actions performed by a user of a user device on a network, the user accessing the user device with an individual network user identity, the system comprising:

a user device including a user interface for interacting with a user, an operating system, at least one sensor, and a processor configured to:

detect user interaction events created by interaction of the user with the operating system of the user device using the at least one sensor, create data structures representing the detected user interaction events, and communicate the created data structures to a system monitor;

a system monitor configured to:

communicate over the network with the user device, create a user profile using the communicated data structures, and associate the user profile with the individual network user identity used to log onto and access the user device or the network;

wherein the user device is further configured to subsequently detect user interaction events of a subsequent user accessing the user device via the individual network user identity associated with the user profile; and wherein the system monitor is further configured to:

compare the subsequently detected events to the user profile associated with the individual network user identity, determine, based on the comparing, whether the subsequently detected events conform to the user profile associated with the individual network user identity by using a similarity matrix, in response to the determining, further determine that the subsequent user is not the individual user associated with the user profile associated with the individual network user identity, and force a security action on the user device.

2. The system as claimed in claim 1, wherein the user interaction events comprise user mouse movements, scrolling movements, or keyboard presses.

3. The system as claimed in claim 1 wherein the system monitor is further configured to send a command to the at least one sensor, and wherein the at least one sensor is configured to respond to the command.

4. The system as claimed in claim 3, wherein the system monitor is configured to send a shut down command or a delete command to the at least one sensor.

5. The system as claimed in claim 1, wherein the at least one sensor comprises a plurality of sensors, and wherein each respective sensor is configured to detect distinct types of user interaction events.

6. The system as claimed in claim 1, wherein the at least one sensor is used to detect one or more of the following types of events: internet browser navigation operations; mouse and keyboard operations; keystroke data; window scrolling operations; window resizing operations; menu and toolbar operations; internet browser navigation history; and internet browser bookmarks or favorites.

7. The system as claimed in claim 1, wherein the at least one sensor configured to force the user device to perform one of the following: open or close a program or data file, change a website of an internet browser.

8. The system as claimed in claim 1, wherein the system monitor comprises a plurality of software agents for processing the data provided by the at least one sensor.

9. The system as claimed in claim 1, wherein a plurality of user devices are in data communication with the system monitor, and wherein the system monitor is configured to simultaneously perform its configured processing for each user device.

10. The system as claimed in claim 1, wherein the at least one sensor is integrated with additional software for execution on the user device.

11. The system as claimed in claim 10, wherein the additional software is one of an internet browser or an operating system user interface.

12. The system as claimed in claim 10, wherein an instance of the at least one sensor is loaded when an instance of the additional software is created or initialized.

13. The system as claimed in claim 1, wherein the at least one sensor is associated with an identifier for identifying the user device on which it resides.

14. The system as claimed in claim 1, wherein the data structures include any one or more of a module identifier; a device identifier; a timestamp representing the time at which the event was detected; identification of the detected event; identification of any programs being executed on the device; identification of any website URL or data file which is open when the event occurs.

15. The system as claimed in claim 1, wherein an intermediary handler is disposed between the monitor and each user device for handling and transferring data communications.

16. The system as claimed in claim 1, wherein the communicating comprises creating a message including the created data structures, the message having a format that causes a communication link between the at least one sensor and the system monitor to be opened when the message is sent.

17. The system as claimed in claim 1, wherein the monitoring system is configured to determine at least one user gesture based on one or more detected event identifiers or user interaction events.

18. The system as claimed in claim 1, wherein the user profile is based on characteristic gestures or user interface actions performed by the user.

19. The system as claimed in claim 1, wherein the comparison comprises use of a finite state machine.

20. A method for monitoring actions performed by a user of a user device on a network, the user accessing the user device with an individual network user identity, the method comprising:

providing a system monitor on the network that is configured to communicate over the network with the user device;

detecting, by the user device, user interaction events created by interaction of the user with an operating system of the user device using at least one sensor located at the user device;

creating, by the user device, data structures representing the detected user interaction events;

communicating, by the user device, the created data structures to the system monitor;

creating, by the system monitor, a user profile using the communicated data structures;

associating, by the system monitor, the user profile with the individual network user identity used to log onto and access the user device or the network;

associating, by the system monitor, the user profile with an individual user of the user device or the network;

subsequently detecting, by the user device, user interaction events of a subsequent user accessing the user device via the individual network user identity associated with the user profile;

comparing, by the system monitor, the subsequently detected events to the user profile associated with the individual network user identity;

determining, based on the comparing, whether the subsequently detected events conform to the user profile associated with the individual network user identity by using a similarity matrix;

in response to the determining, further determining that the subsequent user is not the individual user associated with the user profile associated with the individual network user identity; and forcing, by the system monitor, a security action on the user device.

21. The method as claimed in claim 20, wherein the user interaction events comprise user mouse activity, scrolling, or keyboard activity.

22. The method as claimed in claim 20, wherein the communicating comprises creating a message including the created data structures, the message having a format that causes a communication link between the at least one sensor and the system monitor to be opened when the message is sent.

23. The method according to claim 20, wherein each sensor module is integrated with additional software for execution on the user device and the method further comprises loading an instance of a sensor when an instance of the additional software is created or initialized.

24. The method as claimed in claim 20, comprising determining at least one user gesture based on one or more detected event identifiers or user interaction events.

25. The method as claimed in claim 20, wherein the user profile is based on characteristic gestures or user interface actions performed by the user.

26. The method according to claim 20, wherein the comparison comprises use of a finite state machine.

* * * * *

UNITED STATES PATENT AND TRADEMARK OFFICE
CERTIFICATE OF CORRECTION

| | | Page 1 of 1 |
|---|---|---|
| PATENT NO. | : 8,392,553 B2 | |
| APPLICATION NO. | : 10/554670 | |
| DATED | : March 5, 2013 | |
| INVENTOR(S) | : Petropoulakis | |

It is certified that error appears in the above-identified patent and that said Letters Patent is hereby corrected as shown below:

In the Specification:

Column 10

Line 57, "Bookmarks)" should read --(Bookmarks)--

Column 11

Line 7, "binary, dependencies" should read --binary dependencies--

Column 12

Line 56, "age" should read --page--

In the Claims:

Column 33

Line 54, "sensor configured" should read --sensor is configured--

Signed and Sealed this
Eighteenth Day of June, 2013

Teresa Stanek Rea
*Acting Director of the United States Patent and Trademark Office*